US012569055B2

(12) United States Patent
Zwimpfer

(10) Patent No.: US 12,569,055 B2
(45) Date of Patent: Mar. 10, 2026

(54) ORAL HYGIENE DEVICE

(71) Applicant: TRISA HOLDING AG, Triengen (CH)

(72) Inventor: Martin Zwimpfer, Lucerne (CH)

(73) Assignee: TRISA HOLDING AG, Triengen (CH)

( * ) Notice: Subject to any disclaimer, the term of this patent is extended or adjusted under 35 U.S.C. 154(b) by 473 days.

(21) Appl. No.: 17/780,741

(22) PCT Filed: Nov. 25, 2020

(86) PCT No.: PCT/EP2020/083348
§ 371 (c)(1),
(2) Date: May 27, 2022

(87) PCT Pub. No.: WO2021/105202
PCT Pub. Date: Jun. 3, 2021

(65) Prior Publication Data
US 2022/0408907 A1 Dec. 29, 2022

(30) Foreign Application Priority Data
Nov. 27, 2019 (EP) .................................... 19211865

(51) Int. Cl.
*A46B 5/00* (2006.01)
*A46B 5/02* (2006.01)
(Continued)

(52) U.S. Cl.
CPC .............. *A46B 5/0095* (2013.01); *A46B 5/02* (2013.01); *A46B 9/04* (2013.01); *B25G 1/102* (2013.01);
(Continued)

(58) Field of Classification Search
CPC ........... A46B 5/0095; A46B 5/02; A46B 9/04; A46B 2200/1066; A61C 17/225; B25G 1/102; B25G 3/12; C22C 21/02
See application file for complete search history.

(56) References Cited

U.S. PATENT DOCUMENTS 1,054,017 A * 2/1913 Miller .................... A46B 7/023 15/184
3,103,680 A * 9/1963 Krichmar ................. A46B 7/04 15/176.4
(Continued)

FOREIGN PATENT DOCUMENTS

DE 8710533 U1 2/1988
EP 3501333 A1 6/2019
(Continued)

OTHER PUBLICATIONS

May 25, 2021 International Search Report issued in International Patent Application No. PCT/EP2020/083348.
(Continued)

*Primary Examiner* — Andrew A Horton

(57) ABSTRACT

An oral hygiene device, in particular a toothbrush, includes at least one application unit having a base body, further includes at least one handle unit, in particular a manual handle unit, having a base body, and including at least one coupling unit for releasably coupling the application unit to the handle unit, wherein the base body of the handle unit has a hardness and/or a density that is greater than a hardness and/or density of the base body of the application unit.

12 Claims, 34 Drawing Sheets

Figure 1A:
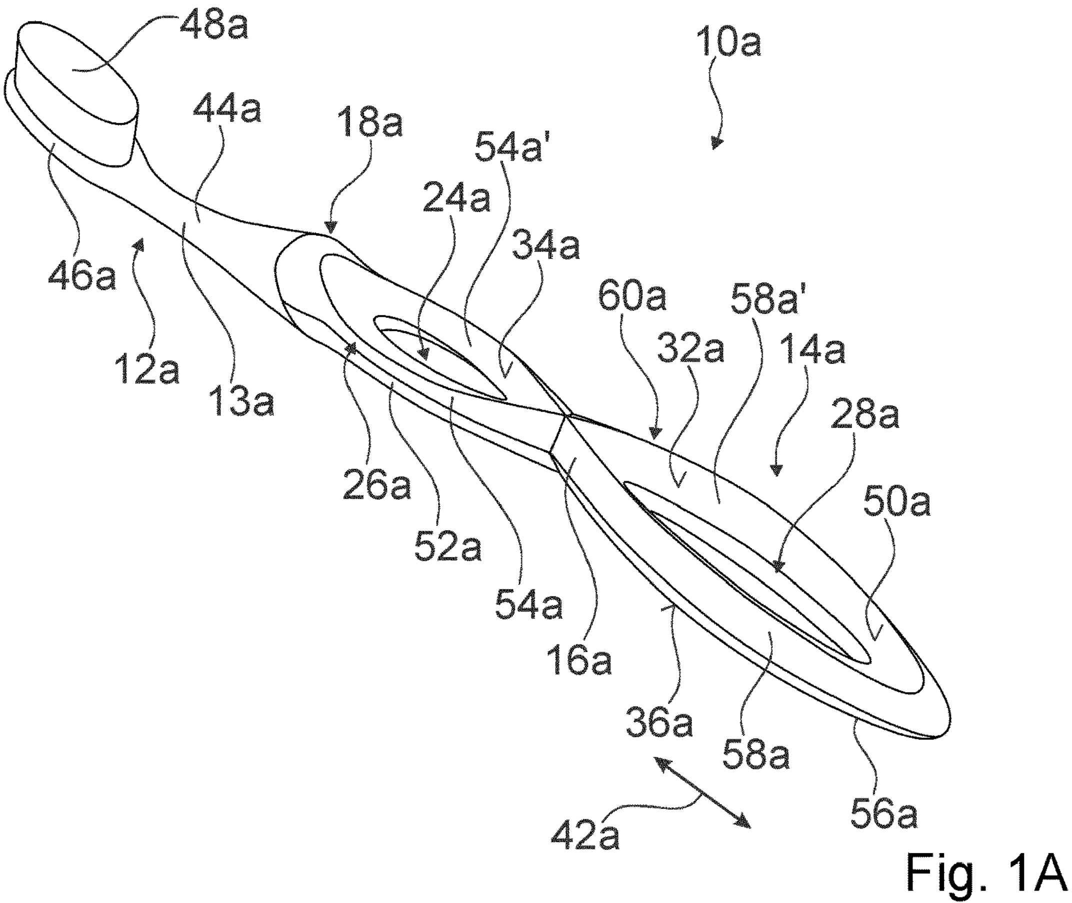

(51) Int. Cl.

| | |
|---|---|
| ***A46B 9/04*** | (2006.01) |
| ***B25G 1/10*** | (2006.01) |
| ***B25G 3/12*** | (2006.01) |
| ***C22C 21/02*** | (2006.01) |

(52) U.S. Cl.

CPC ................ *B25G 3/12* (2013.01); *C22C 21/02* (2013.01); *A46B 2200/1066* (2013.01)

(56) References Cited

U.S. PATENT DOCUMENTS

| | | | | |
|---|---|---|---|---|
| 4,461,052 | A | 7/1984 | Mostul | |
| 10,244,856 | B1 * | 4/2019 | Horsky | A45D 24/14 |
| 2010/0263149 | A1 | 10/2010 | Ballmaier et al. | |
| 2011/0314677 | A1 * | 12/2011 | Meier | A46B 15/0002 30/41.8 |
| 2012/0036663 | A1 | 2/2012 | Chen | |
| 2015/0289640 | A1 * | 10/2015 | Repchuk | A46B 17/06 15/105 |
| 2018/0125225 | A1 | 5/2018 | Wainless | |
| 2020/0128948 | A1 * | 4/2020 | Premananda | B08B 1/30 |

FOREIGN PATENT DOCUMENTS

| | | | | |
|---|---|---|---|---|
| EP | 3501334 | A1 * | 6/2019 | A46B 17/02 |
| EP | 3501335 | A1 | 6/2019 | |
| EP | 3501336 | A1 | 6/2019 | |
| WO | 00/65953 | A1 | 11/2000 | |
| WO | 2014/193621 | A1 | 12/2014 | |
| WO | 2016/105368 | A1 | 6/2016 | |
| WO | 2018/098211 | A1 | 5/2018 | |

OTHER PUBLICATIONS

May 17, 2022 International Preliminary Report on Patentability issued in International Patent Application No. PCT/EP2020/083348.

Jul. 16, 2020 European Search Report issued in European Patent Application No. 19211865.1.

Oct. 18, 2024 Office Action issued in European Patent Application No. 19211865.1.

Jan. 29, 2025 Office Action issued in European Patent Application No. 20812312.1.

Aug. 13, 2025 Office Action issued in European Patent Application No. 19211865.1.

* cited by examiner

ORAL HYGIENE DEVICE

PRIOR ART

The invention concerns an oral hygiene device.

EP 3 501 333, EP 3 501 334, EP 3 501 335 and EP 3 501 336 already disclose oral hygiene devices, in particular toothbrushes, with at least one application unit having a neck region, with at least handle unit, in particular a manual handle unit, having a base body, and with at least one coupling unit for releasably coupling the application unit to the handle unit.

The object of the invention is in particular to provide a generic oral hygiene device with improved properties with respect to durability, production method, ergonomics and/or ecology. The object is achieved according to the invention by the features of claim 1, while advantageous embodiments and refinements of the invention may be found in the sub-claims.

ADVANTAGES OF THE INVENTION

The invention is based on an oral hygiene device, in particular a toothbrush, with at least one application unit having a base body, with at least handle unit, in particular a manual handle unit, having a base body, and with at least one coupling unit for releasably coupling the application unit to the handle unit.

It is proposed that the base body of the handle unit has a hardness and/or a density which is greater than a hardness and/or density of the base body of the application unit. Preferably, at least the base body of the handle unit consists of a material which has a hardness and/or density that is greater, in particular substantially greater, than a hardness and/or density of the material from which the base body of the application unit is made. The base body of the handle unit may at least partially comprise a metallic material, a plastic, an organic material such as e.g. wood, cork, bamboo or similar, ceramic and/or glass.

Preferably, the oral hygiene device comprises the application unit with bristles and the handle unit, wherein the application unit in particular has a neck region which connects the application unit to the handle unit. The base body of the application unit in particular consists of the neck region and a head region. Alternatively, the neck region may be at least partially a component of the handle unit. In this case, the application unit would be designed correspondingly shorter and in the extreme case would comprise only the brush head.

All part elements of the application unit may consist of at least one hard and/or one or more soft component(s). Conventional hard and/or soft components, or also sustainable hard and/or soft components may be used. The application unit consists in particular at least largely of a plastic or organic material such as wood, cork or bamboo. The application unit is formed in particular by a push-on part. The application unit is in particular formed by a push-on brush. In principle however, other designs of application unit which appear sensible to a person skilled in the art are conceivable. The handle unit is in particular formed as one piece. It would however also be conceivable for the handle unit to be formed in several pieces. Here in particular, it is conceivable that several parts are produced and then joined together, for example to create geometries which can only be produced in multiple pieces, for example because of undercuts or similar. Furthermore, the handle unit may be formed from several pieces of different materials. Various material combinations which appear suitable to a person skilled in the art are conceivable, such as in particular metal and plastic, metal and wood, metal and ceramic, metal and glass, metal and organic material (wood, cork, bamboo etc.); ceramic and plastic, ceramic and wood, ceramic and glass, ceramic and organic material (wood, bamboo etc.); glass and plastic, glass and wood, glass and an organic material (wood, cork, bamboo etc.); or wood and plastic. Furthermore, the handle unit may consist of different metals and plastics and/or ceramics and/or organic materials. The base body is in particular formed as a solid body of solid material. It would however also be conceivable that the base body is formed as a hollow body. The base body could, for example, be formed as a cut cylindrical tube or elongate profile, which for example is closed by means of a plastic part as a termination and a coupling element. Alternatively, the base body may consist of two half-shells joined together.

Preferably, the application unit and the handle unit are made of different materials. The material of the handle unit is in particular denser and/or harder than the material of the base body of the application unit. The base body of the application unit, when made of plastic, has for example a density from 800 kg/m$^3$ to 1600 kg/m$^3$. A ratio to the density of the handle unit is preferably from 0.2 to 0.75, preferably from 0.35 to 0.6. The base body of the handle unit has in particular a density from 2000 kg/m$^3$ to 3500 kg/m$^3$, preferably from 2400 kg/m$^3$ to 3000 kg/m$^3$. It is furthermore possible that a ratio of the density of the application unit to the density of the handle unit is preferably from 0.2 to 0.75, preferably from 0.35 to 0.6. The base body of the handle unit in this case has in particular a density from 5000 kg/m$^3$ to 9000 kg/m$^3$, preferably from 5500 kg/m$^3$ to 8000 kg/m$^3$. The application unit and the handle unit may also have different surfaces. Different manufacturing methods and different materials in particular lead to different surfaces. Evidently, the surface composition may also be adapted so that the same surface is created almost throughout. An abrasion or wear on the application unit during changing or removal and fitting of the application unit is furthermore in particular greater than an abrasion of the handle unit, so a durability of the handle unit is achieved and multiple usage may be possible, in particular multiple changing of the application unit.

With the design of the oral hygiene device according to the invention, advantageous properties may be achieved with respect to the ergonomics of the oral hygiene device. Furthermore, in particular, an advantageously durable handle unit may be provided, wherein the application unit in particular is designed to be replaceable. Furthermore, an advantageously high robustness of the handle unit may be provided. Furthermore, in particular, a center of gravity of the oral hygiene device which lies in a region of the handle unit may be achieved. Furthermore, in particular, a center of gravity of the oral hygiene device may be achieved which, during use, lies in a region of the handle unit which is surrounded by the hand. In particular, an oral hygiene device may be provided which sits advantageously well in the hand. The guidance of the oral hygiene device is therefore also particularly efficient and comfortable. Furthermore, a high usage duration of the handle unit may be achieved, wherein in particular only the application unit need be changed. In particular, this may give an ecologically advantageous oral hygiene device.

An “oral hygiene device” is intended to be understood, in particular, as a toothbrush and/or an interdental cleaner and/or a flosser and/or a tongue cleaner and/or a toothpick. Advantageously, the oral hygiene device is configured as a toothbrush, in particular a manual toothbrush, preferably a child's or an adult's toothbrush, advantageously a purely manual toothbrush. In particular, the oral hygiene device is configured as a toothbrush with an exchangeable head. It is however also conceivable that the application unit has a design which differs from a brush head, such as for example an interdental cleaner head, such as in particular for an interdental brush with twisted-in bristles, for an interdental cleaner with injection-molded cleaning element, and/or for an interdental cleaner with dental floss, such as in particular flossers, and/or as a tongue cleaner head and/or as a toothpick. The oral hygiene device could however generally also be formed as a brush product. A "brush product" in particular means an oral hygiene brush and/or a cosmetic brush and/or a hairbrush and/or a domestic brush. Oral hygiene brushes are for example manual toothbrushes and multi-use toothbrushes, exchangeable head toothbrushes, single-use toothbrushes or single-tuft brushes, interdental cleaners, in particular with twisted-in bristles, in injection-molded form, or as flossers, tongue cleaners and/or dental floss. Cosmetic brushes are for example mascara brushes, nail varnish brushes, facial brushes, applicators, in particular as hair dye applicators, massage devices, make-up brushes, shaving brushes and/or wet razors or other body-care products. Domestic brushes are for example washing-up brushes or bottle cleaners.

The application unit is in particular formed by push-on brush. The application unit is in particular configured as a standard part. The application unit may be used in particular both for manual and also for electric toothbrushes, or so-called hybrid toothbrushes. Preferably, the application unit in particular consists of at least one plastic. The application unit may for example consist of a transparent plastic, so as to make the interface geometry and/or engagement of the handle unit in the application unit visible. In particular, the technical details may be made visible, so as to enable the user, in a simple fashion, to observe the push-on or pull-off process (e.g. turn, pull, snap-on, or a combination thereof). Furthermore, the operability may be shown in a more comprehensible fashion. Alternatively, the application unit may consist at least partly of an organic material such as e.g. wood, cork or bamboo. Thus in particular, the head may be made of wood, cork or bamboo, wherein in particular the coupling unit would need to be adapted accordingly.

In particular, the oral hygiene device has a longitudinal axis which advantageously runs at least substantially parallel to a main extension direction of the oral hygiene device. Preferably, the longitudinal axis runs at least in portions inside the oral hygiene device and in particular through its center of gravity. In particular, the longitudinal axis of the oral hygiene device is a central axis of the oral hygiene device and/or a central axis of the handle unit. A "central axis" of an object means in particular a theoretical axis which runs inside the object, parallel to a main extension direction of the object, and intersects the object at most at two points. The term "at least substantially parallel" here in particular means an orientation of a direction relative to a reference direction, in particular in a plane, wherein the direction has a deviation from the reference direction which is in particular less than 8°, advantageously less than 5°, and particularly advantageously less than 2°. A "main extension direction" of an object in particular means a direction which runs parallel to a longest edge of a smallest theoretical cuboid which only just fully encloses the object. A "main extent" of an object in this context in particular means an extent of a longest edge of a smallest theoretical cuboid which only just fully encloses the object.

In particular, the oral hygiene device has a length, in particular parallel to the longitudinal axis of the oral hygiene device and measured parallel to the support face, of 130 mm to 210 mm and preferably from 180 mm to 200 mm, wherein evidently other lengths, in particular smaller or larger, are conceivable. Smaller designs may be used for a child's and/or young person's toothbrush. The proportions given in this specification are in this case substantially observed. In particular, the oral hygiene device has a maximum width, in particular parallel to a transverse axis of the oral hygiene device, advantageously perpendicular to the longitudinal axis and/or parallel to a main extension plane of the oral hygiene device and/or the handle unit, from 10 mm to 25 mm, and preferably from 18 mm to 21 mm. In particular, in a neck region of the application unit, the oral hygiene device has a minimum width from 4 mm to 10 mm, preferably from 5 mm to 7 mm. Furthermore, in particular, the oral hygiene device without bristles has a height, in particular measured parallel to the vertical axis perpendicular to the support face, from 10 mm to 22 mm, and preferably from 12 mm to 18 mm. The highest point lies in particular in a thumb grip region or holding region of the handle unit of the oral hygiene device. The term "height" refers here, in particular, to a state of the oral hygiene device in which this oral hygiene device is laid down, for example on a flat surface such as a table top, a wash basin, an upper face of an item of furniture or similar, in particular such that the longitudinal axis is arranged parallel to the surface and the back of the oral hygiene device rests on the flat surface. A "main extension plane" of an object means, in particular, a plane which is parallel to the largest side face of a smallest theoretical cuboid which only just fully encloses the object and runs through the central point of the cuboid.

The handle unit, in particular with a second coupling element of the coupling unit, has a length from 120 mm to 170 mm, preferably from 135 mm to 155 mm. The ratio of this length of the handle unit to a total length of the oral hygiene device amounts in particular to 50% to 80%, preferably 55% to 75%. The oral hygiene device furthermore, in particular, has a center of gravity which lies in a region of the handle unit. The center of gravity preferably lies in a region which, during use, is at least partially surrounded by the hand/or fingers. The center of gravity of the handle unit lies in particular at a longitudinal position in a region from 40 mm to 90 mm, preferably from 55 mm to 75 mm, measured from a rear end of the handle unit. The center of gravity of the handle unit lies in particular in a region from 35% to 75%, preferably from 45% to 60% of the length of the handle unit. The center of gravity of the oral hygiene device, i.e. the handle unit assembled with the application unit, lies in particular at a longitudinal position in a region from 50 mm to 95 mm, preferably from 65 mm to 85 mm, measured from a rear end of the oral hygiene device. The center of gravity of the oral hygiene device lies in particular in a region from 25% to 60%, preferably from 35% to 45% of the length of the oral hygiene device, measured from a rear end of the oral hygiene device.

Advantageously, the application unit comprises at least one cleaning region which is provided for a tooth cleaning application, in particular in an oral cavity of the user. Preferably, the cleaning region comprises at least one cleaning unit, in particular at least one brush head, advantageously a toothbrush head, preferably comprising a plurality of bristles and/or bristle bundles and/or injection-molded cleaning elements or bristles, and/or soft-elastic cleaning elements. However, the cleaning element may also be configured, for example, as an interdental brush and/or as a single tuft (e.g. a single large bristle bundle) and/or as an arc spanned by dental floss, in particular as a flosser, or the like. Moreover, the application unit advantageously comprises at least the neck element which is preferably connected to the cleaning region, in particular directly and/or integrally. "Integrally" is intended to be understood, in particular, as connected at least by substance bonding, for example by a welding process, an adhesive bonding process, an injection molding process and/or a further process which appears suitable to the person skilled in the art, and/or advantageously formed in one piece, such as for example by being produced from a casting and/or by being produced in a single-component or multi-component injection molding process, advantageously from a single blank. "Provided" is intended to be understood, in particular, as specifically designed and/or equipped. "An object being provided for a specific function" is intended to be understood, in particular, to mean that the object fulfils and/or performs this specific function in at least one application state and/or operating state.

The oral hygiene device, in particular, has a front side and a rear side which, in particular, are arranged facing away from one another. Preferably, the cleaning region is arranged on the front side of the oral hygiene device. The front side is in particular a visible side of the oral hygiene device, when viewed in a direction perpendicular to the longitudinal axis of the oral hygiene device and perpendicular to the transverse axis of the oral hygiene device. The front side of the oral hygiene device is in particular the side of the brush on which the thumb is placed. The front side is normally also the side towards which the brush field or cleaning elements are directed. The rear side advantageously corresponds to a side of the oral hygiene device which is visible when viewed in an opposite direction. The rear side means the side of the toothbrush opposite the brush field. The left side of the oral hygiene device in particular means a side which lies on the left when viewed perpendicularly onto the front side of the oral hygiene device, with the lower end oriented in the direction of the viewer. The right side of the oral hygiene device in particular means a side which lies on the right when viewed perpendicularly onto the front side of the oral hygiene device, with the lower end oriented in the direction of the viewer. The top end in particular means an end of the oral hygiene device on which the cleaning region is arranged. The lower end is in particular an end of the oral hygiene device opposite the top end and lying closest to the handle region.

Preferably, the handle unit has at least one base body which is advantageously provided to be held in a hand. Preferably, the base body is configured to be waisted, at least in regions. This advantageously permits a secure hold, optimizes the ergonomics and reduces the weight. Particularly preferably, the base body is elongate, wherein advantageously a longitudinal axis of the base body of the handle unit corresponds to the longitudinal axis of the oral hygiene device. Preferably, the base body is made at least partially, in particular completely, from at least one metallic material. It would also be conceivable that the base body additionally consists of one or more further components, such as for example plastic, e.g. further hard and/or soft components. Other materials mentioned in the specification are also possible. In particular, the handle unit advantageously comprises at least one thumb grip region and/or at least one palm grip region. Advantageously, the thumb grip region is arranged on the front side of the oral hygiene device and in particular on a front side of the handle unit. It is conceivable that the thumb grip region and/or the palm grip region comprises at least one element and/or a surface structuring of at least one soft component and/or at least one hard component. Alternatively, the base body consists of plastic, i.e. at least one hard component and optionally at least one soft component. Further materials for the base body are ceramic, glass, minerals, stone, organic materials (e.g. wood, cork or bamboo). These materials too may be combined with hard or soft material plastics or combined with one another. Possible material combinations have been described above.

The materials used may be recycled and/or recyclable materials. It is usual that, advantageously, a recycling facility or collection facility accessible to the public is available for recyclable materials (metals, e.g. aluminum, glass, minerals, stone, plastics, organic materials such as wood, bamboo etc.).

In particular, recycling material may be used when glass is used. The recycling proportion (proportion of used glass) amounts to at least 60%, preferably at least 70%.

In the context of this disclosure, almost any hard components and soft components may be considered which the person skilled in the art may suitably combine and/or select. Hard components may for example be styrene polymerizates such as styrene acrylonitrile (SAN), polystyrene (PS), acrylonitrile butadiene styrene (ABS), styrene methyl methacrylate (SMMA), styrene butadiene (SB) or similar. Furthermore, a hard component may comprise polyolefins such as polypropylene (PP), polyethylene (PE) or similar, in particular also in the form of high-density polyethylene (HDPE) or low-density polyethylene (LDPE). Also, polyesters may be used such as for example polyethylene terephthalate (PET), in particular in the form of acid-modified polyethylene terephthalate (PETA), glycol-modified polyethylene terephthalate (PETG), polybutylene terephthalate (BBT), acid-modified polycyclohexylene dimethylene terephthalate (PCT-A), glycol-modified polycyclohexylene dimethylene terephthalate (PCT-G) or similar. Furthermore, use of cellulose derivatives is conceivable, such as for example cellulose acetate (CA), cellulose acetate butyrate (CAB), cellulose propionate (CP), cellulose acetate phthalate (CAP), cellulose butyrate (CB) or similar. Furthermore, a hard component may comprise for example polyamide (PA) such as PA 6.6, PA 6.10, PA 6.12 or similar, polymethylmethacrylate (PMMA), polycarbonate (PC), polyoxymethylene (POM), polyvinylchloride (PVC), polyurethane (PUR), polyamide (PA) or similar. In particular, polyethylene (PE) and/or polyurethane (PU) may be used as hard components and/or soft components. In particular, a hard component has a modulus of elasticity of at least 1000 $N/mm^2$ and advantageously at least 1300 $N/mm^2$, and/or at most 2400 $N/mm^2$ and advantageously at most 1800 $N/mm^2$. A preferred hard component is polypropylene (PP). At least certain materials listed as hard components may be sustainable materials. In particular, materials with a cellulose content are at least partially bio-based.

Advantageously, hard components are used as stable and/or structurally supportive elements, in particular in a carrier element of the application unit and/or the coupling unit or handle unit and/or the like. Preferably, the application unit or handle unit or at least one base body of the application unit or handle unit comprises a single hard component, which may be formed of one of said materials or a mixture or combination thereof. However, combinations of different hard components are also conceivable, wherein these may be processed for example in a two-component or multi-component injection molding process and/or bonded and/or welded together, in particular ultrasound welded.

Alternatively or additionally, several hard components may be used which do not form a material bond in a two-component and/or multi-component injection molding process. In particular, it is conceivable that in this case a form-fit connection between hard components is achieved, for example in the form of at least one undercut and/or at least one breakthrough and/or at least one, at least partial over-molding or similar. Here it is conceivable that for example a second hard component, which is in particular injection molded onto a first hard component, contracts and/or shrinks after an injection molding process and advantageously forms a shrink connection. Suitable combinations may for example be polypropylene and polyester, polypropylene and styrene acrylonitrile, or other combinations.

Suitable soft components may be thermoplastic elastomers, for example thermoplastic styrene elastomers (TPE-s), such as a styrene-ethylene-butylene-styrene copolymer (SEBS), a styrene-butadiene-styrene copolymer (SBS) or similar. Also, use may be made of thermoplastic polyurethane elastomers (TPE-U), thermoplastic polyamide elastomers (TPE-A), thermoplastic polyolefin elastomers (TPE-O), thermoplastic polyester elastomers (TPE-E) or similar. Furthermore, a soft component may for example comprise at least one silicon. Advantageously, a soft component has a Shore A hardness of maximum 90, advantageously maximum 50 and particularly advantageously maximum 30. Preferably, at least one soft component with at least one hard component, in particular in at least one two-component and/or multi-component injection molding process, forms at least one material bond, advantageously at least by means of over-molding and/or surround-molding. The materials listed as soft components may be sustainable materials.

Advantageously, it is conceivable that a hard component used and a soft component used have different colors, so that surface structures, markings, patterns and similar can be achieved by means of suitable design of the bodies.

It is furthermore proposed that the at least one application unit has a brush head, in particular a toothbrush head. The application unit advantageously comprises at least one cleaning unit, in particular a toothbrush head with bristles. The cleaning unit also advantageously comprises at least one bristle carrier, for example a brush head base body. At least some or all of the bristles are advantageously conventionally extruded bristles. The bristles may here comprise in particular at least one hard component and/or at least one soft component. Preferably, the bristles are made at least partially or completely from polyamide (PA) and/or polyester (PBT, PET), wherein any other materials are conceivable and also sustainable materials are possible. It is furthermore conceivable that at least some of the bristles have a taper and/or a changing cross-section. Preferably, the bristles are made from a single, in particular also mixed material. It is however conceivable to provide bristles with several components which in particular can be and/or are produced by means of at least one co-extrusion process. The bristles may for example be or be able to be produced by means of extrusion, trimming and/or refinishing. In contrast to injection-molded bristles or rubber-elastic massage and cleaning elements which are produced by means of injection molding, conventional bristles are extruded, cut, finished and inserted in the toothbrush handle by means of suitable processes, such as for example by means of anchor punching processes or an anchor-free process.

In particular, cylindrical or tapered bristles with round cross-section are used, wherein any other cross-sections are conceivable such as for example polygonal, triangular, rectangular, quadratic, elliptical, star-shaped, trapezoid, cruciform, parallelogram-shaped, rhomboid or any other cross-sections. In particular, different bristles may be present in a bristle bundle, but also different bristle bundles may be used, in particular each with a specific type of bristle. Bristles and/or bristle bundles may be arranged regularly but also irregularly. In particular, bristles may be arranged in groups and/or adjacent to one another, and/or bristle bundles may differ, in particular alternately, with respect to at least one feature such as for example length, diameter, material, color, material hardness, geometry, taper and similar. Preferably, the bristles have a diameter, in particular perpendicularly to their longitudinal axis, of at least 0.075 mm and/or at most 0.25 mm. Advantageously, the bristles have a cross-sectional area, in particular perpendicular to their longitudinal axis, of at least 0.002 $mm^2$ and/or at most 0.2 $mm^2$. In the case of bristles used in the cosmetics sector, for example bristles of an additional application element, thinner bristles and/or bristles with smaller cross-section may be used, in particular bristles with a diameter, in particular perpendicular to their longitudinal axis, of at least 0.025 mm and/or most 0.2 mm, and/or with a cross-sectional area, in particular perpendicular to their longitudinal axis, of at least 0.001 $mm^2$ and/or at most 0.15 $mm^2$. In the case of tapered bristles, in particular polyester (PBT, PET) is suitable as a material, wherein also sustainable materials are possible, wherein a taper may be produced mechanically and/or chemically. Other materials are however also conceivable. Preferably, the bristles are straight in the longitudinal direction, however undulating and/or twisted and/or helical and/or turned bristles are conceivable, and in particular also combinations of different bristles. Furthermore, bristles with a smooth surface are conceivable, as are bristles with textured surface.

Furthermore, the bristles, in particular as a bristle bundle, are preferably produced, in particular attached to the bristle carrier, in at least one anchor punching method or an anchor-free method or similar. Preferably, the bristle carrier comprises a plurality of bristle receivers which are in particular drilled and/or formed in the injection molding process, in particular as holes for bristle bundles. In the case of anchor punching, it is for example conceivable that firstly a base body is produced, in particular of a hard component, preferably of the brush head, by means of an injection molding process, wherein advantageously blind holes for the bristle bundles are formed during the injection molding. Evidently however, also, subsequent drilling of blind holes is conceivable. Preferably, then the bristles or bristle bundles are folded and attached in a respective blind hole by means of at least one anchor, in particular by means of punching. Loop punching is also conceivable.

Alternatively, as stated, an anchor-free process is conceivable wherein advantageously bristles or bristle bundles are not folded. In this case, in comparison with anchor punching, the bristles or bristle bundles have around half the length. For example, it is conceivable here that the bristle bundles are firstly separated, melted and/or their bristle ends in particular then over-molded for fixing. Here advantageously, bristle bundles may be combined.

It is furthermore conceivable that the application unit is composed of a base body and a bristle plate which is equipped with bristles and/or alternative cleaning elements. For this, firstly, by means of injection molding, bristle plates are produced with passage holes through which bristles are then guided. Preferably, the bristles are then connected on a rear side, in particular melted, preferably to one another and/or to the corresponding bristle plate. In this way, bristle plates with bristles can then be welded and/or bonded to a base body, in particular a brush head, preferably by means of ultrasound welding. For this, the base body, in particular the brush head, in particular has a recess into which the bristle plates may be inserted. A known production method in this context is the anchor-free tufting process which in particular allows bristle bundles to be combined. The underside of the bristle plate is in particular a side which is placed in the recess of the base body and points in the direction of the rear side of the oral hygiene device. Accordingly, the top side of the bristle plate points in the direction of the front side of the oral hygiene device.

A further method for anchor-free bristle application is production, in particular injection molding, of a brush head with passage holes for bristles. The bristles may then be guided through the passage holes and melted on a rear side, in particular to one another and/or to the brush head. Preferably, over-molding, in particular with at least one soft component, of the melted region and/or the brush head then takes place.

It is also conceivable to firstly produce a brush head with blind holes, for example by means of injection molding and/or by means of drilling the blind holes. In this case, bristles are in particular combined into bundles and melted and/or otherwise connected at one end. The brush head is then heated. Then advantageously, the bristle bundles can be inserted in the blind holes and anchored by means of pressing onto the brush head. In particular, the heated blind holes then deform so that the bristle bundles are anchored therein.

Alternatively or in addition to punched and/or welded and/or bonded bristles, molded-on bristles are conceivable. These may be produced in particular during a multicomponent injection molding process together with the application unit, the handle unit and/or the coupling unit, or be subsequently molded onto a base body of the application unit.

A further possible process for fitting bristles to the brush head is twisting in, whereby a cylindrical brush results. Here for example filaments are supplied from a roller, wherein in particular several filament strands are wound onto a roller. For supply to the machine, several rollers are pre-tensioned, then each filament in the brush corresponds to one filament strand. The filaments are correctly spread in width so that they have the width in which they are introduced into the brush. The filaments are pre-drawn such that they are then clear for the next step, i.e. a wire can be guided over them. Then a wire is supplied to the machine from a roller, i.e. unwound, and introduced into the process. The wire is cut to a length which is greater than the wound length of the twisted-in brush, wherein definitive trimming takes place after twisting in. The wire is bent into a U shape so that the open side can then be pushed over the filaments in order to thread the bristles in. The wire is held at the base of the U shape. Then the open wire end is clamped so that the filaments are held between the wire pieces. The filaments are cut to a length which is greater than the final length in the brush, so that when the filaments have been twisted-in, the brush can be cut correctly. The wire is twisted so that all filaments are clamped between the wire and thus fixed. After the filaments are fixed in the wire, they are cut to the correct length and profiled. After the brush part has been completed, the surplus wire is cut away.

Preferably, materials of injection-molded bristles do not undergo any material bonding with the other soft components and/or hard components of the oral hygiene device during an injection molding process, in particular a two-component and/or multicomponent injection molding process. Preferably, injection-molded bristles rather are connected to soft components and/or hard components by form fit, for example by means of at least one undercut and/or at least one breakthrough and/or at least one, at least partial over-molding, wherein in particular a contracting connection and/or shrink connection is conceivable. However, also a connection by means of at least one material bond is conceivable.

In principle, for all said possible injection molding processes, a single-component, two-component and/or multi-component injection molding is conceivable. The materials used, in particular different soft components and/or hard components, may here—as stated—be connected together by substance bonding and/or form fit. Also, it is possible to form hinged or movable or flexible connections by means of suitable injection molding steps. In principle, for example, hot channel processes, cold channel processes and/or co-injection processes may be used.

Alternatively or additionally to a brush head fitted with bristles, the application unit may also comprise at least one tongue cleaner and/or at least one alternative cleaning and massage element. These may each be formed from a soft component, a hard component or a combination of soft and hard components, and/or be produced and/or able to be produced advantageously by means of injection molding.

Preferably, injection-molded bristles are made at least partially and preferably completely from a thermoplastic polyurethane elastomer (TPE-U). Here, use of a modified polyurethane elastomer (TPE-U) is conceivable which in particular may be modified with respect to improved flow properties and/or rapid setting, in particular rapid crystallization, advantageously even at higher temperatures. Evidently also, however, other materials are conceivable, for example thermoplastic polyester elastomers (TPE-E), thermoplastic polyamide elastomers (TPE-A), polyethylene (PE), for example in the form of low-density polyethylene (LDPE) or linear low-density polyethylene (LLDPE) or similar. Materials for injection-molded bristles advantageously have a Shore D hardness of at least 0 and particularly advantageously at least 30 and/or at most 100 and advantageously at most 80. In particular, a Shore hardness of a material of injection-molded bristles is advantageously greater than a Shore hardness of other soft components used, for example for handle elements, massage elements, further cleaning elements or similar. The materials used for production of injection-molded bristles may be sustainable materials.

In principle, furthermore, a use of water-soluble polymers is conceivable, for example for hard components, soft components, injection-molded bristles or other elements of the oral hygiene device.

Also, for the hard components, soft components and/or material of injection-molded bristles, bio-plastics may be used which may be obtained in particular from renewable raw materials. Sustainable plastics and in particular bio-plastics may be biologically degradable, in particular compostable, and/or made of a recycled and/or recyclable material. Preferably, the material is formed in particular from a plastic. Preferably, the biologically degradable, in particular compostable, and/or recycled and/or recyclable material is formed from a bioplastic, in particular a plastic based on renewable raw materials and/or a biologically degradable plastic. The material may in particular be fossil-based and biodegradable, for example PVOH, PCL, PBAT, PET or PBS, be based on renewable raw materials and be biodegradable, such as for example PLA, PHA, cellophane or starch blends, or be based on renewable raw materials and be not biodegradable, such as for example Ca, bio-PE, bio-PP, bio-PA, bio-PET. Various bio-plastics which appear suitable to a person skilled in the art are conceivable, such as for example starch-based bio-plastics, cellulose-based bio-plastics, polyhydroxy alkanoates, such as in particular polyhydroxy butyric acid (PHB), polylactic acid (PLA), aliphatic and/or aromatic co-polyesters, or further bioplastics such as for example lignin-based bioplastics. Preferably, the application unit or handle unit may consist largely of a biologically degradable, in particular compostable and/or recycled material. Preferably, the oral hygiene device consists of only one component. In particular, the oral hygiene device comprises only a hard component. The material volume body of the application unit or handle unit may consist at least largely of the hard component. The hard component and/or the soft component and/or the material for injection-molded bristles here in particular consists of a bioplastic which may be obtained in particular at least partially from renewable raw materials. The raw materials here may in particular be maize, hemp, sugar, castor oil, palm oil, potatoes, wheat, sugarcane, rubber, wood, castor oil plant and similar. Corresponding possible materials may for example be cellulose, starch, lactic acid (PLA), glucose, chitin, chitosan or similar, from which in particular corresponding bio-plastics can be synthesized.

A "coupling unit" in this context in particular means a unit forming an interface for an in particular tool-less, manually releasable coupling of the application unit to the handle unit. The coupling unit in particular allows repeated coupling and decoupling of the application unit to/from the handle unit by a user. The coupling unit in particular serves for exchange of the application unit on the handle unit. A coupling may take place for example by means of a push movement, a turn movement and/or a combination of a push and turn movement. Preferably, the coupling unit comprises at least one first coupling element and at least one second coupling element corresponding to the first coupling element. Preferably, a first coupling element forms an interface receiver, while the second coupling element forms an interface protrusion. An "interface receiver" in this context in particular means a receiving region which is provided for captive receiving of an interface protrusion. Preferably, the interface receiver is provided in particular for receiving the interface protrusion by force fit and/or form fit. The interface receiver in particular forms a receiving region into which the interface protrusion can be inserted, in particular pushed, wherein the interface protrusion in particular latches and/or is clamped in the receiving region above a defined insertion force and/or after a defined insertion travel. Preferably, the interface receiver is arranged on a side of the application unit facing away from the brush head.

The coupling unit corresponds in particular at least approximately to a coupling unit as already disclosed in WO 2016/177580. The coupling unit described in publication WO 2016/177580 should therefore be regarded in particular as part of the disclosure of the present invention. In comparison with the coupling unit from WO 2016/177580, the coupling unit may in particular be an adaptation to a plastic-metal, plastic-ceramic, plastic-glass, plastic-organic material connection. Organic material is for example wood, cork, bamboo or similar. In particular, for example, other tolerances are required such that the assembly functions by interaction. Furthermore, a geometry may be simplified to allow production. Adaptation takes place in particular on the handle unit so that the same application unit can be used. Adaptation of a second coupling element of the coupling unit takes place in particular in order to guarantee producibility in materials other than plastic, because of the changed tolerance fields of processing, and in order to simplify the handle unit with no loss of reliability. In particular, complicated tolerance dependences may be relaxed. At a second coupling element of the coupling unit, in comparison with WO 2016/177580, in particular a foremost part may be shortened by 1.1 mm. Furthermore, in the second coupling element of the coupling unit, in comparison with WO 2016/177580, a rib may be provided wherein the rib in particular has an inlet chamfer along the longitudinal axis. The rib in particular replaces a horseshoe form, so that only the effectively supporting parts are structured. In a middle part of the second coupling element, in particular a conical slot is provided. The slot in particular has a conicity along the longitudinal axis towards the free end, widening by 0.5° per side. In a rear part of the second coupling element, in particular a snap catch is provided which is exposed. The exposure is in particular caused by production. For exposure, in particular a rectangle around the snap catch is set lower than the remaining interface geometry. Furthermore, in the second coupling element of the coupling unit, in comparison with WO 2016/177580, in particular a recess on the front side is filled and on the rear side, the body is formed only up to the recesses, and in particular reduced by approximately 0.5 mm. Thus the casting has in particular a dimensional jump. Said improvements allow easier connection or release of the application unit to/from the handle unit.

Alternatively, other connection possibilities for the coupling unit are conceivable. Connection of the application unit and the handle unit may take place for example by means of a screw fit or screw connection, wherein a thread is made in the application unit and the handle unit. The parts could therefore in particular be screwed together, without the thread in particular needing to be adapted to a handle design, so that in the end, the push-fit part stands in the correct orientation to the handle. Preferably, the application unit is screwed to the handle unit with a right-hand thread.

Alternatively, a push-and-snap connection for the coupling unit would be conceivable. A second coupling element may for example be inserted into the first coupling element along the longitudinal axis and finally snap-fitted for security. The snap-fitting may take place for example with a peg-recess geometry. Alternatively, a bayonet connection would be conceivable for the coupling unit. Connection could therefore take place in particular by insertion and turning, or by turning and snap-fitting. Alternatively, a press fit for the coupling unit would be conceivable. In particular, a friction-fit connection could be provided, wherein one coupling element forms a recess and one coupling element forms a peg.

The term "provided" in particular means specially programmed, designed and/or equipped. The phrase that "an object is provided for a specific function" in particular means that the object fulfils and/or performs this specific function in at least one application and/or operating state.

The handle unit is in particular usable repeatedly, i.e. it is not a single-use product. In particular, only the application unit is changed. In particular, the application unit with different properties may also be combined with the same handle unit. In particular, several different attachments on the same handle unit are conceivable, which can be interchanged as required. The oral hygiene device may in particular be sold as a set, such as for example with a holder/stand for storage of the application unit and handle unit, with the handle unit and with different application units, such as for example a push-on brush, an interdental push-on part and/or a tongue cleaner push-on part.

It is furthermore proposed that the at least one coupling unit has at least one first coupling element which is formed integrally with the application unit. Preferably, the first coupling element is formed integrally with the base body of the application unit. Preferably, the first coupling element forms an interface receiver. The first coupling element in particular delimits an interface receiver. The first coupling element is in particular arranged on a side of the application unit facing away from the cleaning region. Preferably, the first coupling element is arranged at an end of the neck region facing away from the cleaning region. The application unit in particular comprises a cleaning region and a neck region, wherein the first coupling element is arranged in the neck region. The term "integral" in particular means connected at least by substance bonding, for example by a welding process, an adhesive bonding process, an injection molding or over-molding process, and/or another process which appears suitable to the person skilled in the art, and/or advantageously formed in one piece, such as for example by production from one casting or by production in a single-component or multicomponent injection molding process, and advantageously from a single blank. Alternatively or additionally, a form-fit connection may also be provided between the coupling element and the application unit (e.g. by means of a press fit, friction fit, cone etc.).

In this way, in particular, an advantageous coupling unit may be provided. In particular, a number of components may be kept low. Furthermore, in this way, an at least partial integration of the coupling unit in the application unit may be achieved.

It is furthermore proposed that the at least one coupling unit comprises at least one second coupling element corresponding to the first coupling element and fixedly connected to the handle unit. The coupling unit is in particular provided for a rotationally fixed coupling of the first coupling element to the second coupling element. Preferably, the second coupling element is formed by an interface protrusion which protrudes at least partially out of the base body of the handle unit. The second coupling element is in particular arranged on a side of the handle unit facing the application unit. Preferably, the second coupling element is arranged on an end of the handle unit facing away from the lower end of the handle unit, i.e. it is arranged on the top end of the handle unit. Preferably, the second coupling element forms a part of the handle unit. In this way, in particular, an advantageous coupling unit may be provided. Furthermore, in this way, an at least partial integration of the coupling unit in the handle unit may be achieved.

It is furthermore proposed that the second coupling element of the coupling unit consists at least largely of a plastic, and is connected to the handle unit at least by form fit and/or substance bonding. The coupling unit may also consist of metal or ceramic. Preferably, the second coupling element is connected to the handle unit by means of a push fit and/or adhesive connection. Preferably, the handle unit has a recess and/or a protrusion at an end facing the application unit, in and/or on which the second coupling element is attached. The term "connected by form fit" in particular means that mutually contacting faces of components connected together by form fit exert on each other a holding force acting in the normal direction of the faces. In particular, the components are in a geometric engagement with one another. The term "connected by substance bonding" in particular means that the mass parts are held together by atomic or molecular forces, such as for example during soldering, welding, adhesive bonding and/or vulcanization. In this way, in particular, an advantageously variable production of the second coupling element can be achieved. In particular, an advantageously economic and flexible production of the second coupling element can be achieved. Furthermore, in this way, an at least partial integration of the coupling unit in the handle unit can be achieved. Alternatively or additionally, also a form-fit connection can be achieved between the coupling element and the application unit (e.g. by means of press fit, friction fit, cone etc.).

Because of the separate design of the second coupling element, the coupling unit may in particular be used for different handle units. Preferably, the second coupling element is configured separably, in particular for disposal of the handle unit. The handle unit in particular has an interface for firm connection to the second coupling element. The interface is preferably designed in the form of a blind hole. The second coupling element is in particular made of plastic, preferably in an injection molding process. The second coupling element is in particular configured identically with respect to its shape, in particular irrespective of its material design. When the oral hygiene device is produced, in particular the handle unit and the second coupling element are produced separately and mounted or joined together later. Mounting may take place in various ways which appear suitable to a person skilled in the art, wherein in particular a form of the transition from the second coupling unit to the handle unit at least partially pre-defines a mounting. Thus for example, for a screw fitting, the transition is designed perpendicular to a longitudinal axis. Mounting may furthermore take place for example by means of a press fit, by bonding, by means of a snap and/or catch connection, or by means of a screw connection. The connection between the second coupling element and the handle unit may in particular be designed so as to be fixed and inseparable, or exchangeable. In an inseparable connection, it would in particular be conceivable that the second coupling element in particular is only mountable once, wherein disassembly is only possible by destruction. A corresponding connection may be achieved for example by means of bonding or pressing. For a releasable connection, in particular it would be conceivable that separation is possible, for example for recycling or pushing on differently colored coupling elements. A corresponding releasable connection can be achieved for example by means of a screw connection. Differently colored second coupling elements may in particular bring the necessary distinction for a uniform handle color. Furthermore, it would also be conceivable that different second coupling elements are provided for differently designed coupling units, wherein the second coupling element is in each case configured identically on a side facing the handle unit, and only the interfaces for coupling to the first coupling element are designed differently. Thus in particular, different interfaces may be achieved with the same handle. In particular, a variability may be achieved over several different handles. Thus for example, with five different handle units and three different second coupling elements, already 15 product variants may be achieved. Alternatively or additionally, it would also be conceivable that an intermediate piece, in particular an interface part, is designed so as to be exchangeable.

It is proposed that the first and second coupling elements are preferably configured differently, so that during use of the first coupling element, forces are not exerted on the second coupling element which could weaken the corresponding coupling connection. This may be implemented with different connection or coupling methods. With proper use of the first coupling element (e.g. during separation or connection of the application unit), the force action or torque need not contribute to release of the connection, which is achieved by the second coupling element. For example, the first coupling may be achieved by means of a push fit, and the second screw coupling by means of a screw fit. For the same reason, also the same coupling methods may be used with different effects. For example, two turn connections in different directions, or two push-fit connections with different axial actions may be used.

It is furthermore proposed that the second coupling element of the coupling unit is formed integrally with the handle unit. In this way, in particular, an advantageous coupling unit may be provided. In particular, a number of components may be kept low. Furthermore, in this way, integration of the coupling unit in the handle unit can be achieved.

It is furthermore proposed that the at least one coupling unit has at least one second coupling element which is made from a metallic, ceramic, glass-like or organic material such as e.g. wood, cork or bamboo. Preferably, the second coupling element consists of the same material as the base body of the handle unit. In this way, in particular, an advantageously robust second coupling element can be provided. In particular, with the same accuracy of fit, a plurality of coupling processes with the application unit becomes possible.

The handle unit may comprise, as well as a coupling element, also a terminating element which is mounted. The handle unit is thus made in three parts. A base body provides the main part, while the coupling element is mounted at one end and a terminating element at the other end. The structure allows optimized termination of the handle unit, as well as the described optimized design of the coupling with the application unit. The processing of the base body of the handle unit may require that, for example, holding structures must be present for processing, which in the present case can now be concealed or covered with a terminating element.

Because of the three-part design, in particular many combinations of materials/substances are possible between the coupling element, base body and terminating element. Each of these parts may be made from one of the above-mentioned materials/substances. Thus the handle unit may be constructed in almost arbitrary material/substance combinations. Almost any material may be used for each part, and hence these combined with one another so as to achieve an optimum selection for each material combination of the handle unit, and also an optimum selection for each material combination of the handle unit with the material combination of the application unit.

It is also proposed that at least the base body of the handle unit consists at least largely of a metallic material. Preferably, the handle unit consists completely of a metallic material. The phrase “at least largely” in particular means at least 50% (by volume), advantageously at least 60%, preferably at least 70%, particularly preferably at least 80% and particularly advantageously at least 90%. Furthermore, in this context, a “metallic material” in particular means a technically applied metal and a technically applied alloy. Different metallic materials which appear suitable to a person skilled in the art are conceivable, such as for example a ferrous material and/or non-ferrous materials, such as in particular alloys based on copper, zinc, steel and/or aluminum. Preferably, the base body of the handle unit consists largely of only one metallic material, such as in particular an alloy, but it is however also conceivable that the base body of the handle unit consists of different metallic materials, wherein in particular different regions of the base body of the handle unit may consist of different metallic materials. Further materials or material combinations have been described above. In this way, in particular an advantageously durable handle unit may be provided, wherein the application unit in particular is designed to be exchangeable. Furthermore, an advantageously high robustness of the handle unit may be provided. Furthermore, a long usage period of the handle unit may be achieved, wherein in particular only the application unit need be changed. In this way, in particular, an ecologically advantageous oral hygiene device may be provided.

It is furthermore proposed that a handle unit is made in three pieces. A second coupling element is designed, furthermore an actual base body which takes up the majority of the volume of the handle, and a terminating element which forms the rear end of the body. In particular, the coupling element and the terminating element may be made of a metallic material or a plastic. Furthermore, in particular the base body may be made of a more valuable material such as for example ceramic, porcelain, glass, wood, cork, bamboo etc.

It is furthermore proposed that at least the base body of the handle unit is produced in a casting or diecasting process. In this way, in particular, an advantageous base body of the handle unit can be provided. In particular, an advantageously light base body of the handle unit may be provided which can be produced with precision. Preferably, the entire handle unit is produced in a diecasting process. Preferably, at least the base body of the handle unit, in particular the entire handle unit, is produced in a diecasting process, particularly preferably an aluminum diecasting process. During the diecasting process, in particular metal is cast, in particular pressed, into a predefined mold, in particular a diecasting mold, under high pressure and with very high mold filling speed. Subsequent removal from the mold must be taken into account in the design. Demolding guidelines with respect to undercuts must be observed. The demolding angles amount to more than 0.5°, preferably more than 1°. Undercuts should be avoided in the design as far as possible, since they entail complex casting tools in order to guarantee demoldability. However, other manufacturing methods for the handle unit which appear suitable to a person skilled in the art are conceivable. For example, the handle unit may be produced at least partially in a sintering process. Here, a molding is produced and sealed. Alternatively or additionally, the handle unit may be produced at least partially by means of a turning process. The handle unit should be produced as a turned part, in particular rotationally symmetrical to the longitudinal axis (or another axis). Alternatively or additionally, the handle unit may be produced at least partially by means of a material-removal process, for example a milling process. Here in particular, free forms are possible, wherein depending on form, production may be very time-consuming, which leads to a very costly product. Alternatively or additionally, the handle unit may be produced at least partially in a forming process or a pressing process. Here in particular, only a restricted forming is possible. Alternatively or additionally, the handle unit may be produced at least partially by means of an extrusion process. In particular, an extruded material may be produced as a base structure or longitudinal profile of the handle unit. Further processing is here necessary, in particular to achieve a suitable form. Also, a combination with a material-removal process, such as cutting, sawing, drilling and/or milling, would be possible for production of at least part of the handle unit and/or the second coupling element. Alternatively or additionally, the handle unit may be produced at least partially by means of an additive method, such as for example a 3D printing process. Preferably, the handle unit is produced at least partially in a 3D printing process. During the 3D printing process, material is applied layer by layer so as to produce a three-dimensional object.

When the handle unit is produced by means of diecasting, a gate mark or gate, and for example also a sprue or sprues, in particular for all production methods, preferably lies or lie in a region in which later the gate mark, gate or sprue is not functionally disruptive and furthermore not visually and haptically disruptive, or can be machined so as to be not disruptive. The gate mark and also the individual sprues usually in particular constitute a specific accumulation of material which for example, during later processing, may lead to optical differences or functionally does not have the same quality as the rest of the part. The gate mark preferably does not lie in a functional region, such as for example the second coupling element. The gate mark preferably does not lie in a haptically significant region, such as the thumb rest or the surface at the rear end of the handle part etc. Furthermore, because of the product design, it may in any case be necessary to carry out certain deburring work, for example at mold separation lines etc.

In a design of the handle unit, a gate mark/gate lies in particular on a mold separation line at the rear end of the handle, and for production reasons two gate marks are made symmetrically to one another. The sprues in this design are also arranged symmetrically at the front end of the handle unit in front of the coupling unit.

During the diecasting process for the handle unit, 1, 2, 3 or 4 gate marks and 1, 2, 3 or 4 sprues are created.

Preferably, the handle unit comprises a mold separation line caused by production. Mold separation lines occur in particular at the points at which different parts of a mold, in particular a casting mold, meet one another. Preferably, the shape, in particular the design, of the handle unit is matched to the course of the mold separation lines, so that the mold separation line forms part of the design. The mold separation line of the handle unit leads in particular around the base body of the handle unit, in particular in the longitudinal direction, wherein a mold separation line is also formed in particular in the openings of the handle unit if these extend from one side to the other, for example from the front side to the rear side, since different parts of a casting mold also meet one another at this point. In particular, the handle unit thus has a mold separation line on the outside of the base body, and a mold separation line in each opening. Preferably, the mold separation line has a constant course, wherein in particular round courses are free from steps. Preferably, the mold separation line is always arranged at the widest part of the body for demoldability. The mold separation line may be implemented directly as a “sharp” edge, i.e. the contacting surfaces meet at one point. Preferably, the mold separation line is however formed as a radius in order not to cause injury to the user during use. The radius, viewed in cross-section, is between 0.5 mm and 3 mm, preferably between 0.9 mm and 2.1 mm.

Preferably, the application unit also comprises a mold separation line. Preferably, the handle unit and the application unit are designed geometrically continuously. The tangents of the corresponding adjoining outer faces are substantially parallel. In particular, in this way, the mold separation line of the handle unit continues into the mold separation line of the application unit. The mold separation lines continue in particular over different materials. In this way, in particular, a design can be produced from one casting and no elements occur which could cause injury. The mold separation line may in particular be implemented as a design element.

A special design of the handle unit may be achieved with a design similar to that of WO 2007/030958 A1. The use of the production technology or tool design explained for plastics leads to a cavity being created in the product on the body with cores in the casting tool. By the use of this tool technology in casting tools, handle units are created which are heavier in terms of weight than comparable plastic products, and at the same time a voluminous body is created but nonetheless, due to the formation of cavities, material can be saved.

It is furthermore conceivable that structures and/or textures are created on the handle unit. In this way, in particular, different textures can be created. Different structures which appear suitable to a person skilled in the art are conceivable, such as for example grooves, ribs, studs and/or relief-embossed structures with any pattern. The structures may in particular already be recessed into or raised from a mold, in particular a casting mold. Shapings may be directly integrated in a primary forming of the handle unit. An additional separate forming process is also possible (e.g. by means of material-removal methods such as milling, or non-removal methods such as pressing or deforming).

It is furthermore proposed that the metallic material is formed by an alloy of copper, zinc, steel or aluminum. Preferably, the alloy is not magnetic. Preferably, an aluminum alloy is used. In this way, in particular, an advantageous base body of the handle unit can be provided. In particular, an advantageously light base body of the handle can be provided, which can be produced precisely. Preferably, the entire handle unit consists of the metallic material. The material selection may be influenced in particular by the manufacturing process. Certain manufacturing processes allow the use of materials for processing which later allow a preferred further treatment. For example, difficulties occur during anodizing of parts produced by diecasting and made from certain aluminum alloys, whereas with identical milled forms made from substantially pure aluminum, an alloy can be used which can be anodized better. The purpose of material selection is in particular to obtain a durable grip. In particular, pure materials or alloys are provided; in particular, there is no mixing of plastic and metal or alloy in individual material regions. The metallic material may in particular be produced both as a new material and also out of recycling material, such as for example coffee pods, aluminum cans etc. Also, a combination of new material and recycling material is conceivable. As an alternative to aluminum, other metallic materials which appear suitable to a person skilled in the art are conceivable, such as for example copper alloys, gold, silver, titanium, copper, zinc, chrome steel and/or steel. Sintered metals may also be used.

It is furthermore proposed that the metallic material comprises between 1% and 13% silicon, between 0.5% and 2% iron, and maximum 5% copper. Preferably, the metallic material comprises maximum 13% magnesium. Preferably, the metallic material comprises maximum 1% nickel. Preferably, the metallic material comprises maximum 5% zinc. In this way, in particular, an advantageous base body of the handle unit can be provided. In particular, an advantageously light base body of the handle unit is provided, which can be produced precisely. Different aluminum alloys which appear suitable to a person skilled in the art are conceivable. The aluminum alloy may for example be a first type comprising in particular 5% to 10% silicon, less than 2% iron, 2% up to 5% copper, less than 1% magnesium, less than 1% nickel, less than 5% zinc and/or less than 1% tin. The aluminum alloy of the first type in particular has a density from 2000 $kg/m^3$ to 3500 $kg/m^3$, preferably from 2400 $kg/m^3$ to 3000 kg/m$^3$. The aluminum alloy of the first type is in particular ideally suited for further treatment by means of dipcoating. Alternatively, the aluminum alloy may be of a second type, in particular comprising 8% to 13% silicon, less than 1.5% iron, 1% to 4% copper, less than 1% magnesium, less than 1% nickel, less than 2% zinc, less than 1% tin, less than 0.5% lead and/or less than 0.2% titanium. The aluminum alloy of the second type in particular has a density from 2000 kg/m$^3$ to 3500 kg/m$^3$, preferably from 2400 kg/m$^3$ to 3000 kg/m$^3$. Alternatively, the aluminum alloy may be of a third type, in particular comprising less than 1.5% silicon, less than 1.5% iron, less than 1% copper, less than 1% magnesium, less than 1% zinc and/or less than 1% titanium. The aluminum alloy of the third type has in particular a density from 2000 kg/m$^3$ to 3500 kg/m$^3$, preferably from 2400 kg/m$^3$ to 3000 kg/m$^3$. The aluminum alloy of the third type is in particular ideal for anodizing. Alternatively, the aluminum alloy may be of a fourth type, in particular comprising 1.5% to 3.5% silicon, less than 1.5% iron, less than 1% copper, less than 1% manganese, between 6% and 13% magnesium, less than 1% nickel, less than 1% zinc, less than 1% tin, less than 0.5% lead and/or less than 0.5% titanium. The aluminum alloy of the fourth type has in particular a density from 2000 kg/m$^3$ to 3500 kg/m$^3$, preferably from 2400 kg/m$^3$ to 3000 kg/m$^3$. The aluminum alloy of the fourth type is in particular easily polished and machined by material removal. Alternatively, the aluminum alloy may be of a fifth type, comprising in particular 1% to 3% silicon, less than 1% iron, less than 1% copper, less than 1% manganese, between 3% and 8% magnesium, less than 1% zinc and/or less than 0.5% titanium. The aluminum alloy of the fifth type has in particular a density from 2000 kg/m$^3$ to 3500 kg/m$^3$, preferably from 2400 kg/m$^3$ to 3000 kg/m$^3$. The aluminum alloy of the fifth type is in particular easily polishable and castable because of the high silicon proportion. Pure aluminum is a sixth type of possible metallic material. This consists substantially only of aluminum. This sixth type has in particular a density from 2000 kg/m$^3$ to 3500 kg/m$^3$, preferably from 2400 kg/m$^3$ to 3000 kg/m$^3$. For said material types, in each case the remaining percentage consists substantially of aluminum. In particular, it should be noted that, when the handle unit is produced by means of diecasting, the proportion of silicon is very important. The higher the silicon content, the more advantageous its effects in particular on the flow capacity and mold filling capacity. As the silicon content falls, the flow capacity worsens. Silicon is however in particular disadvantageous for further treatment, in particular by anodizing, and accordingly a balance must be found for the silicon proportion. In particular, depending on the metallic material used, other production processes are also conceivable for the handle unit.

Furthermore, alternative materials are also conceivable which can be produced in particular with other manufacturing methods. Various alternative materials which appear suitable to a person skilled in the art are conceivable, such as for example organic materials such as e.g. wood, cork or bamboo, stone, plastic, celluloid, glass, ceramic and/or porcelain. Alternatively or additionally, the handle unit may be constructed from several material components. Combinations of the above-described materials are also possible.

For example, different metals in particular provide different visual effects, in particular in surface treatment. Furthermore, different metals have different properties, and for example are also magnetic or non-magnetic. Furthermore, a combination of metals with over-molding with plastic would be conceivable. A magnetic handle unit in particular offers alternative storage possibilities, for example the handle unit may be suspended or stood magnetically.

It is furthermore proposed that the base body of the handle unit delimits at least one opening which extends completely through the base body, for example from the front side to the rear side, and which is completely surrounded by the base body in at least one plane, in particular parallel to a main extension plane of the handle unit. In this way, in particular an advantageously low material requirement can be achieved. In particular, an advantageously filigree handle unit can be provided. Preferably, the opening in the main extension plane of the handle unit is completely surrounded by the material of the base body. Preferably, the base body at least partially forms a ring, in particular a loop, which extends around the opening. Preferably, the opening is formed by a slot. In particular, the opening has a drop-like or lenticular cross-sectional form, in particular in the main extension plane. The slot is in particular oriented along the longitudinal axis of the handle unit. The base body in particular forms two lateral latitudinal webs which are connected at least at one end, in particular at a front end and a rear end, and surround the opening. The ring formed by the base body, in particular the loop surrounding the opening, is in particular closed. In particular, there are no open ends, such as for example fork-like designs. The ring, in particular the loop, may have widely varying cross-sections. Possible cross-sectional forms are circular, oval, elliptical, rectangular, diamond-shaped, triangular, polygonal, rhomboid, parallelogram-shaped, wherein the edges/corners forming in the longitudinal direction may be rounded or "sharp". The ring is in particular formed rounded or radiused on the outside, i.e. outside the opening. Furthermore, the cross-section may change over the longitudinal course and transform from one shape into a further shape, also repeatedly. The at least one opening serves in particular for saving material. The at least one opening is in particular arranged in the longitudinal direction. A number of openings may in particular amount to 1, 2, 3, 4, 5 or more, preferably one to three. The openings may be arranged at least partially perpendicularly to the longitudinal direction and next to one another. The opening may have widely varying cross-sections in a top view from the front. The shape of the opening in particular substantially corresponds to a shape of the loop. The cross-sectional form or the form of the opening may be constant in the longitudinal direction or have a change in the form of constrictions. A constriction may for example be used to make a thumb grip region slightly set back. Further possible cross-sectional forms are elliptical, diamond-shaped, parallelogram-shaped, rectangular, triangular. The corners and edges of the cross-sectional forms are preferably rounded, wherein the minimum radius amounts to 0.5 mm, preferably 1 mm. The edges/corners forming in the longitudinal direction, which for example form at the inlet to the opening, haves a radius of minimum 0.5 mm, preferably minimum 1 mm. In particular, furthermore, pointed transitions are possible. The at least one opening in particular has a width from 4 mm to 9 mm, preferably from 5 mm to 7.5 mm. The at least one opening in particular has a length from 10 mm to 60 mm, preferably from 25 mm to 50 mm. A ratio of the volume of the at least one opening to a volume of the at least one opening together with the handle unit is in particular from 0.3 to 0.7, preferably from 0.38 to 0.52. The at least one opening may also perform further functions. For example, it would be conceivable that the oral hygiene device can be suspended via the at least one opening, for example on a hook. In particular, the opening may furthermore serve to form the counter-piece for a holder. For example, it would be conceivable that a holder and the at least one opening are adapted to one another. Thus, for example, the oral hygiene device may be suspended from, laid in and/or placed on a holder via the opening. The holder may in particular be configured in various ways which appear suitable to a person skilled in the art, for example as a base which stands alone, and/or as a holding facility for accessories such as click-fit or catch-fit elements made of plastic, in particular made of soft components and/or hard components. At least one opening may also serve for fixing the oral hygiene device in the packing.

It is furthermore proposed that the handle unit has at least one thumb grip region, wherein the opening is arranged at least partially in the thumb grip region. Preferably, the base body of the handle unit forms a depression in the thumb grip region towards the opening. The depression is arranged at least on a front side of the base body of the handle unit. In particular, the opening is arranged at the lowest point of the depression. The depression is in particular formed concave. The thumb grip region is in particular formed by an interplay between the thickening and shape of the base body of the handle unit and the opening, wherein a dish for the thumb support is formed in the thumb grip region. The support face is formed by a ring of the base body surrounding a flank of the opening at the side of the opening, i.e. in particular on the inside. This means that the support face is formed by the flank which runs around the opening. In this way, in particular, an advantageous integration of the thumb grip region can be achieved. Furthermore, in particular, an advantageously filigree handle unit can be provided.

It is furthermore proposed that the base body of the handle unit delimits at least one further opening which is arranged along a longitudinal axis of the handle unit, behind the opening which extends completely through the base body and which is completely surrounded by the base body in at least one plane, in particular parallel to the main extension plane of the handle unit. This further opening is in particular arranged on a side of the opening facing away from the application unit. The opening and the further opening are in particular free from any connection. The opening and the further opening are in particular separated by the base body of the handle unit. Preferably, the further opening is completely surrounded by the material base body in the main extension plane of the handle unit. Preferably, the base body forms two rings, in particular loops, which extend around the opening and the further opening. Preferably, the further opening is formed by a slot. In particular, the further opening has a lenticular cross-section, in particular in the main extension plane. The slot is in particular oriented along the longitudinal axis of the handle unit. The further opening in particular has an identical orientation to that of the first opening. The base body in particular forms two lateral longitudinal webs which are connected together at least at one end, in particular at a front end and a rear end, and in the middle, and surround the opening and the further opening. The ring formed by the base body and surrounding the further opening is in particular closed. In particular, there are no open ends, such as for example fork-like designs. The ring which surrounds the further opening may have widely varying cross-sections. Possible cross-sectional forms are circular, oval, elliptical, diamond-shaped, triangular, polygonal, rhomboid, parallelogram-shaped, wherein the corners/edges formed in the longitudinal direction may again be rounded, as in the first opening. The ring is in particular formed rounded or radiused on the outside, i.e. outside the further opening. Furthermore, the cross-section may change over the longitudinal course and transform from one shape into another shape, also repeatedly. The further opening may have widely varying cross-sections in plan view. The cross-sectional form may be constant in the longitudinal direction or have a change in the form of constrictions. A constriction may be used for example to make a thumb grip region slightly set back. Further possible cross-sectional forms are elliptical, diamond-shaped, parallelogram-shaped, rectangular, triangular. The corners and edges of the cross-sectional forms are preferably rounded, wherein the corner/edges formed in the longitudinal direction may be rounded or "sharp". In this way, in particular, an advantageously lower material requirement may be achieved. In particular, an advantageously filigree handle unit may be provided.

It is furthermore proposed that the base body of the handle unit delimits at least two openings which are arranged lying next to one another perpendicularly to the longitudinal direction, extend completely through the base body and are completely surrounded by the base body at least in a plane, in particular parallel to the main extension direction of the handle unit. The openings are in particular arranged on a side facing away from the application unit. The openings are in particular free from a connection. The openings are in particular separated by the base body of the handle unit, wherein the base body forms a rib along the main extension direction. Preferably, the openings are completely surrounded by the material base body in the main extension plane of the handle unit. Preferably, the base body forms a ring, in particular a loop, which is divided by a rib along the longitudinal axis and extends around the openings. Preferably, the openings are formed by a slot. In particular, the openings, in particular in the main extension plane, have a lenticular and/or banana-shaped cross-sectional form. The respective slot is in particular oriented along the longitudinal axis of the handle unit. The two openings in particular have an identical orientation in the main extension direction, but are however formed as mirror images relative to the main extension direction. The base body in particular forms two lateral longitudinal webs which are connected together at least at one end, in particular a front end and a rear end, and which together with the rib surround the openings. The ring formed by the base body with the rib surrounding the further opening is in particular closed. In particular, there are no open ends, such as for example fork-shaped designs. The actual ring and also the rib which surround the openings may have various cross-sections. Possible cross-sectional forms are circular, oval, elliptical, diamond-shaped, triangular, polygonal, rhomboid, parallelogram-shaped, wherein the corners/edges forming in the longitudinal direction may again be rounded, as described for the first opening. The ring is in particular rounded or radiused on the outside, i.e. outside the further opening. Furthermore, the cross-section may change over the longitudinal course and transform from one shape into another shape, also repeatedly. The openings may have widely varying cross-sections in plan view. The cross-sectional form may be constant in the longitudinal direction or have a change in the form of constrictions. A constriction may be used for example to make a thumb grip region slightly set back. Further possible cross-sectional forms are elliptical, diamond-shaped, parallelogram-shaped, rectangular, triangular. The corners and edges of the cross-sectional forms are preferably rounded, wherein the corner/edges forming in the longitudinal direction may be rounded or "sharp". In this way, in particular, an advantageously lower material requirement may be achieved. In particular, an advantageously filigree handle unit may be provided.

Furthermore, in particular, various possibilities are available for marking the handle unit. The marking may in particular be made directly in the material, for example by means of a recessed or lowered and/or raised or relief text and/or logo. In particular when produced by casting or material-removal methods such as e.g. milling, marking directly on the material in particular does not constitute a problem. Alternatively, the marking may also be formed by interrupted or different surface treatment, i.e. by the regional omission or different use of surface treatment and/or a targeted surface treatment only in the region of the marking. The marking may for example be etched. Alternatively, the marking may be made by printing or embossing. A printed marking may however be less suitable for durability since it is less permanent. Marking may in particular be made in the handle region. When the handle unit is formed with loops, the marking may in particular be made on the inside or outside of the loops of the base body of the handle unit. The orientation of the marking is preferably towards the front side; however, it is also possible towards the rear side or in both orientations. In particular, various positions and orientations which appear suitable to a person skilled in the art are possible. The dimensions, in particular the length and width of the marking, are in particular dependent on a design and the space on the base body. When the marking is designed as a relief or depression, the relief or depression in particular has a height or depth from 0.2 mm to 0.8 mm, preferably from 0.3 mm to 0.6 mm.

It is furthermore proposed that the handle unit, at least viewed in a plane parallel to a main extension plane of the handle unit, has an at least approximately figure-of-eight shaped base form. Preferably, at least in a plane parallel to a main extension plane of the handle unit, the handle unit has at least approximately the form of an infinity symbol (∞). The base body of the handle unit forms a figure-of-eight. The base body in particular forms two rings, in particular loops. Each of the rings, in particular loops, has an opening in the middle, in particular the opening and the further opening. The ring surrounding the opening, in particular the loop, is in particular smaller, in particular narrower and shorter, than the ring surrounding the further opening, in particular the loop. In particular, the opening is smaller than the further openings. Between the two loops of the base body of the handle unit, in particular, a node is formed at which the two loops are connected. The position of the node relative to the overall length of the handle unit, in particular along the longitudinal axis of the handle unit, lies at 60 mm to 80 mm, preferably 65 mm to 75 mm, measured from the free end. The position of the node relative to the total length of the handle unit, as a percentage of the total length of the handle unit, lies in particular between 35% and 55%, preferably between 40% and 50% measured from the free end. Preferably, the cross-sections of the loops of the base body of the handle unit are at least similar, wherein the loops may transform into a further shape, for example at their ends or at the node. The loops each have a closed contour. The base body of the handle unit furthermore has a width from 4 mm to 8 mm, preferably from 5 mm to 7 mm. Furthermore, the base body of the handle unit in particular has a height from 4 mm to 20 mm, preferably from 6 mm to 15 mm. In particular, the base body of the handle unit has a course in the longitudinal direction. The base body of the handle unit, in particular along the course, has a minimum height of 7.6 mm and a maximum height of 12.9 mm. The handle unit in side view has a bent, in particular a curved longitudinal form. On the rear side, the handle unit has in particular support points at the free end and in the region of the second coupling element, for laying down on a surface. In principle however, any other shape for the longitudinal form of the handle unit, which appears suitable to the person skilled in the art, would be conceivable, such as for example undulating or rectilinear.

In an embodiment of the handle unit in aluminum/aluminum alloy, the handle unit in particular has a weight from 20 g to 40 g, preferably from 25 g to 35 g. The oral hygiene device in this case has a weight from 20 g to 45 g, preferably from 28 g to 38 g. Preferably, in this case, a ratio of the weight of the handle unit to a weight of the oral hygiene device lies between 0.75 and 0.95, preferably between 0.85 and 0.93.

When the handle unit is made from zinc and/or a zinc alloy, the handle unit in particular has a weight from 50 g to 105 g, preferably from 65 g to 92 g. In this case, the oral hygiene device has a weight from 50 g to 110 g, preferably from 70 g to 95 g. Preferably, in this case, a ratio of the weight of the handle unit to a weight of the oral hygiene device lies between 0.80 and 0.98, preferably between 0.92 and 0.97.

In principle, a design of the handle unit with metals/metal alloys is 2 to 10 times as heavy as the same design in plastic.

Preferably, the handle unit forms a thickening in front of the interface, so as to give an optimal transition from the slender design of the handle unit to the application unit. Furthermore, in particular an advantageous form of the handle unit may be provided. In this way, in particular, an advantageously low material requirement may be achieved. In particular, an advantageously filigree handle unit may be provided.

Alternatively, the handle unit may also have a number of loops differing from two. A design with several loops and nodes is conceivable. In particular, the handle unit may have 1, 2, 3, 4, 5, 6, 7, 8 or more loops. The longitudinal axes of the individual loops or individual openings may stand at an angle to one another in the longitudinal direction, wherein the angle of the respective longitudinal axes of the loops or openings stand at an angle of maximum 45° to one another, preferably at an angle of maximum 30°, and most preferably at an angle of maximum 20°.

Alternatively, it would also be conceivable that the handle unit has only one loop, giving in particular an O-shaped handle unit. Thus in particular only one ring is formed without nodes. The ring may in particular be looped and have a constriction of the opening in the middle region. The cross-sections of the base body may here in particular be at least approximately identical to a design with several loops. A ratio of the volume of the at least one opening to a volume of the at least one opening together with the handle unit, in a corresponding design, amounts in particular to between 0.4 and 0.8, preferably between 0.45 and 0.6. Alternatively, a continuous flat form of the handle unit would be conceivable, wherein the second coupling element and/or a transition to the second coupling element thickens to varying extents. In particular, a flatter form may be produced, wherein the height of the frame is reduced at least in the vicinity of the interface.

The oral hygiene device in particular has several support points for laying the oral hygiene device down in a plane. A defined positioning can be achieved in particular both for the handle unit without the application unit and also for the entire oral hygiene device. In both cases, the device is supported in particular at least partially at the same points. The handle unit has support points in the rear region and also in the region of the coupling unit. The at least one rear support point is situated along the longitudinal axis, in particular at most 35 mm away from the free end, preferably at most 25 mm from the free end. The at least one rear support point is in particular formed by a spot-like or linear face, in particular transversely to the longitudinal axis. When the handle unit is designed with at least one opening, the handle unit in particular has two rear support points on an axis running transversely to the longitudinal axis. The two rear support points in particular lie in a straight line and provide good stability at rest. The at least one from support point in particular lies in a region of the coupling unit, in particular in a transition from the handle unit to the application unit. When the oral hygiene device is in assembled state, the rear support points are in particular identical and lie in the same region relative to the handle unit without the application unit. The position of the at least one front support point however changes, in particular because of the push-on part. The oral hygiene device in the assembled state has in particular support points with two different properties. In particular, there is at least one support point on the handle unit and at least one support point on the application unit. There is therefore in particular at least one support point on metal and at least one support point for example on plastic or another material described above.

It is furthermore proposed that the base body of the handle unit is designed at least substantially rotationally symmetrical with respect to a longitudinal axis of the handle unit. In this way in particular it can be achieved that the base body of the handle unit can be produced at least partially by turning. In particular, the use of rotary transfer machines is conceivable. In particular, an advantageously filigree handle unit can be provided. If the second coupling element is produced integrally with the handle unit, the second coupling element may be produced in a downstream mechanical treatment process, such as for example punching, pressing, milling, forming or similar. If the second coupling element is made from a material different from that of the handle unit, a blind hole may be made in the longitudinal direction in an end face of the base body of the handle unit, for example by turning and/or drilling, into which hole the second coupling element, in particular made of plastic, may be introduced. The handle unit may in particular be trimmed by sawing, milling, punching, turning etc. A maximum diameter of the handle unit in particular amounts to 10 mm to 20 mm, preferably 12 mm to 16 mm. If the handle unit has a waisting, a minimum diameter of the handle unit, in particular in the waisting, is between 7 mm to 15 mm, preferably from 9 mm to 12 mm. When produced with a rotationally symmetrical design, the handle unit may have a various forms which appear suitable to a person skilled in the art. The base body of the handle unit may be cylindrical. The base body of the handle unit may have a conical or tapering form, wherein the tip of the cone lies in particular in the region of the free end. The base body of the handle unit has a waisted form, in particular at least one waisting is formed.

It is furthermore proposed that the base body of the handle unit is formed at least substantially frustoconical. Preferably, the base body has a greater diameter on a side facing the coupling unit than on sides facing away from the coupling unit. A free end of the base body of the handle unit facing away from the coupling unit is in particular rounded, wherein the diameter is in particular from 7 mm to 15 mm, preferably from 9 mm to 12 mm. In this way, in particular, a handle unit can be provided which is advantageously simple to produce. In particular, it may thus be achieved that the base body of the handle unit can be produced at least partially by turning. Furthermore, in particular, an advantageously filigree handle unit can be provided.

Also, in particular in all embodiments, it is conceivable that additional elements are provided on the base body of the handle unit. For example, plastic elements of at least one soft and/or hard component are conceivable, which are inserted or engaged in the base body, in particular the metal handle. One condition for this, in particular, is a corresponding recess in the base body of the handle unit. Alternatively, the handle unit may also been laid in an injection molding tool and at least partially over-molded with plastic.

The plastic element may for example perform the function of a thumb grip. Moreover, it would also be conceivable for the plastic elements to be exchangeable. Thus, in particular, different colors and/or different geometries may be used to achieve a distinction between different oral hygiene devices. In this way, in particular, a multicomponent structure can be achieved with parts made of metal and parts made of plastic, which in particular allows advantageous ergonomics. Similarly, also other materials or material combinations described above may be provided or used.

Furthermore, however, this also achieves a separability. Before disposing of the handle unit, in particular plastic parts or other materials can be removed again and recycled separately or disposed of correctly. Alternatively, it would also be conceivable that a plastic element is drawn over the base body of the handle unit. This may take place in particular in layers so that the base body is partially covered with a plastic layer. The plastic layer (preferably a soft component) may in particular be configured so as to be exchangeable, similarly to a balloon or condom, or not exchangeable. The plastic layer may have more material at an opening where the base body is introduced, such as for example an annular thickening which serves for anchoring on the base body. The annular thickening may in particular be introduced into a provided circumferential groove on the base body. In this way, a better retention can be achieved such that the soft component layer does not simply slip off. Thus in particular, different colors can be achieved. Alternatively, the plastic element may be designed as a ring, wherein the plastic ring is drawn over the base body. The cross-section of the plastic ring may be flattened, in particular rectangular, so that the plastic ring holds directly on the surface of the base body. Alternatively, the cross-section of the plastic ring may be circular. The plastic ring is in particular provided to be arranged in a groove the base body, in order to retain its position during use or avoid rolling off, for example. Alternatively, an additional element may also be introduced into a specifically designed recess in the base body of the handle unit. The additional element may for example be made of stone, glass, ceramic, organic material (e.g. wood, cork or bamboo), plastic, minerals, diamonds, crystals and/or a further metal. The connection technology is in particular dependent on a material. Depending on the material, the additional element may be for example click-fastened by means of a form fit and/or force fit, or masticked in place, as could take place for example for a plastic element. The additional element may for example also be fixed via a separate holding part, which again may be coupled, in particular releasably, to the base body of the handle unit. Alternatively, a connection may take place via an adhesive. Alternatively, the in particular individual additional element may also be cast in a standard geometry and inserted in the base body. Furthermore, the additional element may also be cast directly in the base body, or alternatively the base body may be cast around the additional element. For a material with a higher melting point, the additional element may in particular be directly overmolded, wherein the handle unit in particular has a lower melting point than the additional element which is overmolded.

Furthermore, the invention proposes the handle unit for the oral hygiene device. The handle unit in particular forms a unit which is separable from the application unit, and in particular can be used with various application units. The handle unit is in particular provided for an exchange of application units.

The invention furthermore proposes a method for production of the handle unit. It is proposed that at least one base body of the handle unit is preferably made at least largely from a metallic material, while alternative materials have been described above. Preferably, the entire handle unit is made of a metallic material, preferably an alloy. The base body of the handle unit is in particular made of aluminum or an aluminum alloy. In this way, in particular, an advantageously durable handle unit can be produced. Furthermore, an advantageously high robustness of the handle unit may be achieved. Furthermore, in particular, an advantageous center of gravity of the handle unit may be achieved. In particular, an oral hygiene device may be provided which sits advantageously well in the hand. Furthermore, a high usage duration of the handle unit may be achieved.

It is furthermore proposed that at least the base body of the handle unit is produced in a diecasting process. In this way, in particular an advantageously lightweight and precise base body of the handle unit can be produced. Preferably, the entire handle unit is produced in a diecasting process. Preferably, at least the base body of the handle unit, in particular the entire handle unit, is produced in an aluminum diecasting process. During the diecasting process, in particular metal is cast, in particular pressed, into a predefined mold, in particular a diecasting mold, under high pressure and with a very high mold filling speed. The casting pressure is here preferably between 300 bar and 1200 bar. The strength of the produced body is greater with a higher casting pressure. The gate marks/gates or also the sprue or sprues may require further treatment. Firstly, depending on method, a gate system may be taken from the tool together with the product and must then be removed. This can usually be separated mechanically. Furthermore, irrespective of process, further treatment of the gate marks/gates or also sprue or sprues is required, for example to refine the surfaces and remove any rough points or visually disruptive points. Furthermore, because of the product design, it may in any case be necessary to carry out certain deburring work, for example at mold separation lines etc.

It is furthermore proposed that a surface of at least the base body of the handle unit is anodized in at least one later treatment step. Anodizing here in particular constitutes a method of surface finishing for creating an oxidic protective layer on the aluminum. In particular, an anodic oxidation takes place. Here in particular, in contrast to galvanic coating processes, the protective layer is not deposited on the workpiece but an oxide and/or hydroxide is formed by conversion of the top metal layer. In particular, an oxide layer is produced with a layer thickness from 5 μm to 30 μm, preferably from 15 μm to 25 μm. A coloring of the base body of the handle unit may take place in particular during or after anodizing in the later treatment step. In this way, in particular, an advantageous surface treatment for the handle unit can be provided. In particular, a high surface quality can be achieved. Furthermore, anodized parts can be recycled in particular without special treatment.

A further process from the range of anodic processes which can be used is emataling. In a special electrolyte with titanium compounds, a very compact, opaque oxide layer is built up on the treated body. The surface is highly wear-resistant, smooth and almost pore-free. In this way, complex workpieces can be homogenously coated. The layer thicknesses depend on the alloy and lie in the range from 5 μm to 30 μm, preferably from 15 μm to 25 μm. With emataling, coloring cannot take place directly, i.e. there are no color options.

Alternatively or additionally, various coatings and/or surface treatments of the handle unit are conceivable which appear suitable to a person skilled in the art. A coating and/or surface treatment of the handle unit should, in particular visually, present no interruptions in the surface regions which can normally be seen and touched. To apply the coating however, the component must be held, wherein holding takes place in particular in visually concealed regions, such as for example in the region of the interface and/or of the second coupling element, since these regions will later be covered by the application unit during use. Alternatively, the handle unit may also for example be held in visually less exposed areas in the region of the opening. The holding points usually form irregularities in the coating. Either no coating is applied at the holding points, or an irregular coating is formed, for example with interruptions or the accumulation of surplus material. Furthermore, various positions of the at least one coating and/or surface treatment are conceivable. In particular, it is conceivable that different zones are provided with different surface treatments or coatings. Thus for example, plastic multi-components may be replaced by different surface finishes. In particular, a grip may be differently structured in different regions of the handle in order to allow optimum holding. Thus for example, it would be conceivable that the second coupling element is polished or not surface treated and not coated, while other parts of the handle unit have a different surface roughness. Alternatively, it would be conceivable that the handle unit in principle has a high-gloss polish, while the thumb grip region and/or back face is provided with a rough surface.

Preferably, in at least one later treatment step, a surface treatment of the handle unit is carried out in order to create a defined surface quality of the handle unit. The surface treatment is usually carried out before coloring. In particular, the surface treatment serves at least to generate a surface roughness with an Ra value of 0.006 to 3.2, preferably from 0.006 to 0.8. A possible surface treatment is in particular ball polishing. In ball polishing, the handle unit is treated with ceramic bodies, polishing bodies or steel balls. Treatment with ceramic bodies removes roughness peaks in order to create a finer, shiny surface. By means of polishing bodies and the use of additional pastes, it is possible to achieve very fine or low surface roughness values. The run times and choice of pastes are in particular dependent on the starting value and material of the workpieces. In treatment with steel balls, the surface is also compacted and resistance to corrosion is improved. This treatment is particularly suitable for achieving an economic, shiny surface. A further possible surface treatment is in particular barrel polishing, in particular barrel finishing. In barrel finishing, also called barrel polishing, the handle unit is set into a rolling movement in a working container, in particular with polishing bodies. Friction with the polishing bodies smoothes the handle unit, and by the choice of the right machine and agents, the surface finish can be controlled so as to achieve the desired result. In particular, the composition and size of the polishing bodies is selected according to the desired material removal, in particular for the edges, the surface roughness and grinding pattern. Both a gloss and a matt finish can be achieved. A further possible surface treatment is in particular etching. Etching refers in particular to the removal of material in the form of depressions on the surface of organic or inorganic materials by the use of etching substances. By protecting individual parts of the surface of the handle unit by a mass which is not susceptible to the etching agent, such as in particular an etching ground or cover lacquer, arbitrary patterns can be produced. In particular, the entire surface may be coated with an etching ground, wherein then this is removed in places again using suitable needles, pens or other tools. Thus in particular, drawings can be produced on the handle unit. If different graduations or tones are to be achieved in the etching, and therefore individual lines cut more or less deeply, then after the etching fluid has worked for some time, the image components which are not to be etched further are covered using brushes and liquid etching ground. For etching, this is usually a solution of etching ground in turpentine oil. After drying, in particular, the next etching process takes place. This method is in particular called graduated etching. A further possible surface treatment is in particular blasting. During blasting, in particular shot-blasting and/or sand-blasting, the surface is treated with different blasting agents which are directed onto the handle unit at high speed, for example by means of air, liquid or magnetism. This compacts the surface of the handle unit and also hardens the surface. Also, in this method, surfaces can be cleaned, chipped, matted and/or finished, inter alia. A further possible surface treatment is in particular brushing. In this chipping production method, the material is removed manually or mechanically by corresponding grinding agents and a rubbing motion, in order to achieve the desired surface structure. Then the polished materials are finished with various colors, for example by the anodizing process, and protected against corrosion and scratches. In particular when brushing metal or aluminum, fine, matt or structured services can be produced for a high quality appearance. A further possible surface treatment is in particular electro-polishing and/or plasma polishing. Electro-polishing is one of the material-removal production processes. More precisely, in particular it falls under electrochemical material-removal processes with external power sources. In an electrolyte which is specifically matched to the material, metal is removed anodically, i.e. the metallic workpiece forms the anode in an electrochemical cell. Plasma polishing is similar to the process of electrolytic polishing, but works with ecologically harmless salt solutions. A further difference lies in the considerably higher voltage which leads to a plasma film around the workpiece, whereby another action mechanism leads to material removal. A further possible surface treatment is in particular polishing, in particular laser polishing. By the removal of thin layers of the surface, very small burrs, particles, unevenness and contamination are removed. This achieves a high strength of the material and lower adhesions, with clean and shiny results.

Preferably, the handle unit is coated in at least one further treatment step. A coating in particular has layer thicknesses from 0.001 mm to 0.5 mm, preferably from 0.01 mm to 0.03 mm. A possible coating process is powder coating. Powder coating is in particular an extremely resistant and versatile coating system, in which electrically conductive metals are coated with powder paint. A further possible coating method is in particular galvanizing, such as for example chroming. During galvanizing, current is conducted through an electrolytic bath. The metal to be applied, such as for example copper or nickel, is located at the positive pole or the anode, while the object to be coated, in particular the handle unit, is located at the negative terminal, the cathode. By means of an electrical current, metal ions are deposited on the handle unit by reduction. Depending on the process, at the same time the anode dissolves or the metal ions are extracted from solutions with a finite substance quantity. Thus the object to be coated is evenly coated with the metal all over. The longer the object is in the bath and the higher the electrical current, the thicker the metal layer, such as for example the copper coating. In order to be able to apply such layers successfully, the substrate must be pretreated. Further possible coating processes are for example zinc coating, enameling, chroming, gilding and/or silvering. For silvering, in particular widely varying processes are conceivable such as for example vapor deposition and/or currentless silvering. A further possible coating process is in particular painting, such as for example dipcoating by means of electrophoresis or spraying. For example, electrochemical dipcoating is conceivable. In principle, we distinguish between anodic and cathodic electro-dipcoating. Both dipcoating processes are electrochemical painting processes. The product to be painted is dipped into an electrically conductive watery dipcoat, and a DC voltage field is applied between the product and a counter-electrode. The basic principle of electro-dipcoating is that water-soluble binding agents are deposited on the surface of the product connected as an electrode, and thus a closed adhesive paint film is generated. Capillary processes expel the process bath water almost completely out of the paint film. Alternatively for example, cathodic dipcoating is conceivable. In cathodic dipcoating, the paint is deposited because of chemical conversion, or coagulation, of the binding agent. This is implemented in particular at DC voltages from 200 to 260 V, by an electrical current flow from an external electrode or anode, via the conductive paint, to the product which acts as a cathode. The applied current causes hydroxide ions to form on the cathode, which neutralize the binding agent and hence bring about coagulation.

In particular, a plastic coating is applied by means of an immersion bath or by means of spraying (with air). The plastic coating may be applied directly onto the handle unit, i.e. for example directly onto the casting, or it may be applied onto a previously applied coating. In both cases, the additional plastic coating is functionally responsible for, inter alia, suppressing material diffusion through the surface. With a plastic coating, it may be necessary to specifically harden the paint. Hardening may take from three to twelve, preferably from five to nine minutes. During this time, the painted unit, e.g. the handle unit, is exposed to a temperature from 150° C. to 300° C., preferably from 180° C. to 250° C. This ensures an optimum adhesion and durability of the paint. Plastic paints which are subjected to this treatment are for example based on polyester. The paints used are preferably suitable for contact with foodstuffs.

Possible problems in later treatment of the handle unit may be for example that a slippery, smooth handle is produced. This may be resolved in particular by a targeted surface roughness. Furthermore, subsequent coating may adversely affect the recyclability of the handle unit. Dip-coated handle units for example must be washed before recycling so as to remove the coating before recycling.

Furthermore, later treatment may create further properties. For example, an antibacterial coating of the handle unit would be conceivable, for example by means of silver. It would also be conceivable that silver is only applied partially, for example in the interface region, in particular if the application unit is not often removed and the coupling unit is thus not often cleaned.

The oral hygiene device according to the invention should not be restricted to the applications and embodiments described above. In particular, the oral hygiene device according to the invention, in order to fulfil a function described herein, may comprise a number of individual elements, components and units which differs from the number cited herein, and/or comprise an arbitrary sensible combination thereof. Also, with the value ranges given in this disclosure, values lying within said limits are also considered disclosed and may be used arbitrarily.

Evidently, the embodiment variants shown in this specification are exemplary. Within the context of the invention, the individual forms and elements of these embodiment variants may be combined with other embodiment variants without leaving the scope of this invention.

DRAWINGS

Further advantages arise from the following description of the drawings. The drawings show eight exemplary embodiments of the invention. The drawings, description and claims contain numerous features in combination. The person skilled in the art will where applicable also consider these features individually and combine them into further sensible combinations.

Figure 1B:
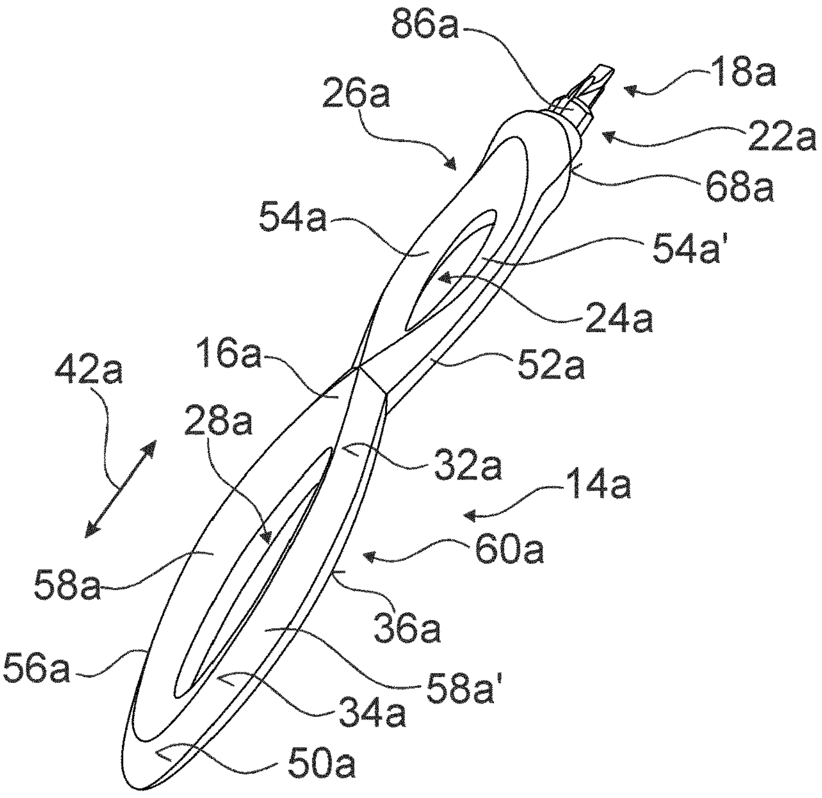
Figure 1C:
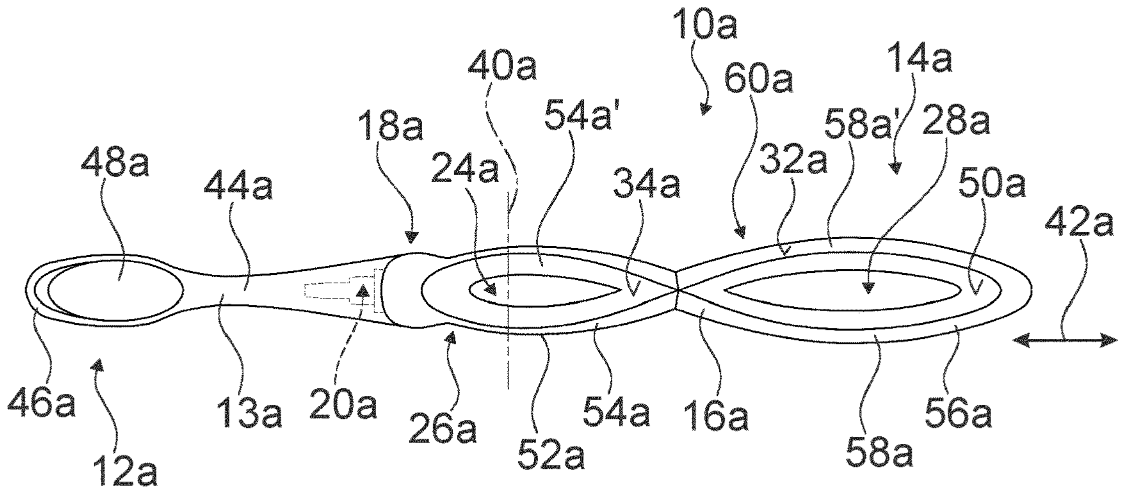
Figure 1D:
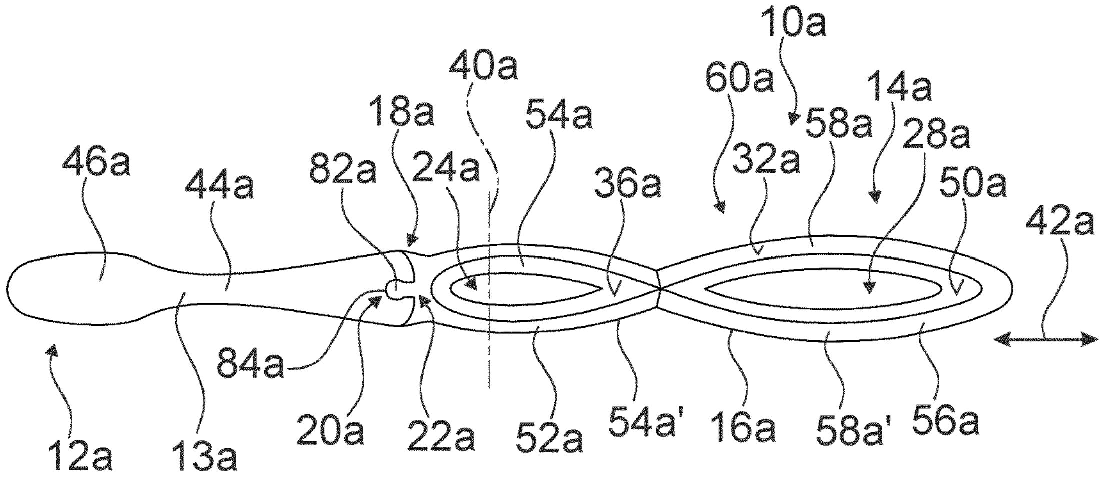
Figure 1E:
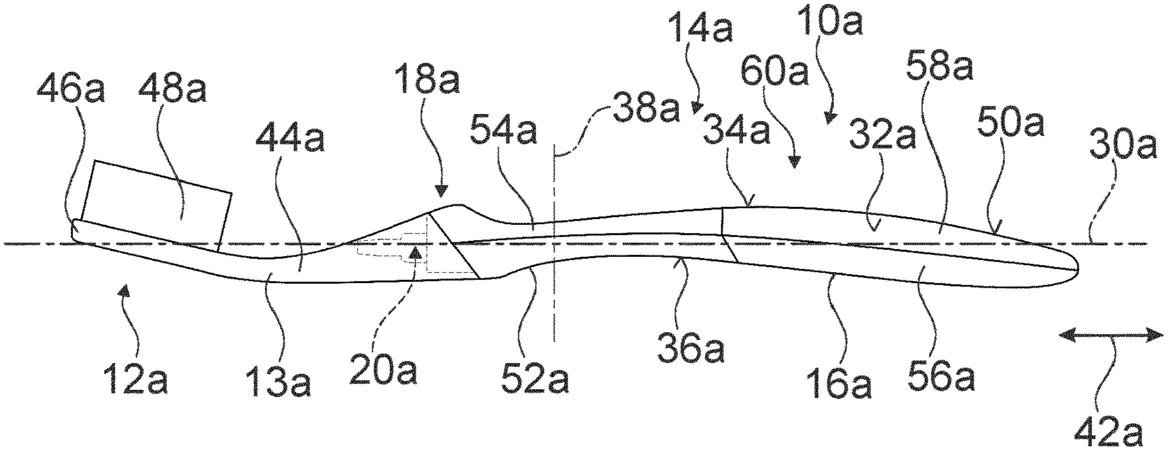
Figure 1F:
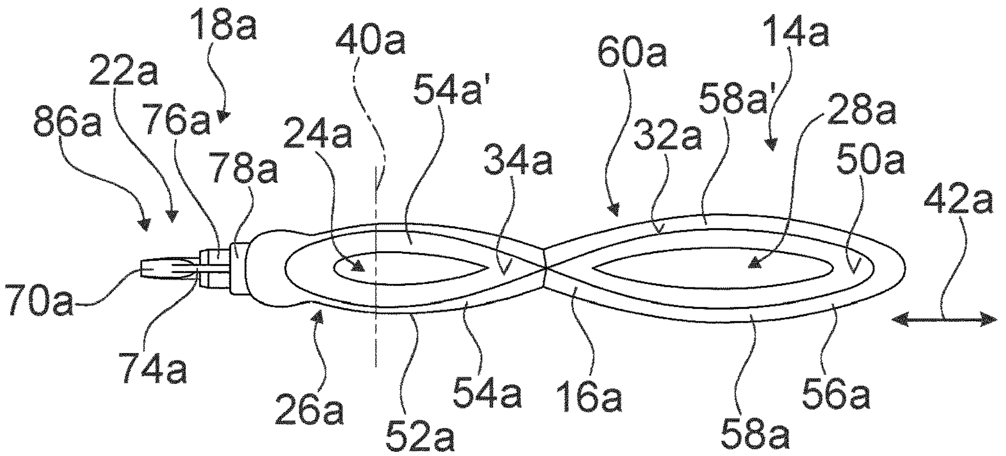
Figure 1G:
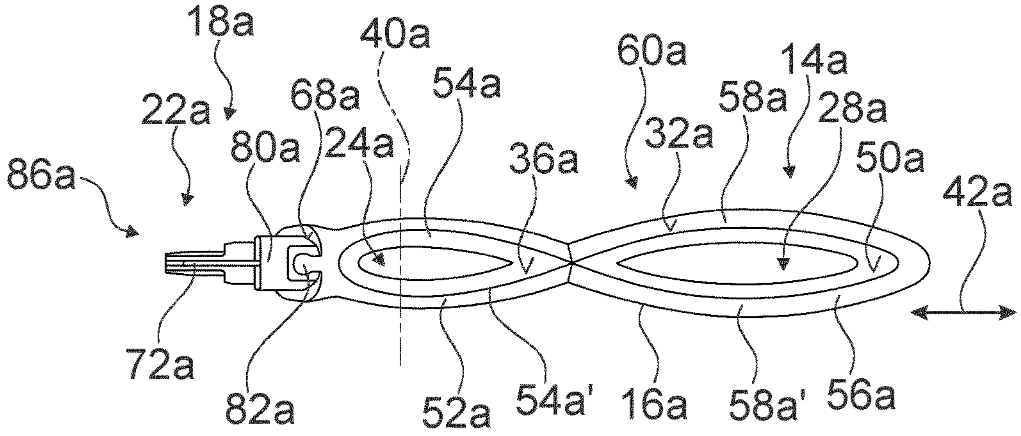
Figure 1H:
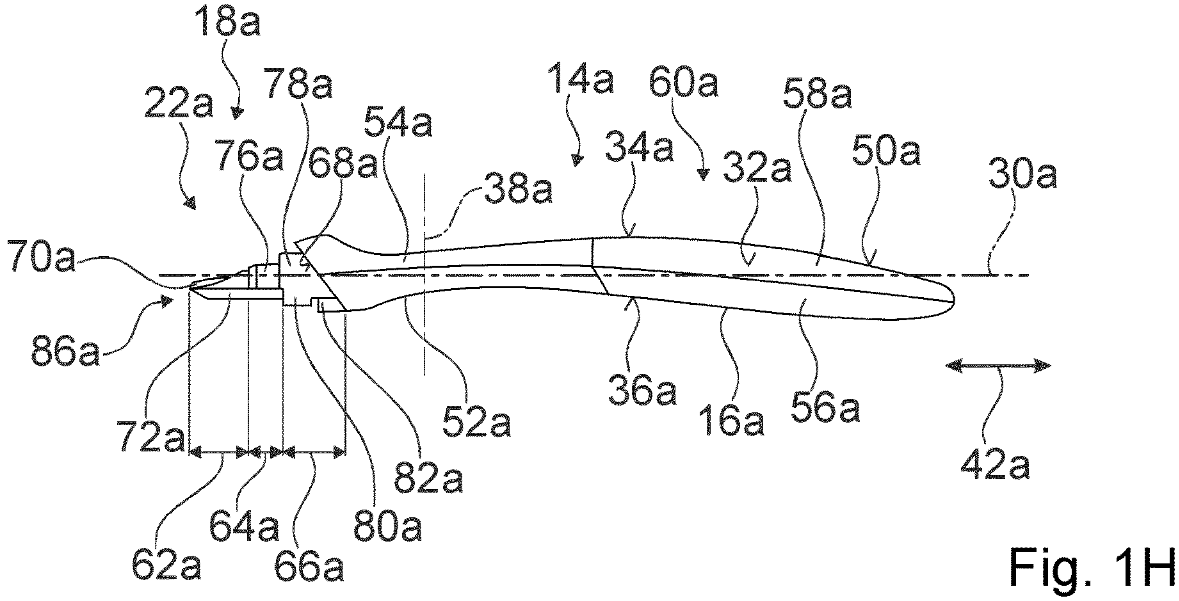
Figure 2A:
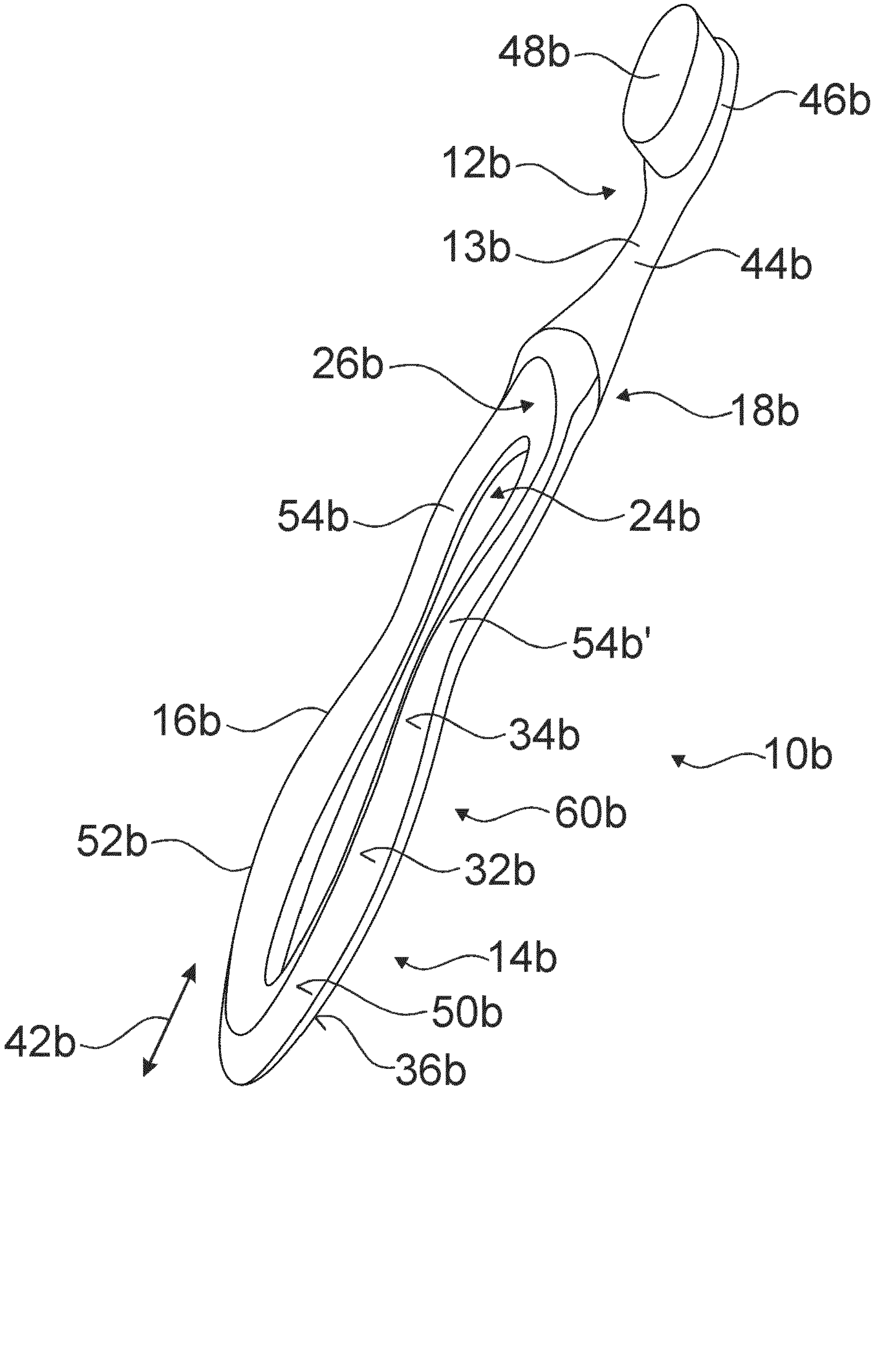
Figure 2B:
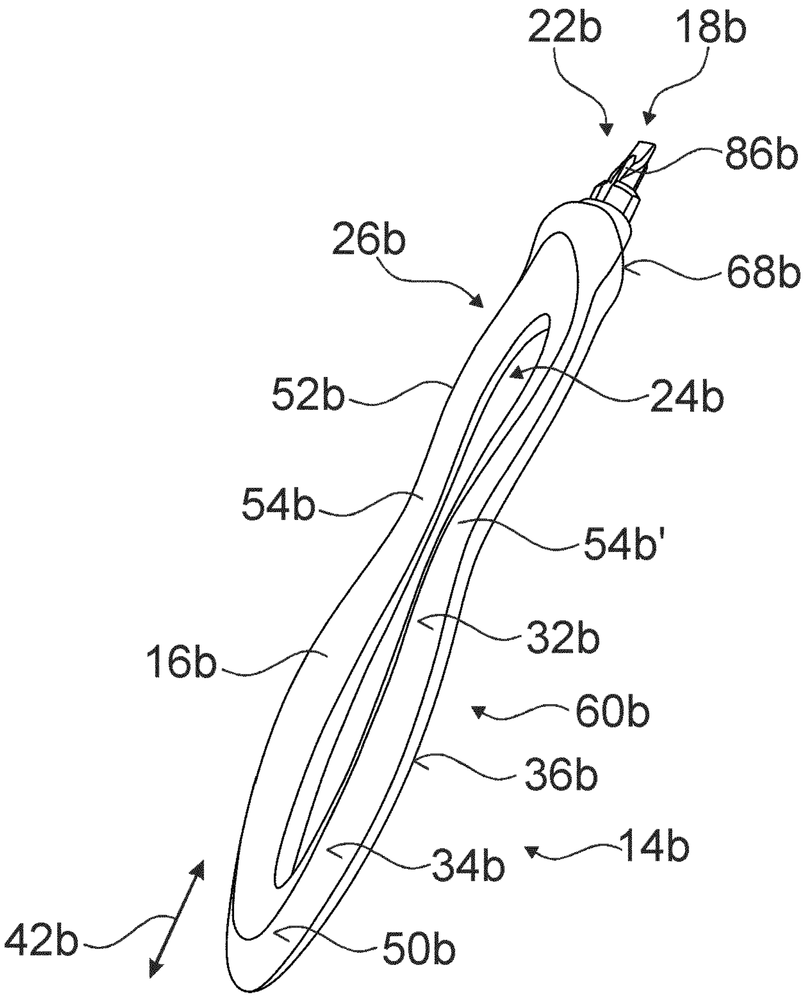
Figure 2C:
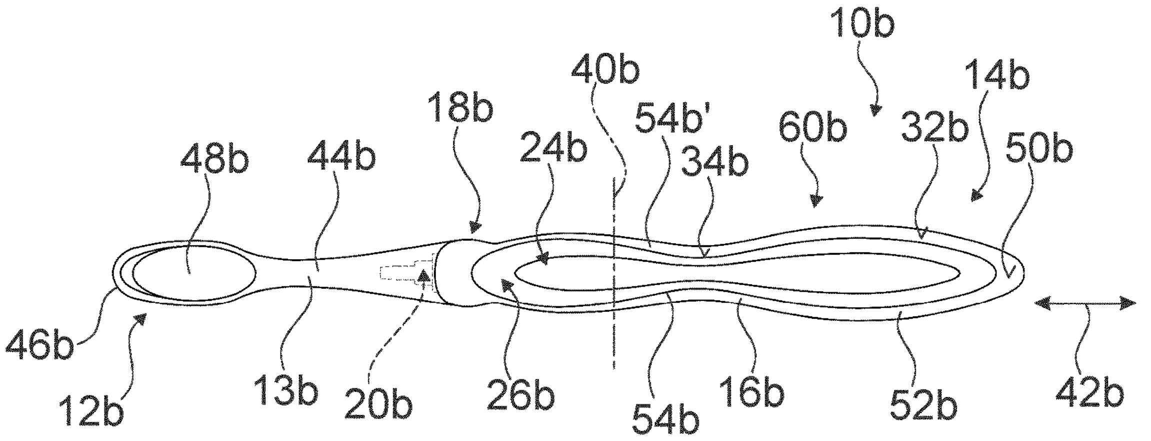
Figure 2D:
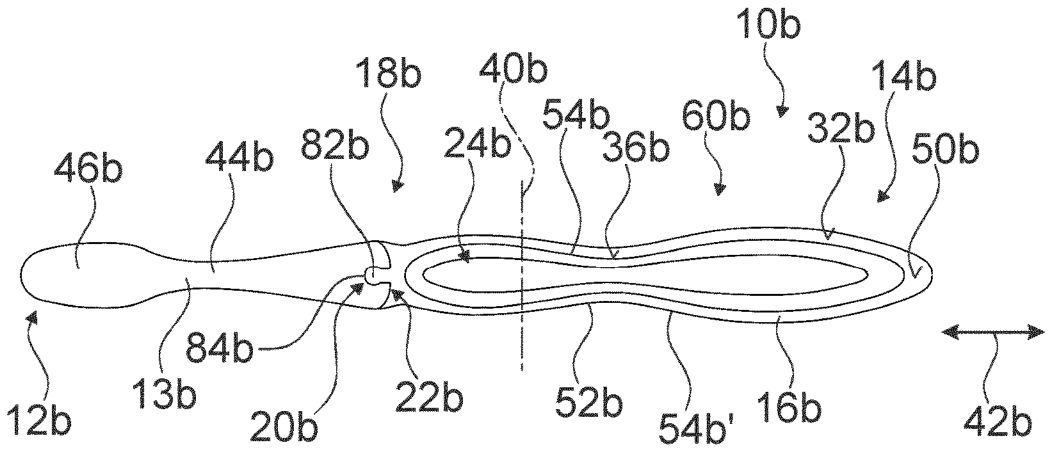
Figure 2E:
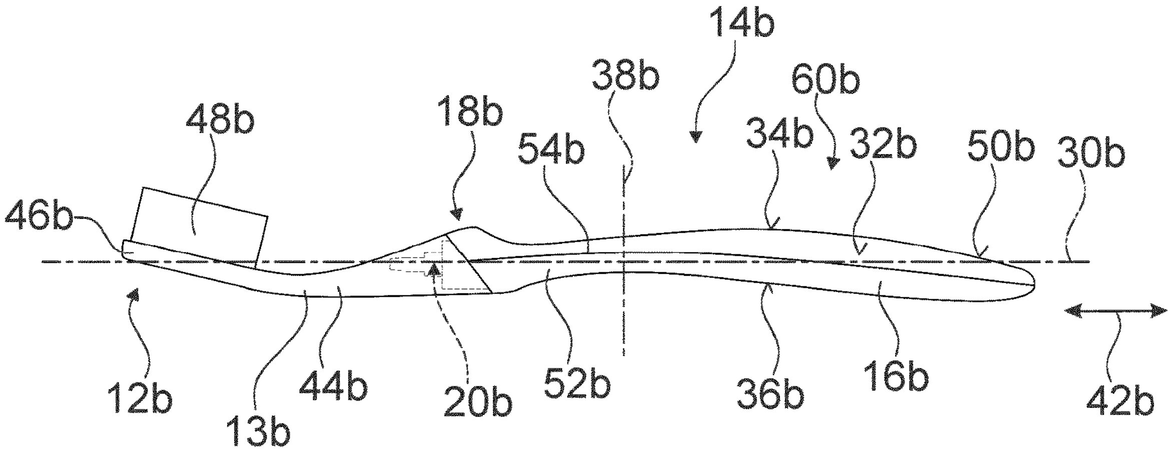
Figure 2F:
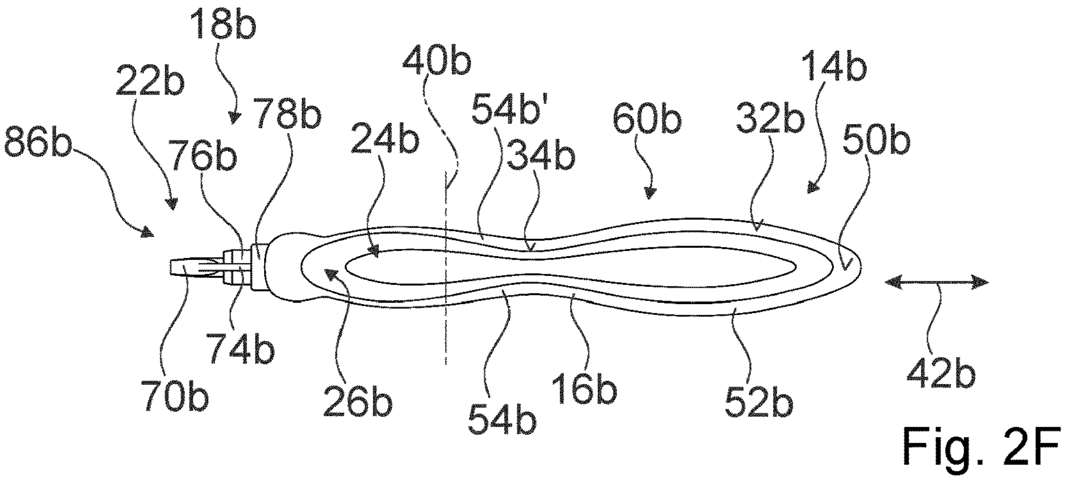
Figure 2G:
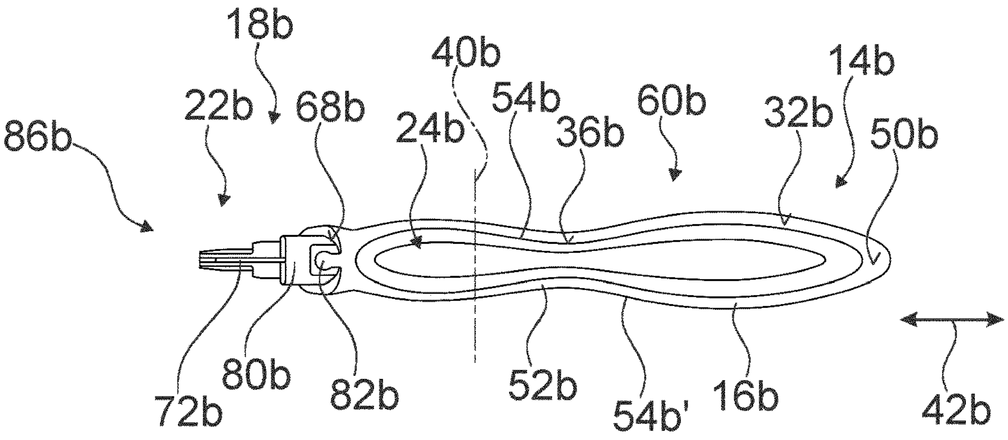
Figure 2H:
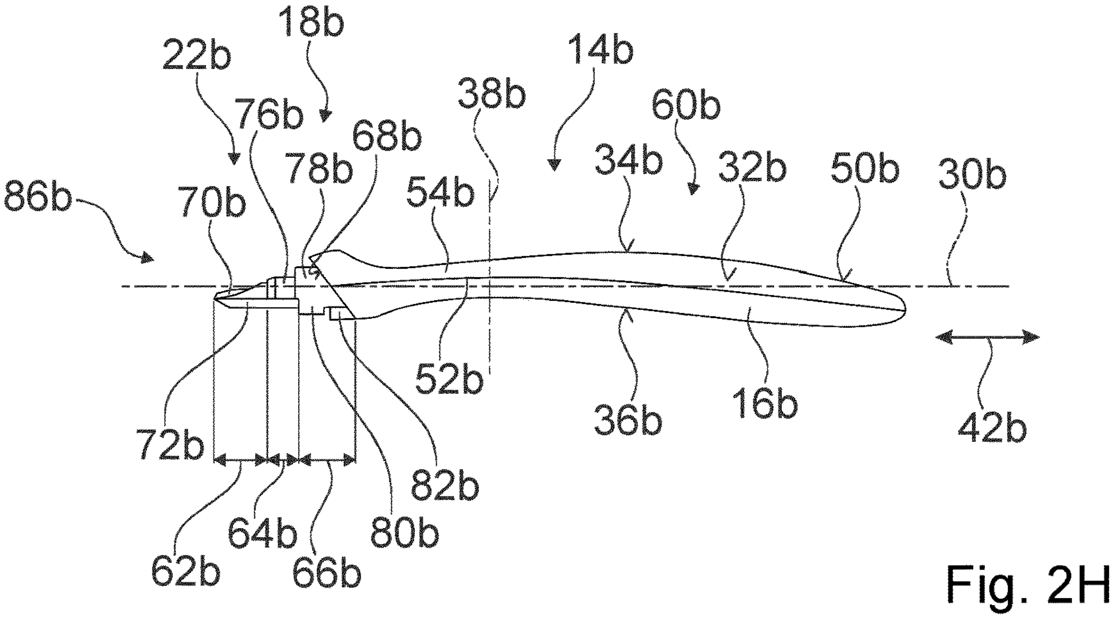
Figure 3A:
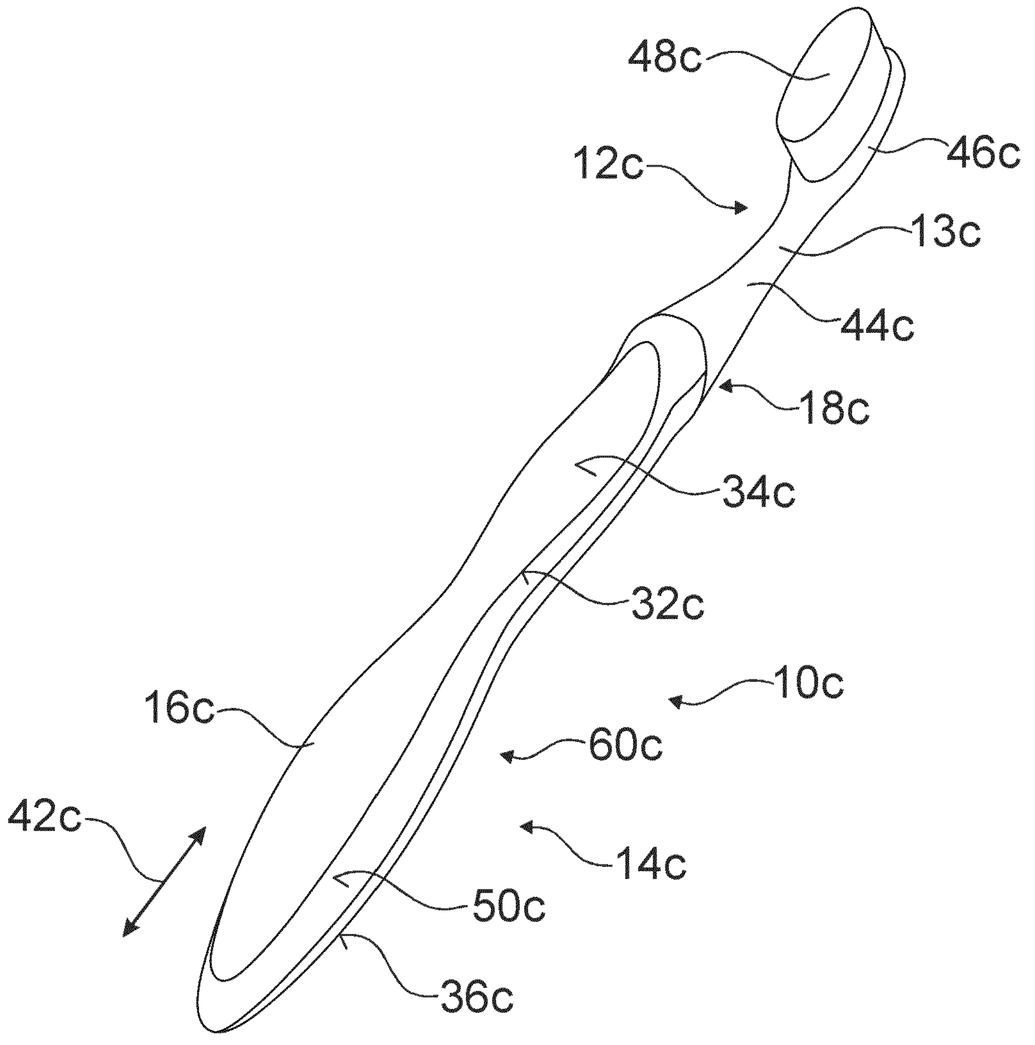
Figure 3B:
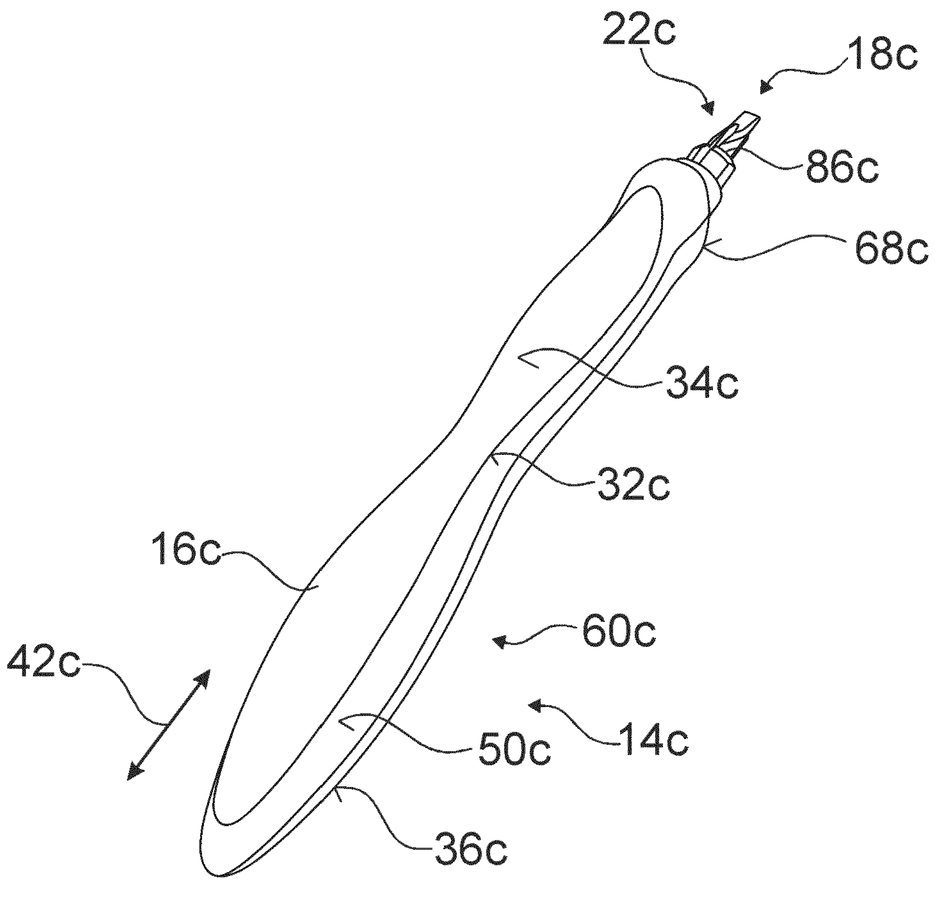
Figure 3C:
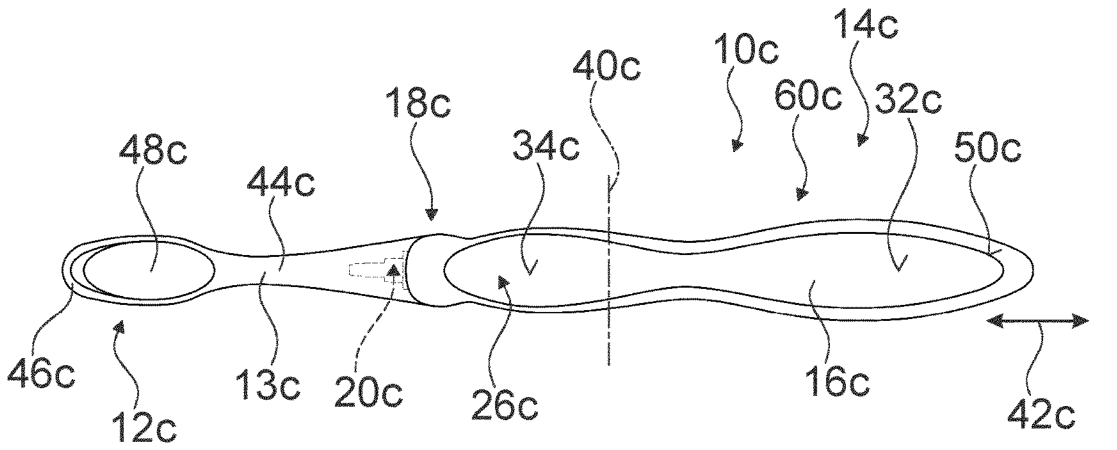
Figure 3D:
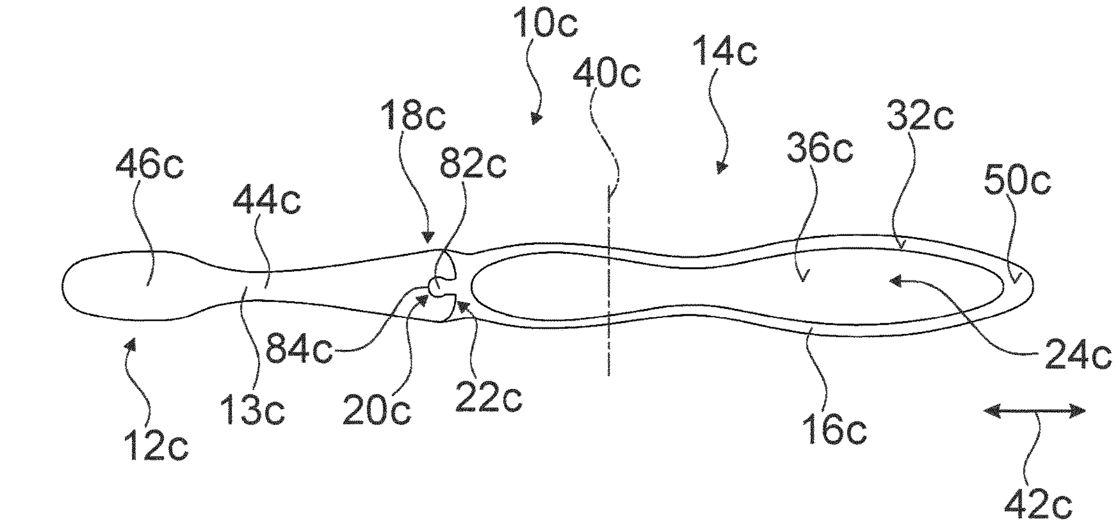
Figure 3E:
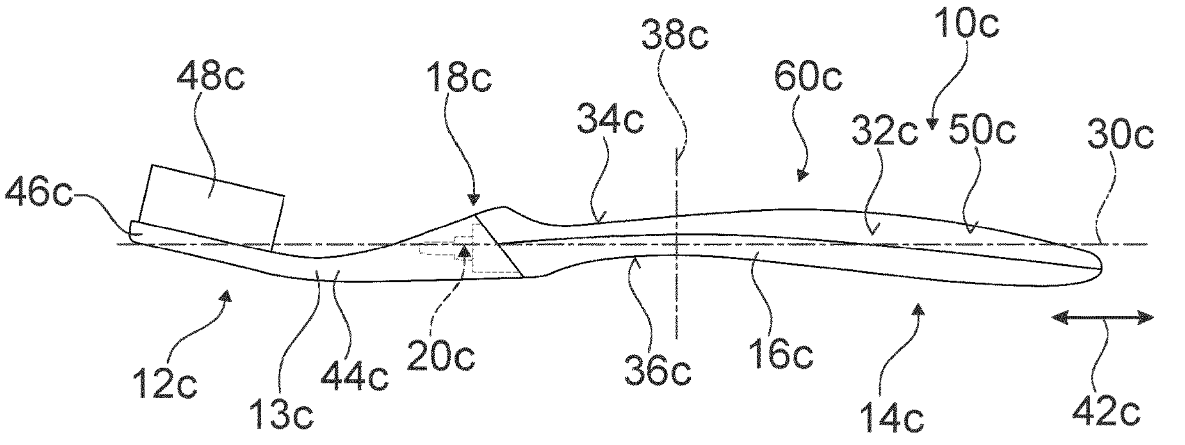
Figure 3F:
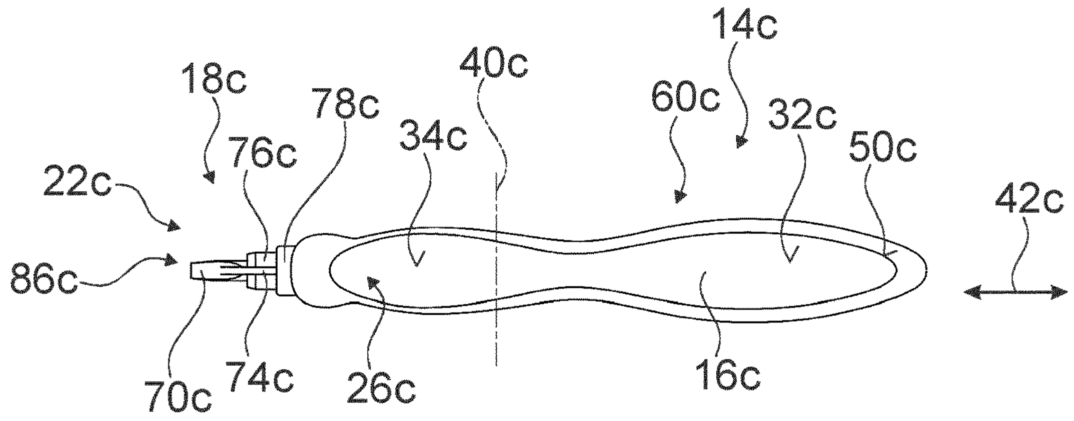
Figure 3G:
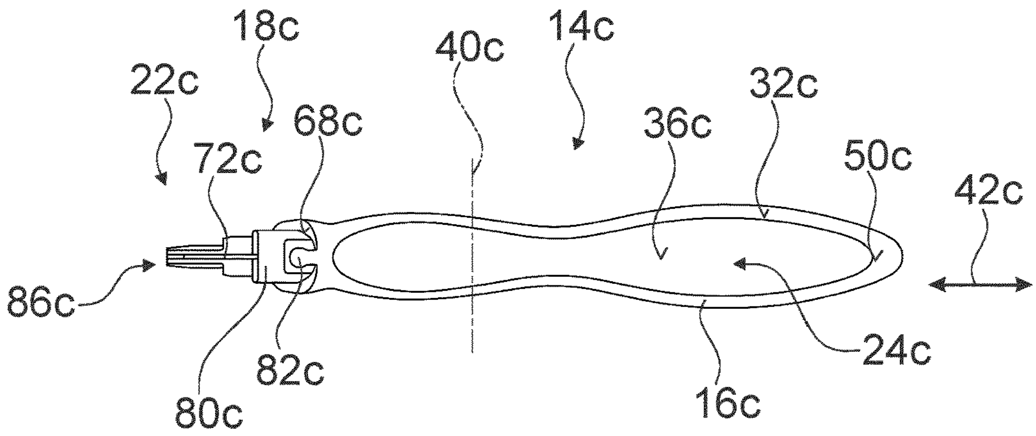
Figure 3H:
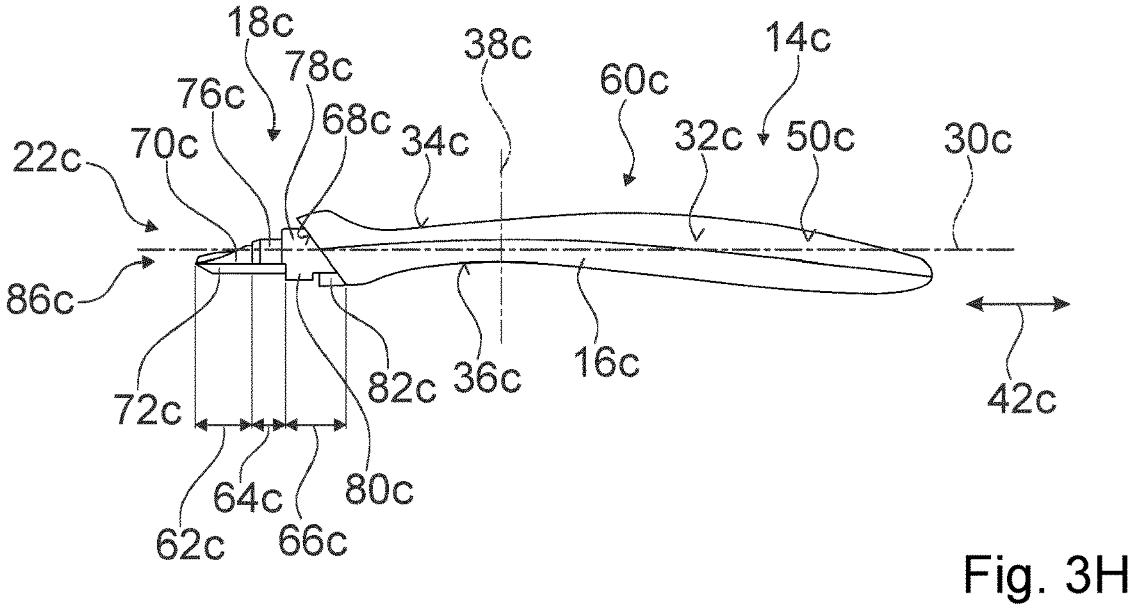
Figure 4A:
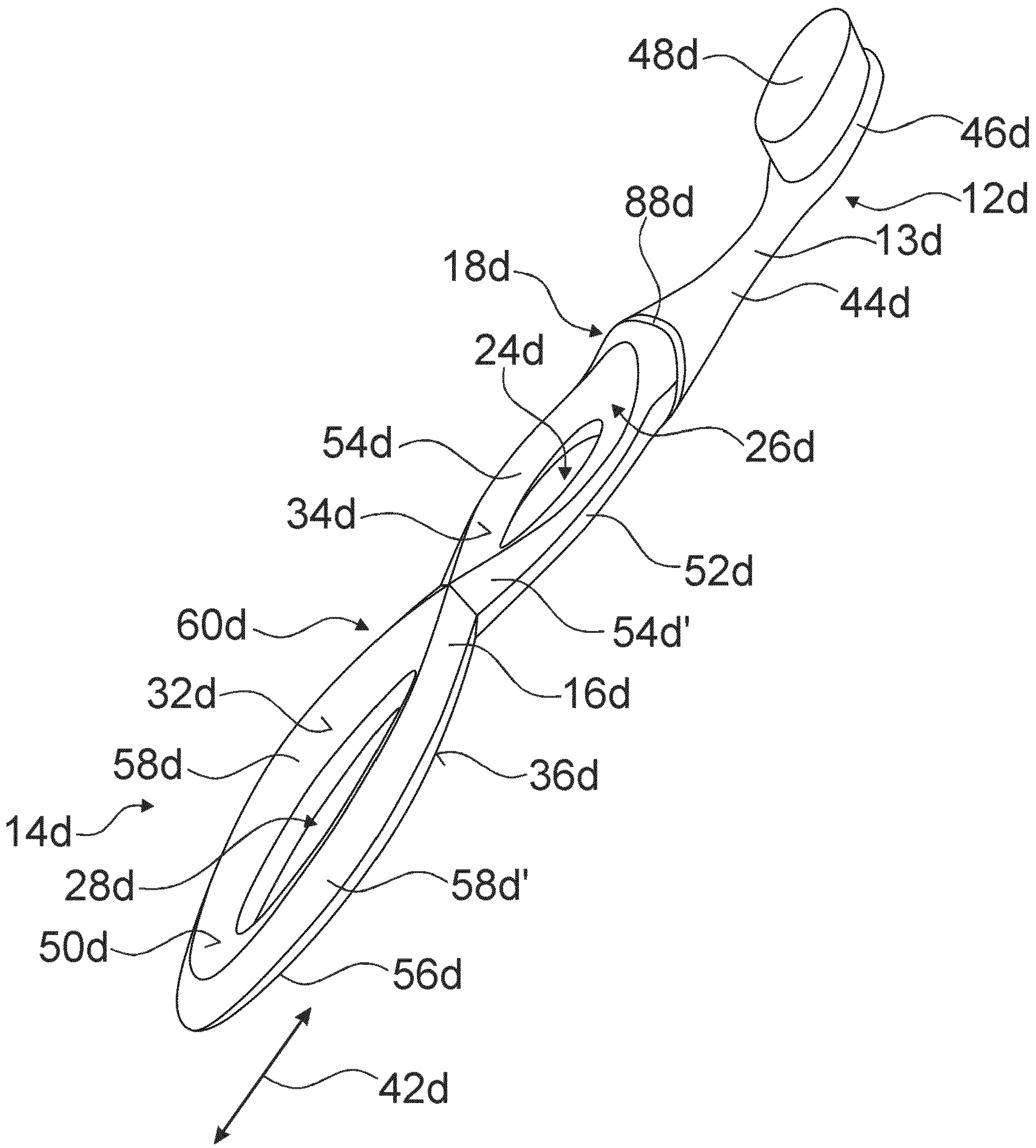
Figure 4B:
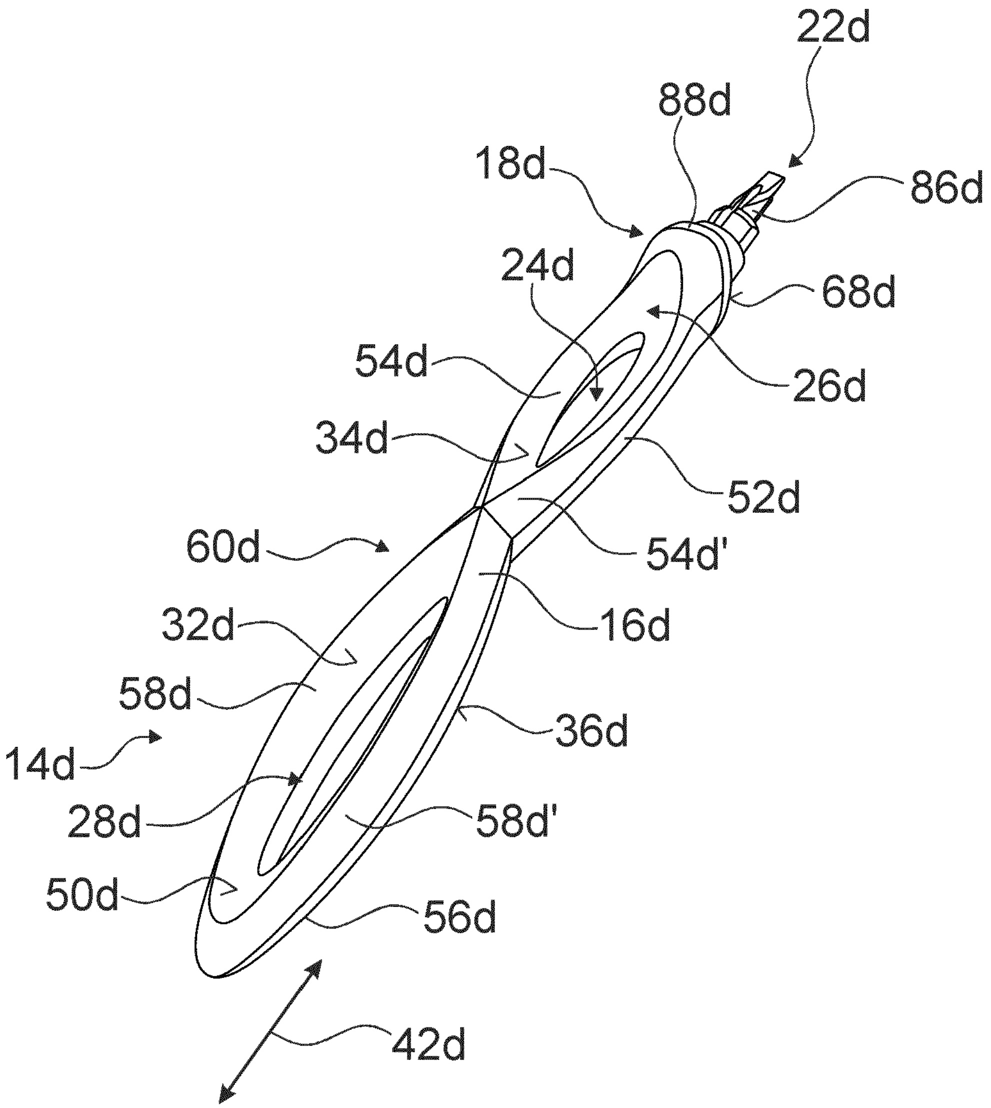
Figure 4C:
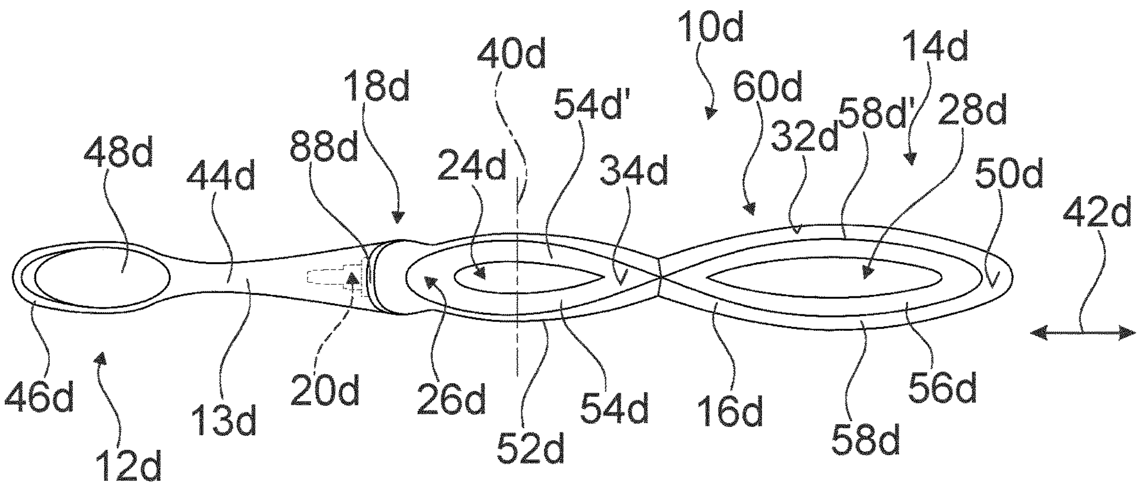
Figure 4D:
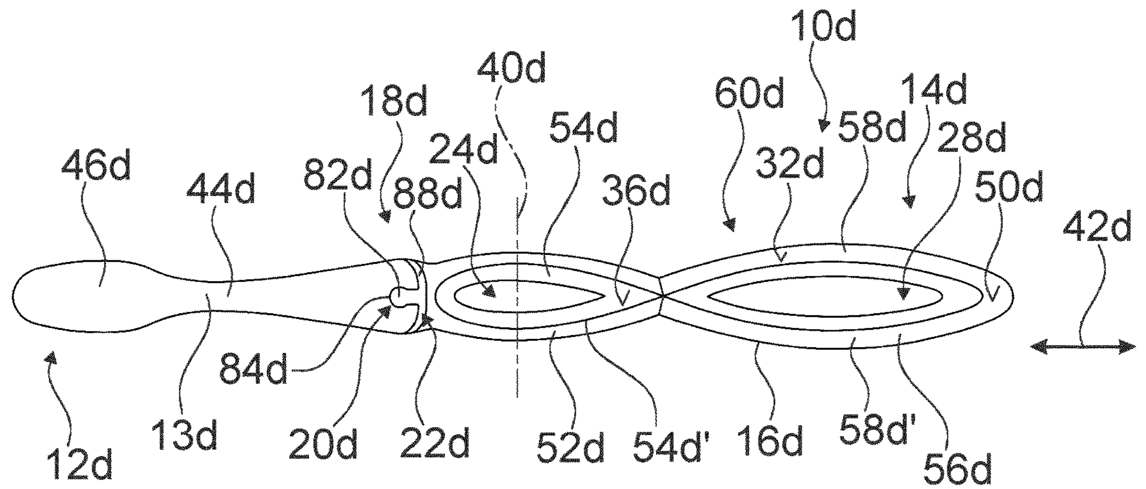
Figure 4E:
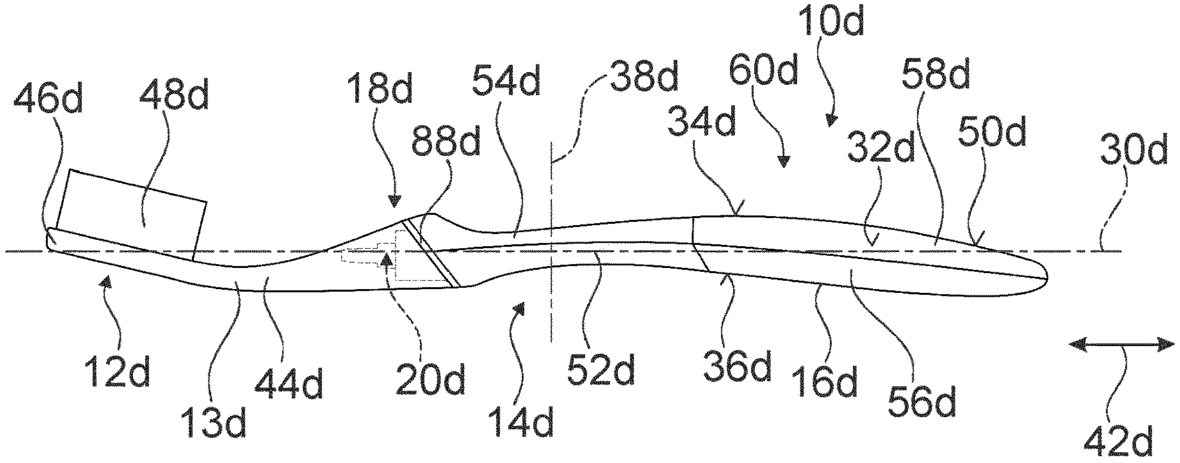
Figure 4F:
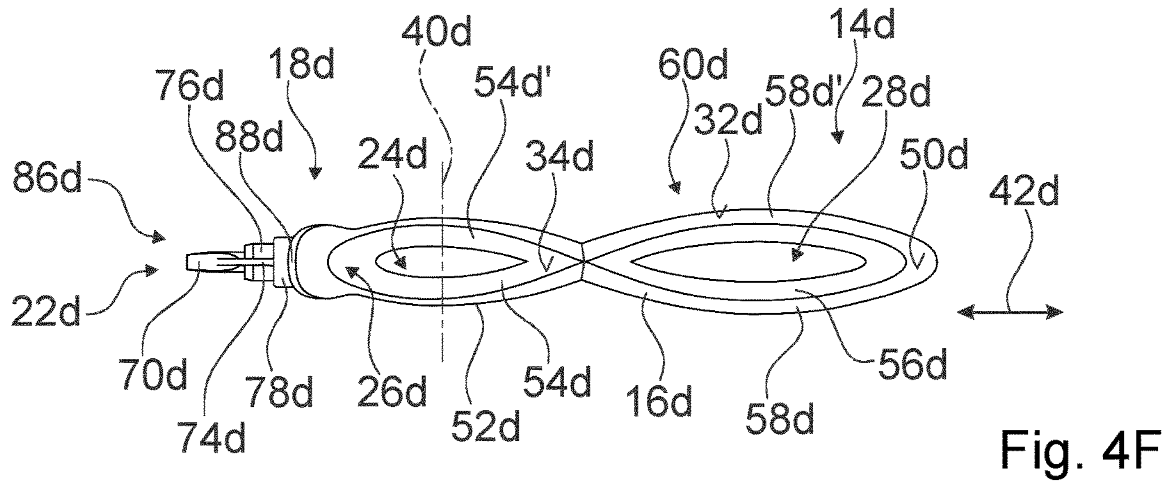
Figure 4G:
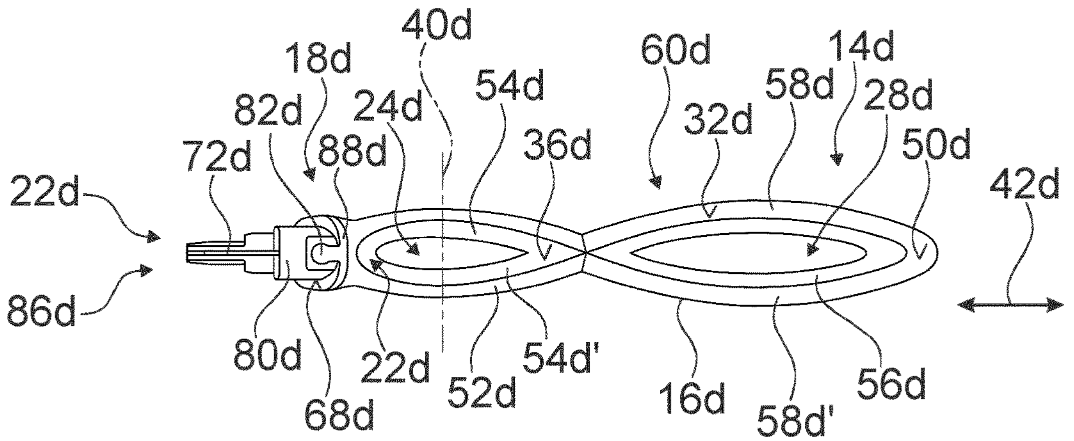
Figure 4H:
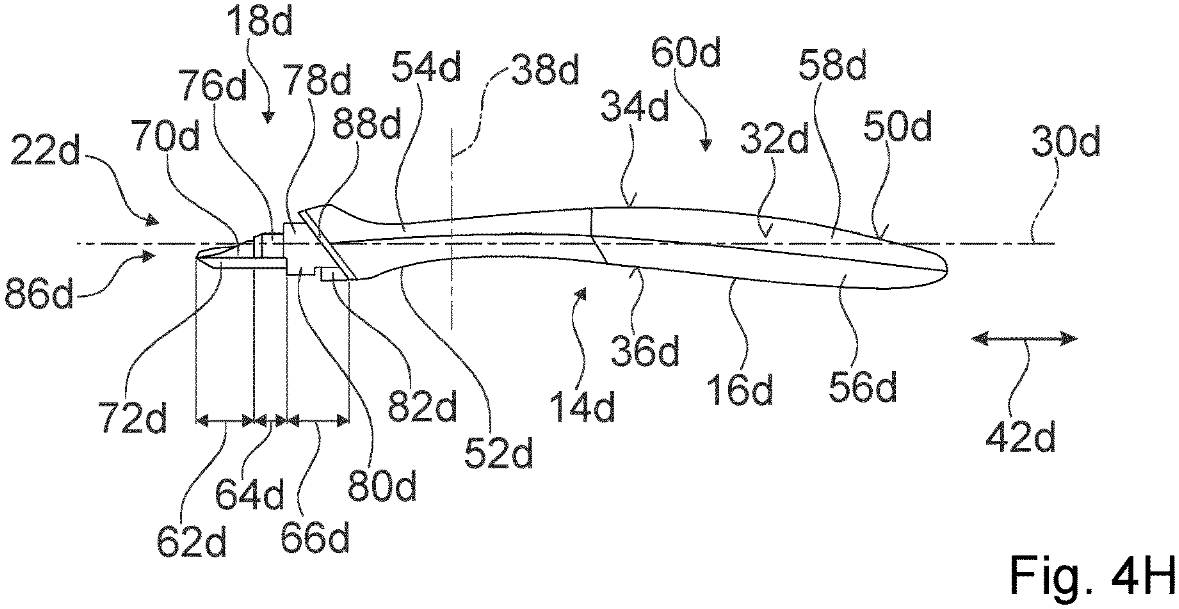
Figure 5A:
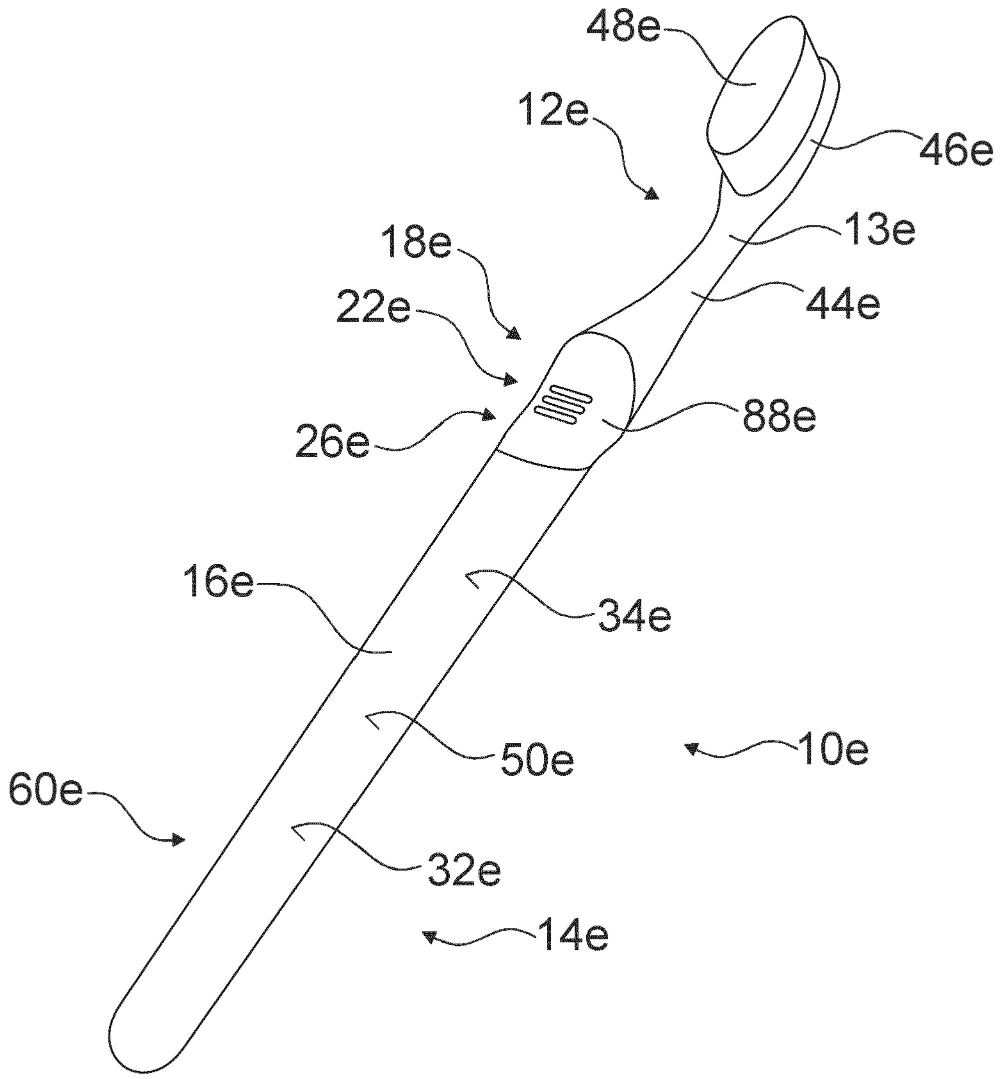
Figure 5B:
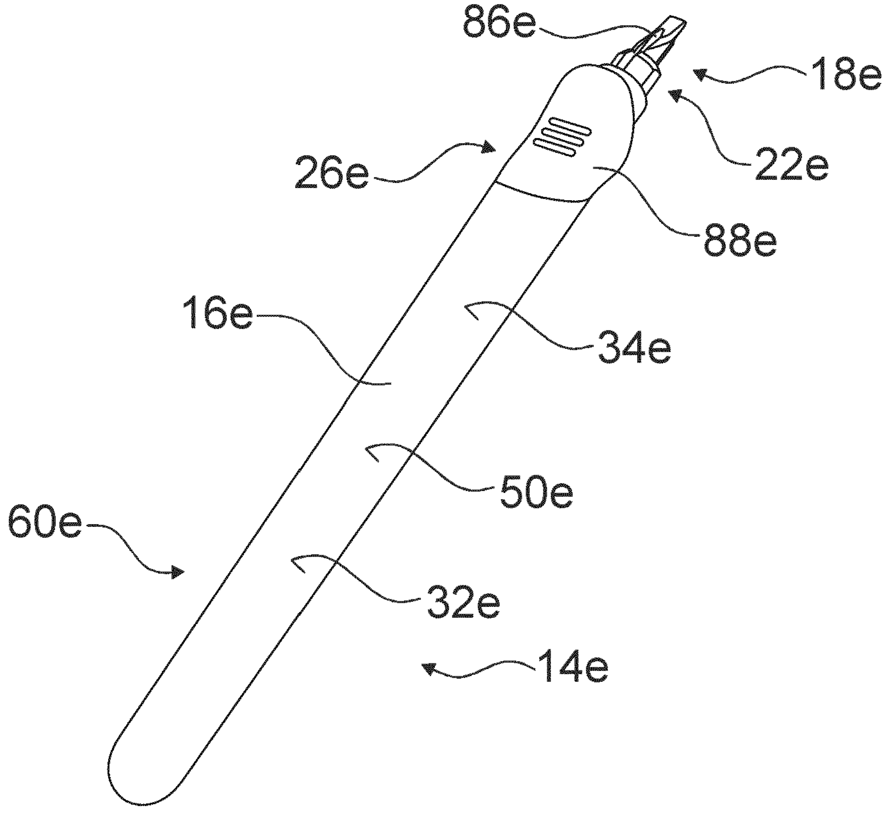
Figure 5C:
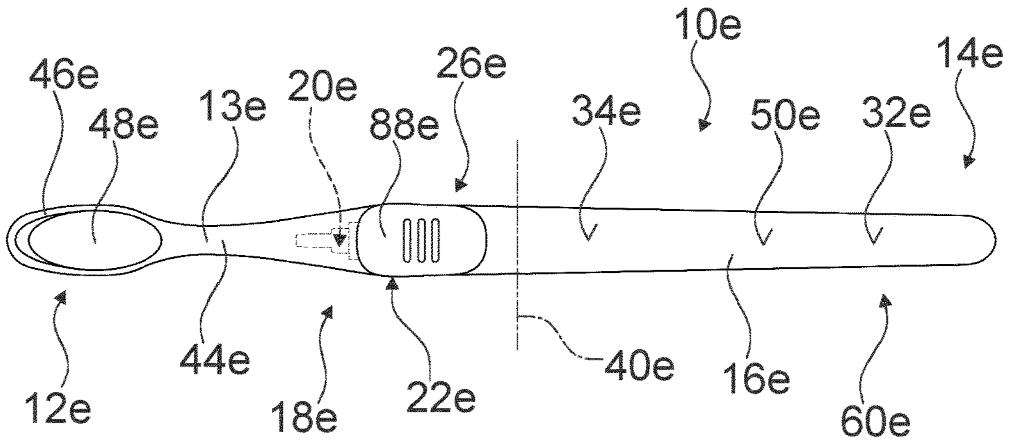
Figure 5D:
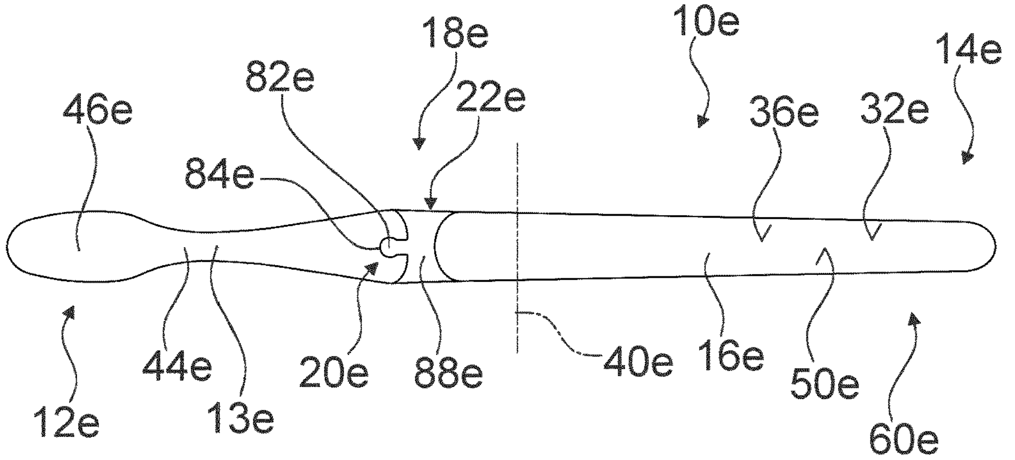
Figure 5E:
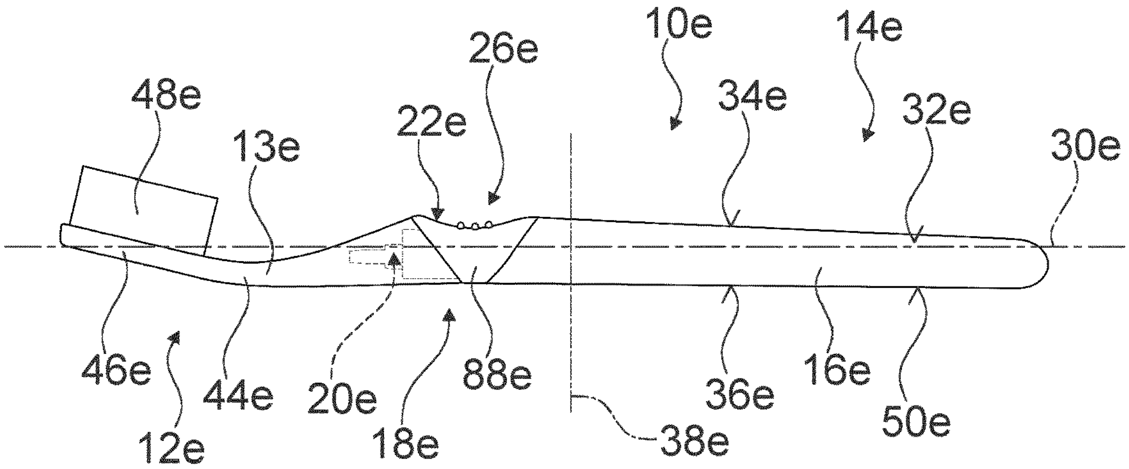
Figure 5F:
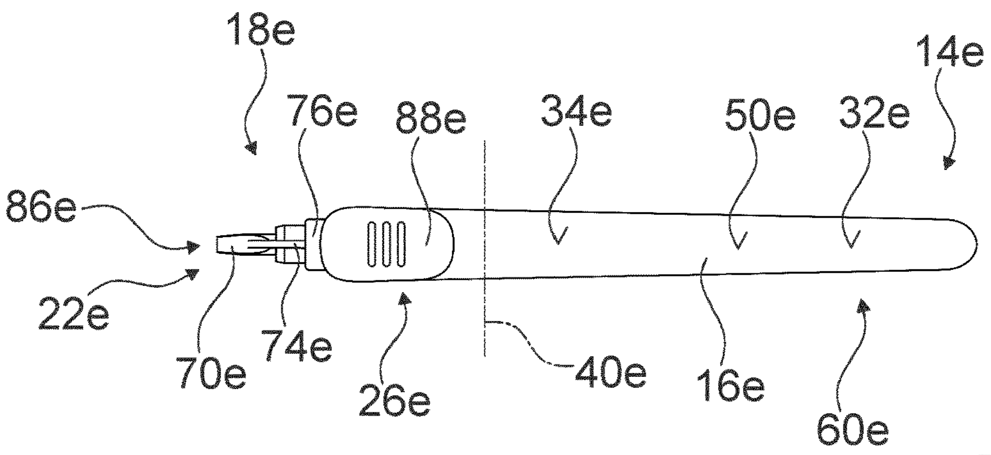
Figure 5G:
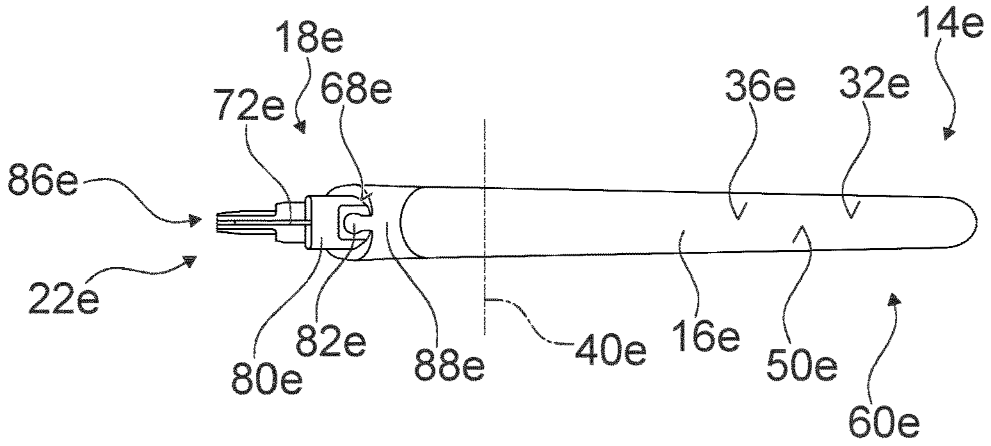
Figure 5H:
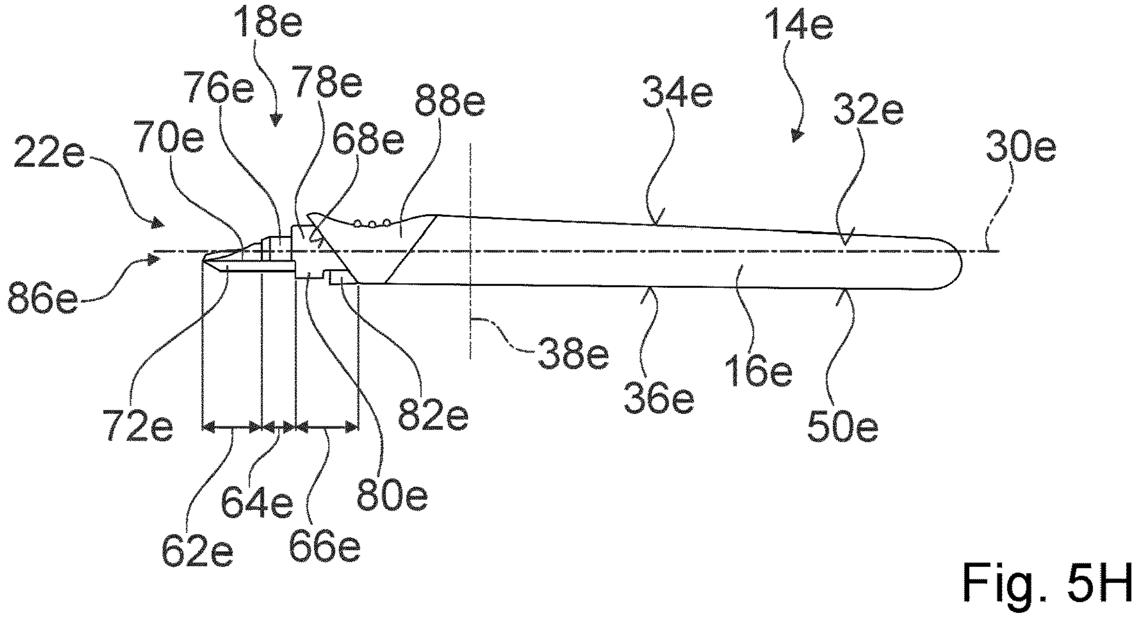
Figure 6A:
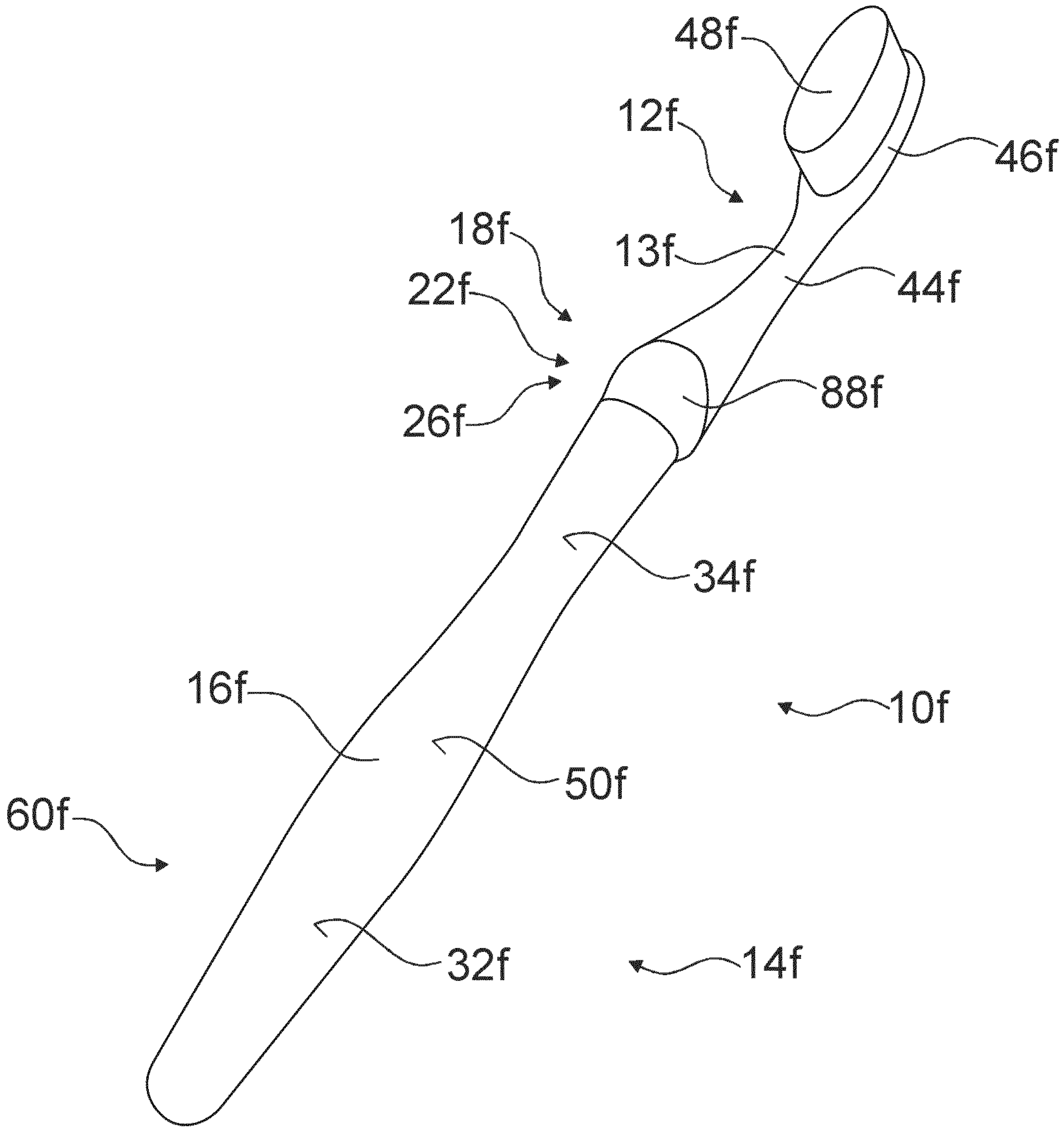
Figure 6B:
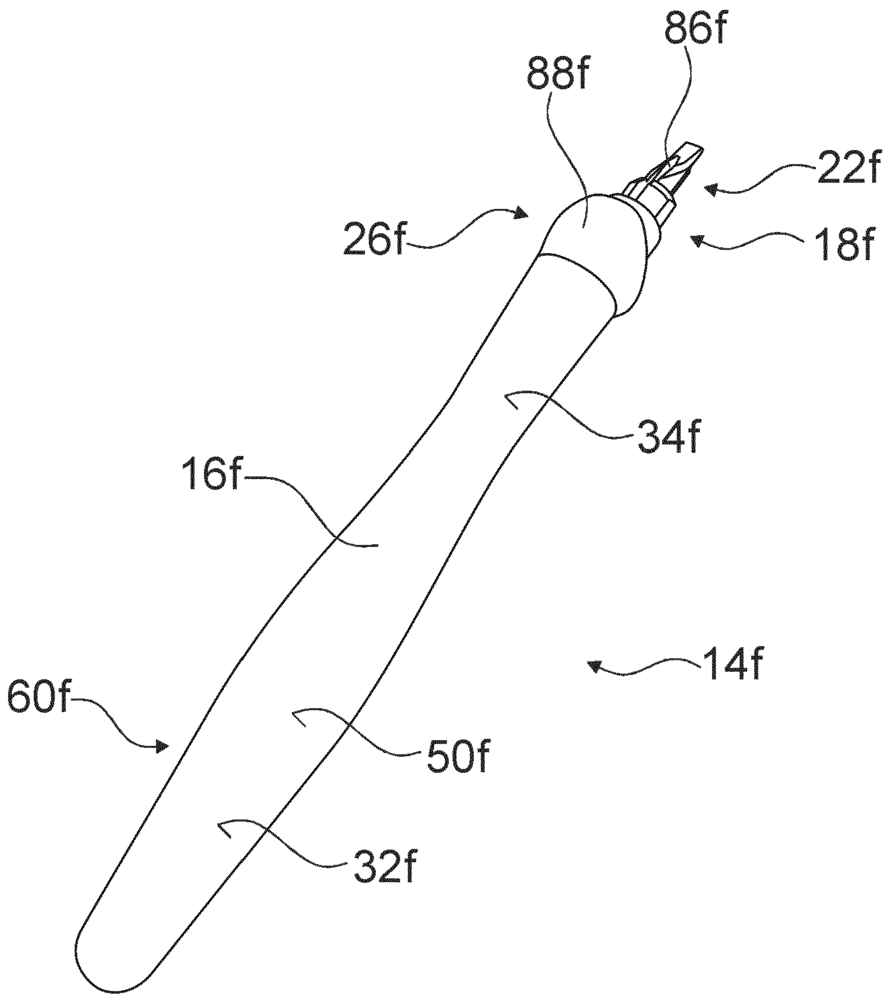
Figure 6C:
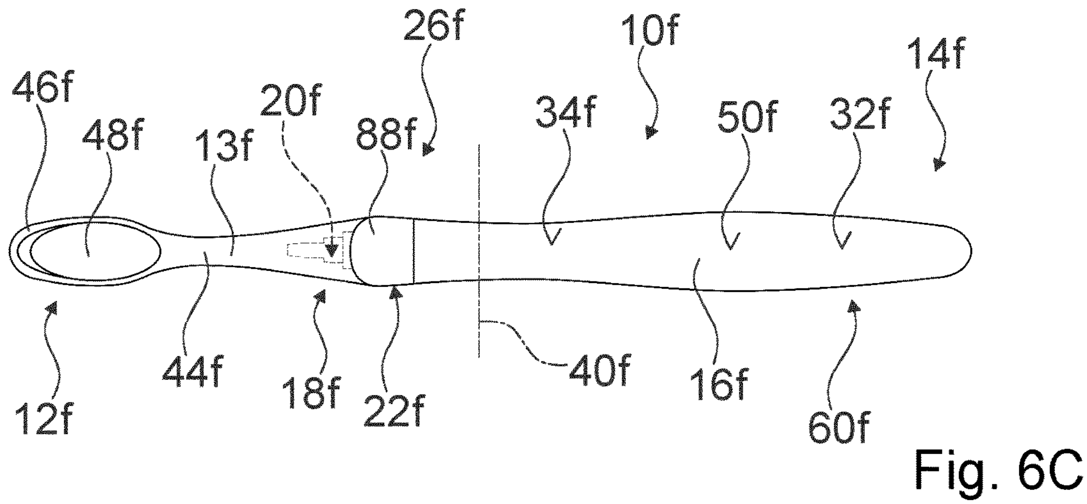
Figure 6D:
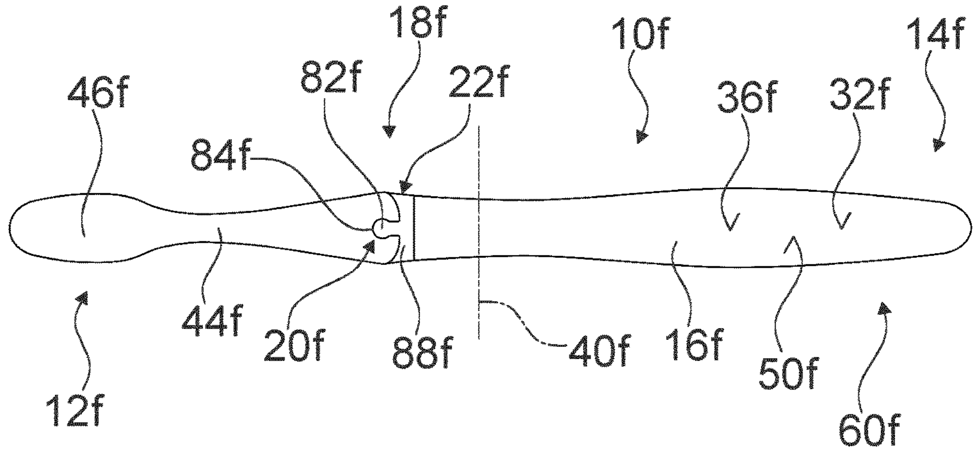
Figure 6E:
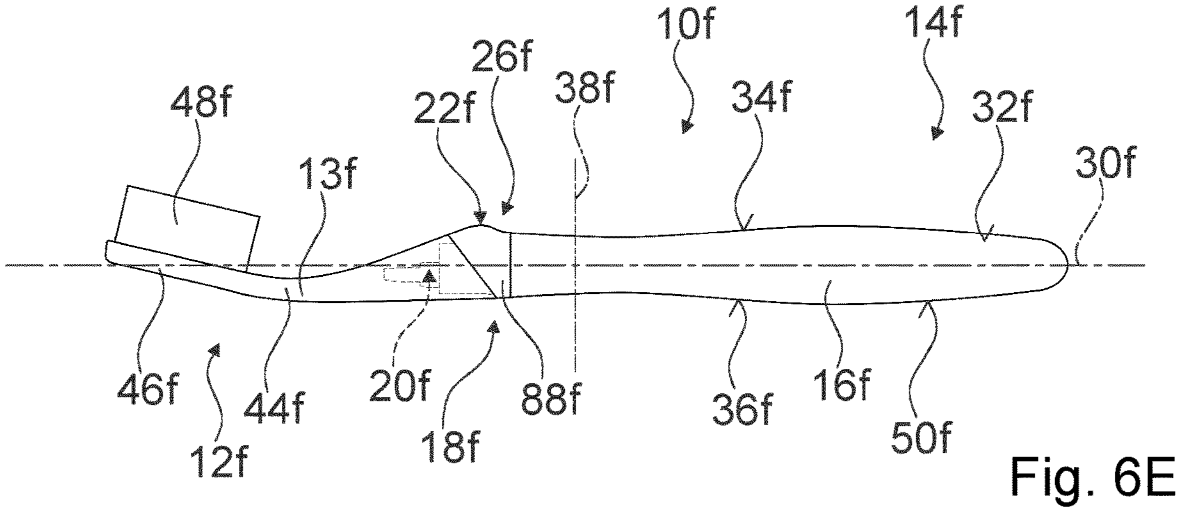
Figure 6F:
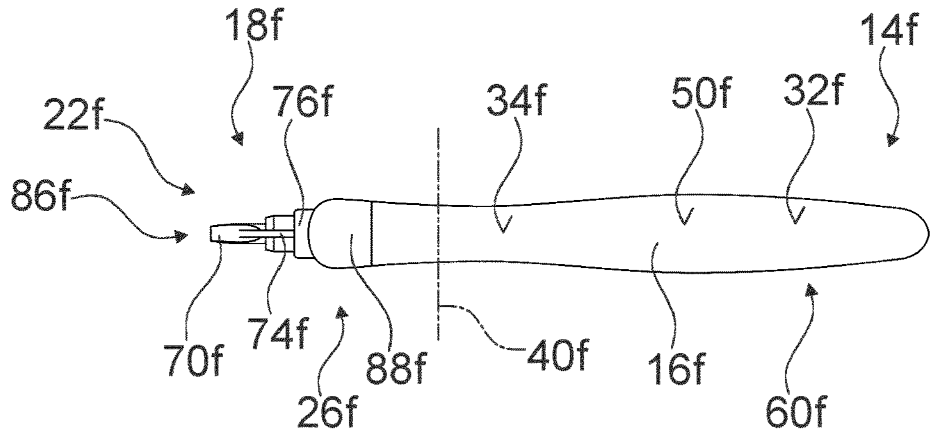
Figure 6G:
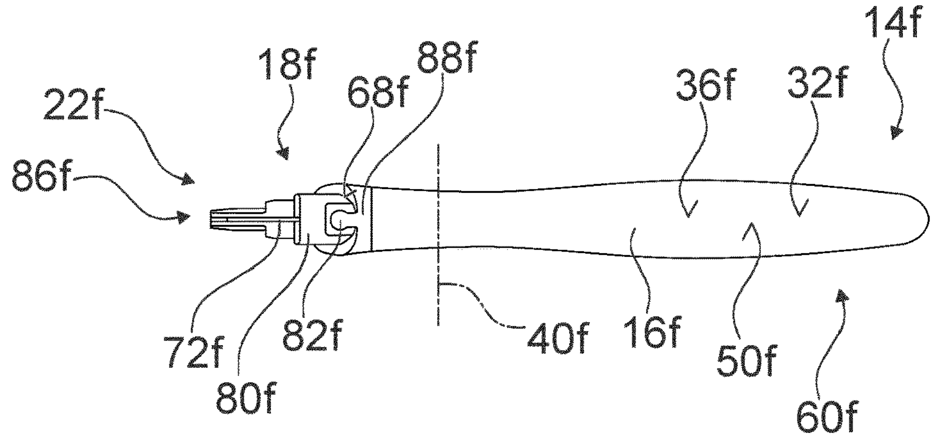
Figure 6H:
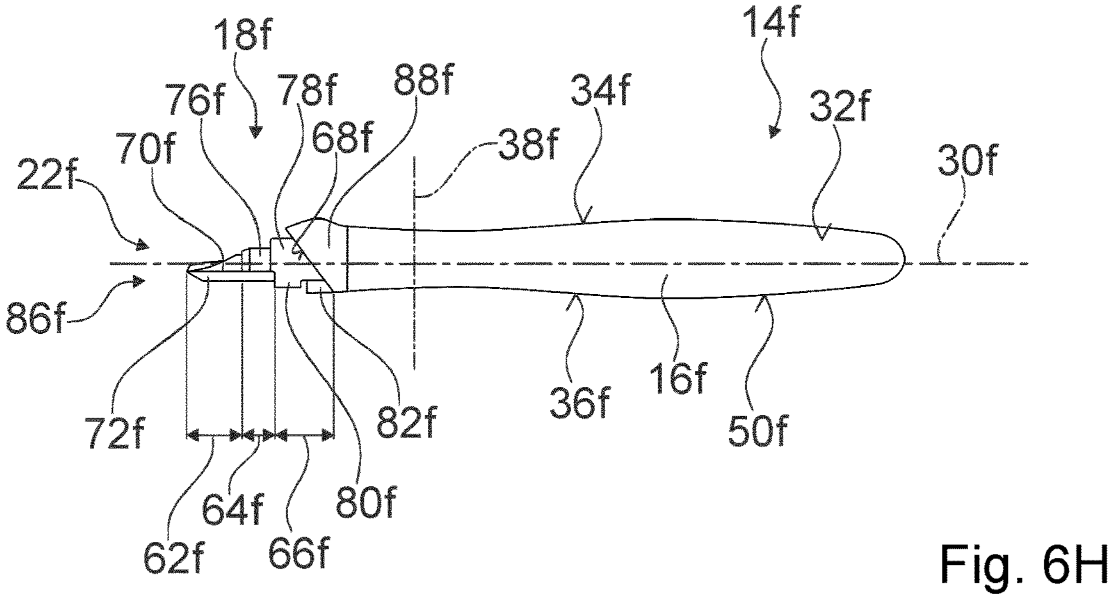
Figure 7A:
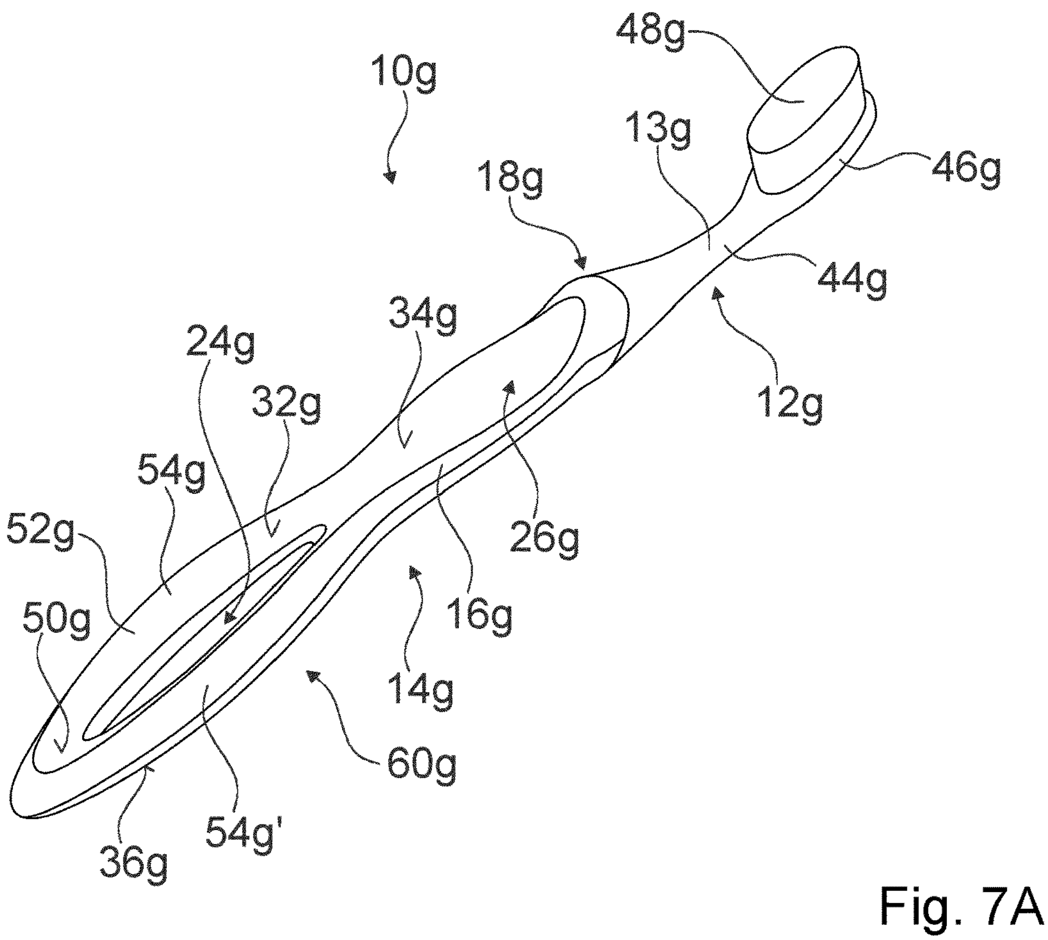
Figure 7B:
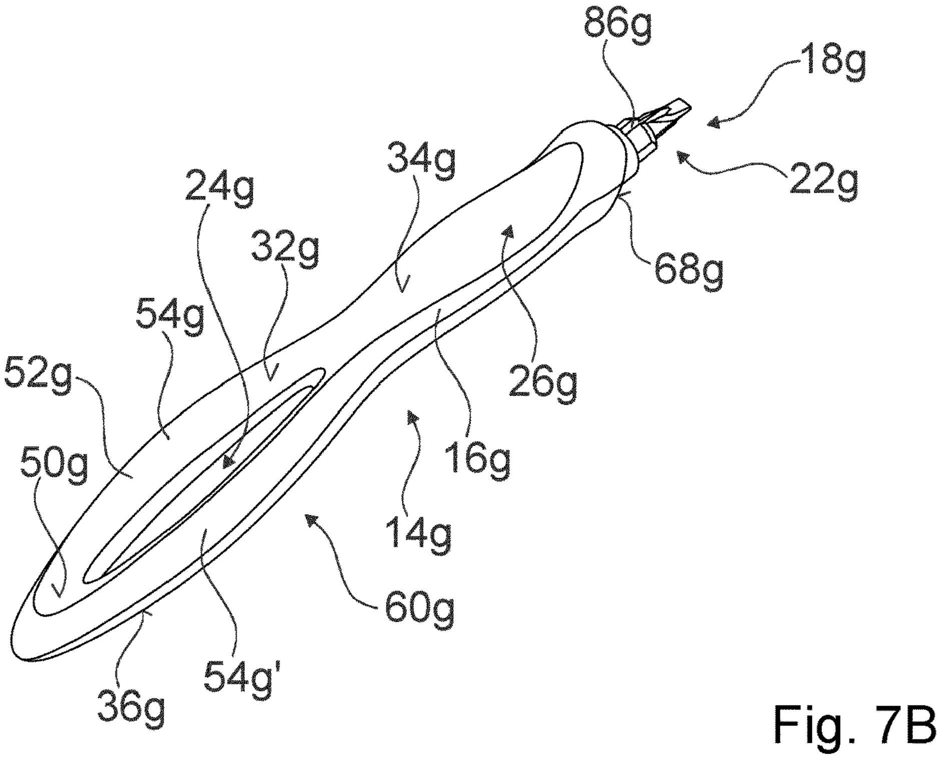
Figure 7C:
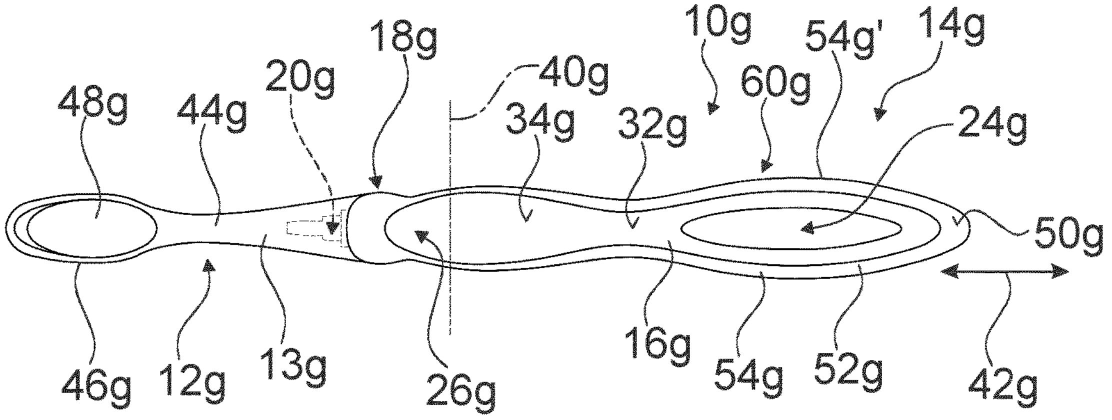
Figure 7D:
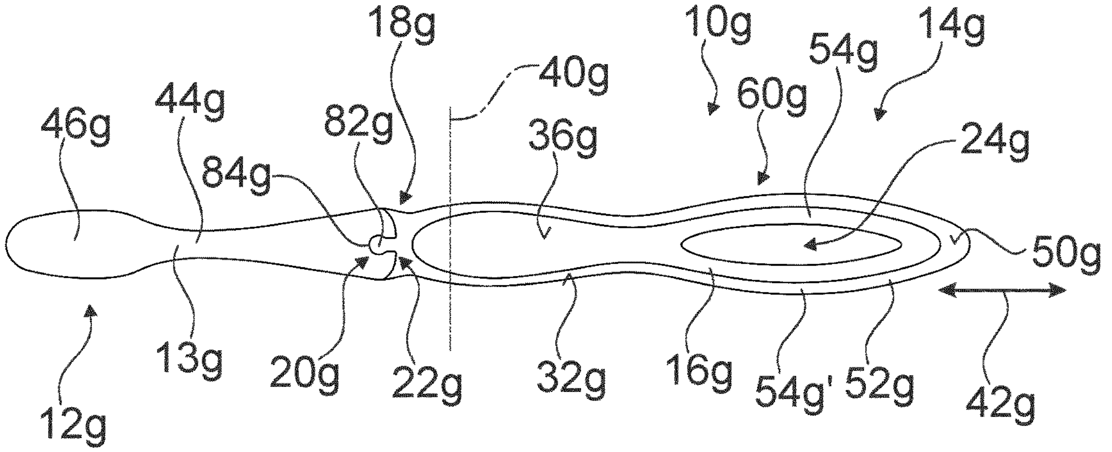
Figure 7E:
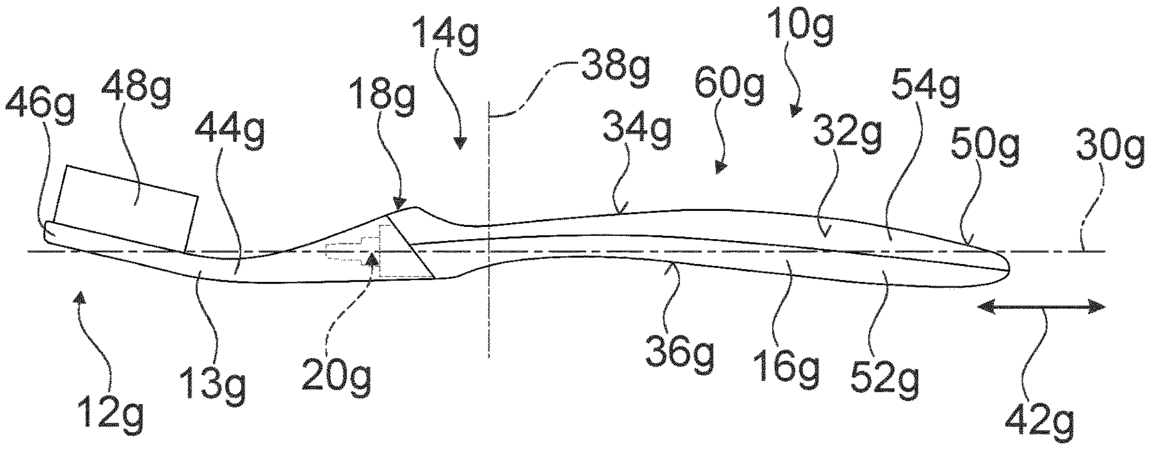
Figure 7F:
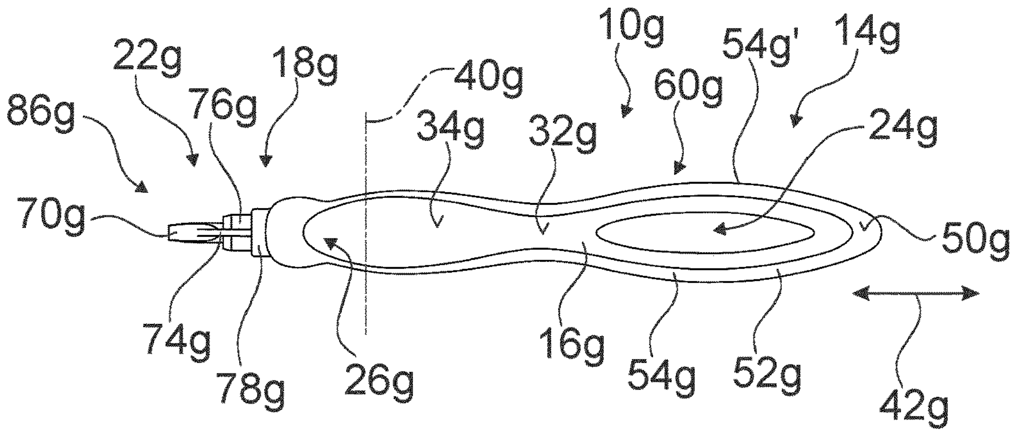
Figure 7G:
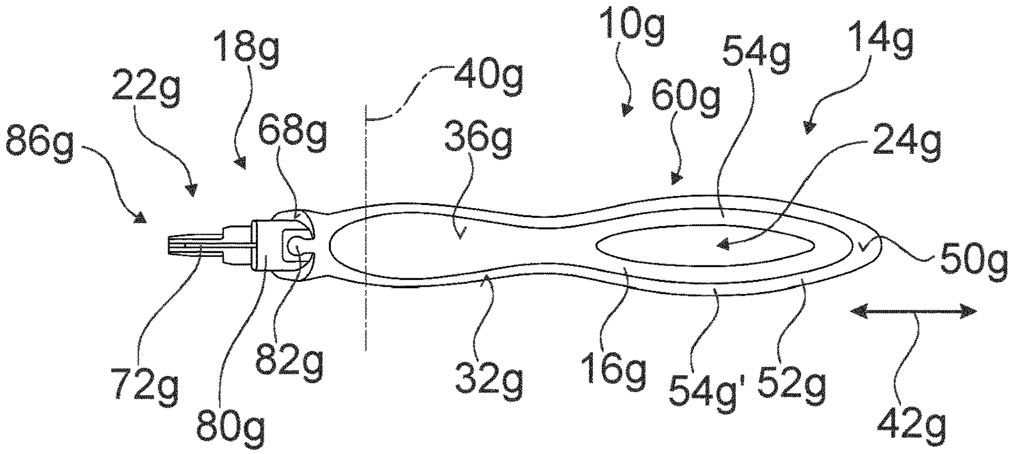
Figure 7H:
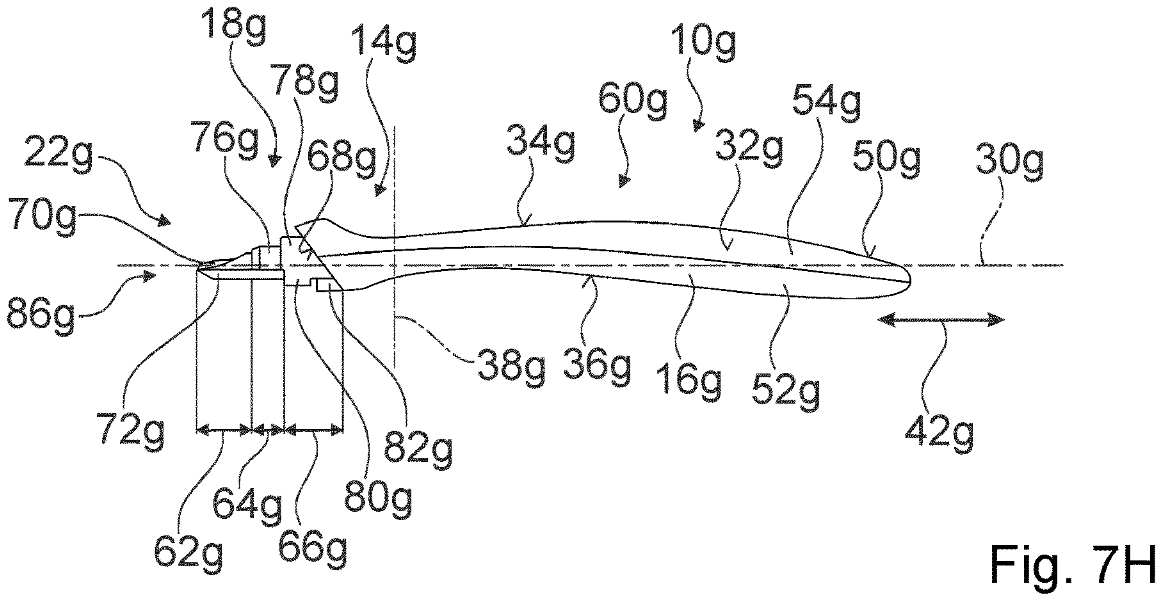
Figure 8A:
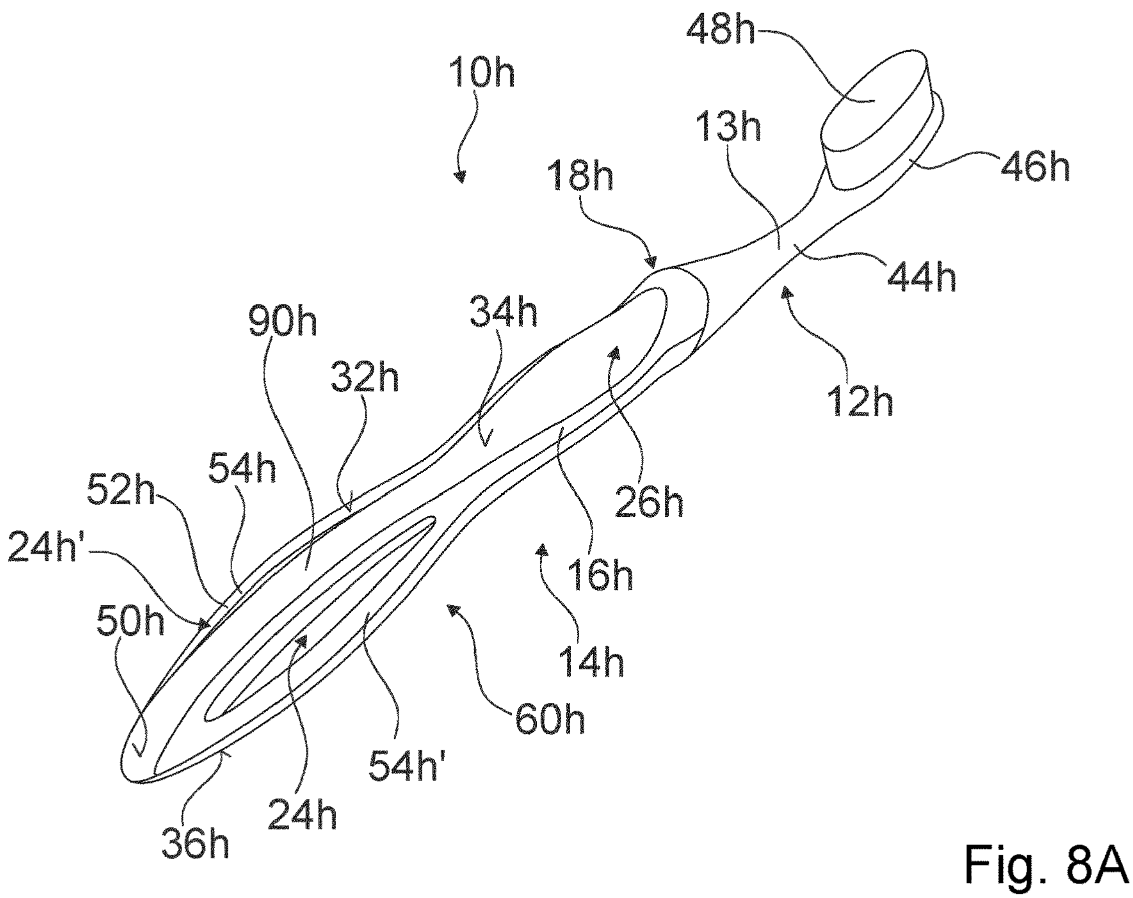
Figure 8B:
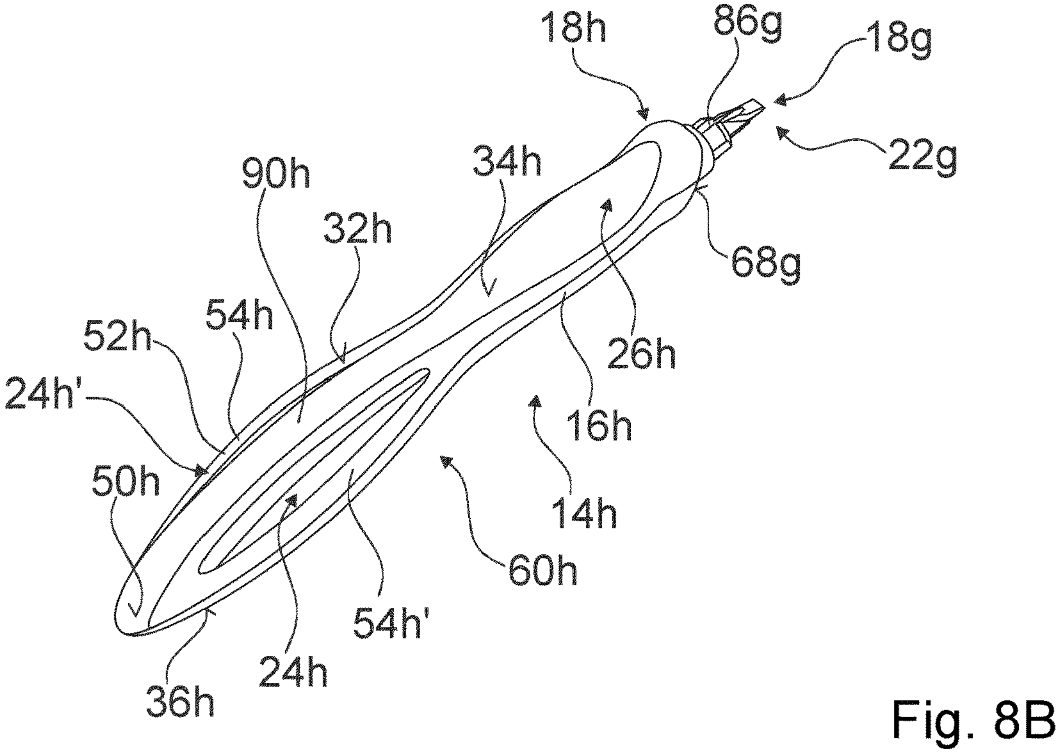
Figure 8C:
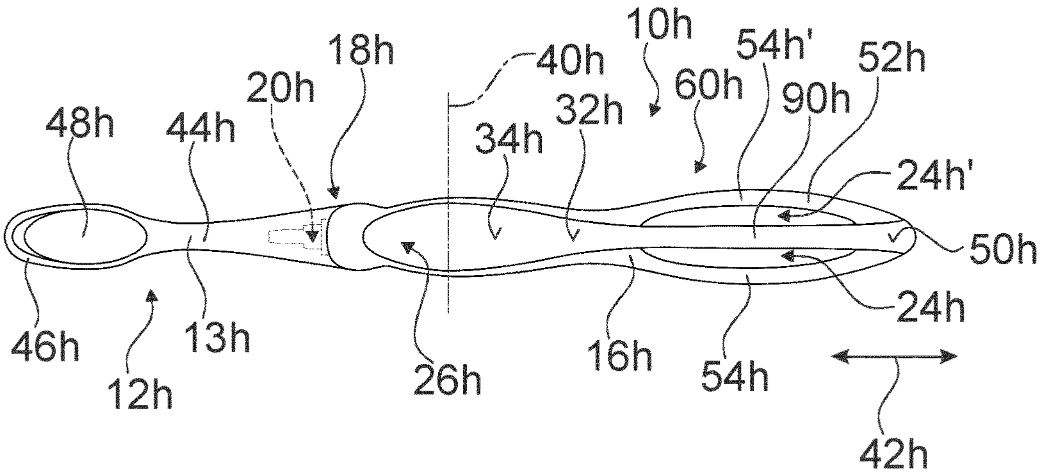
Figure 8D:
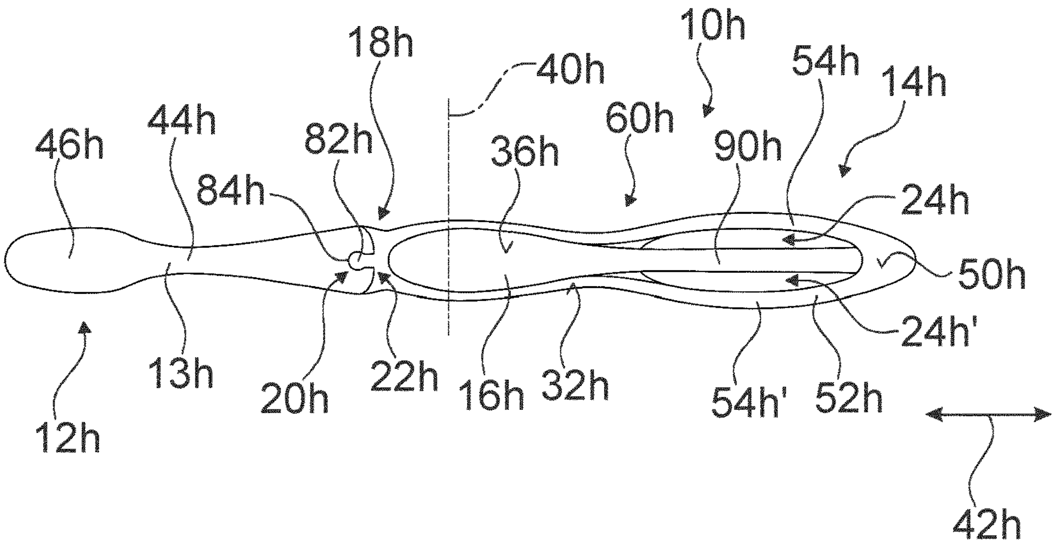
Figure 8E:
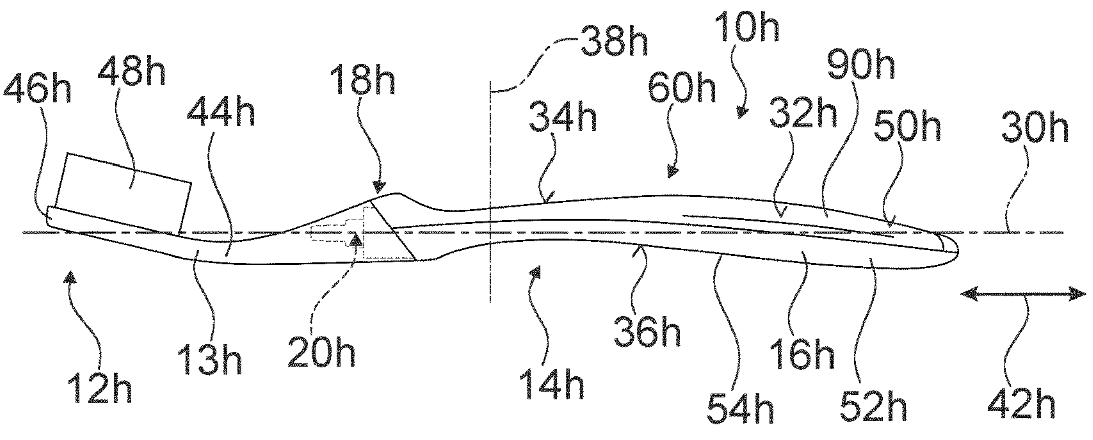
Figure 8F:
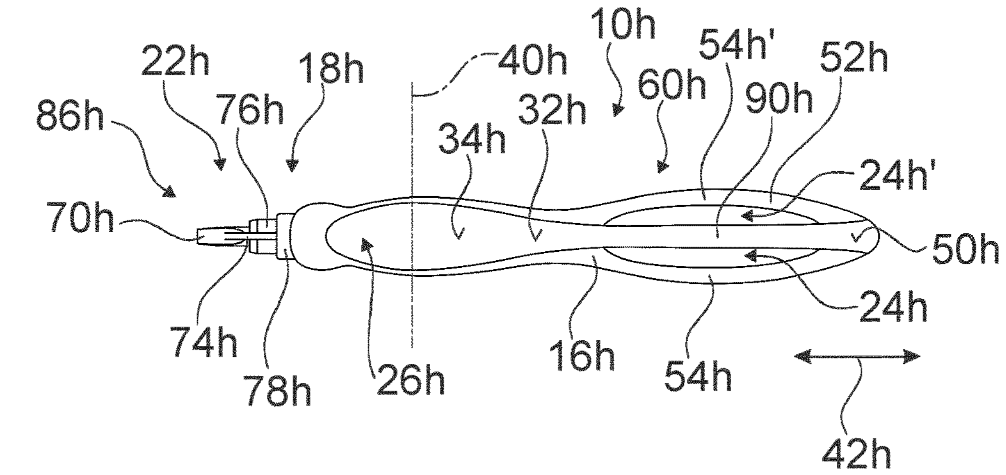
Figure 8G:
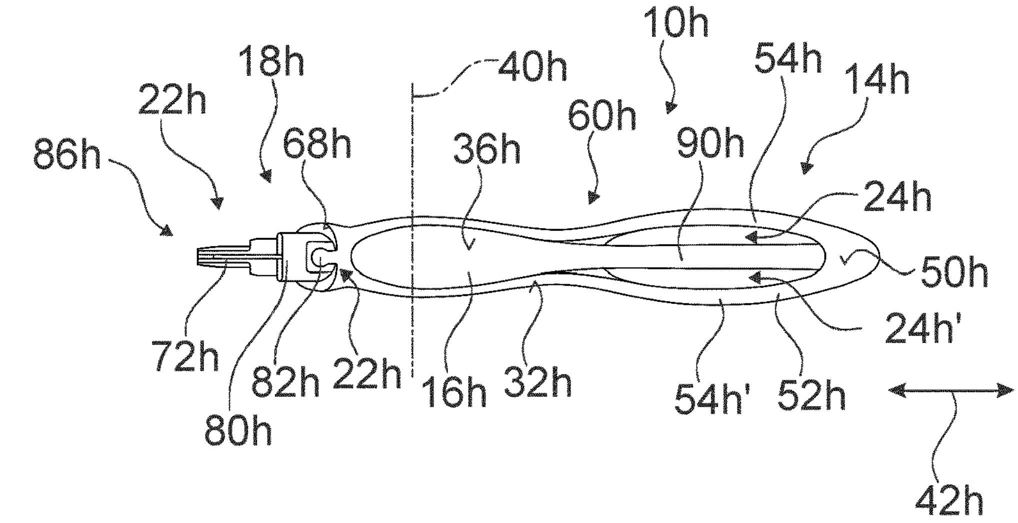
Figure 8H:
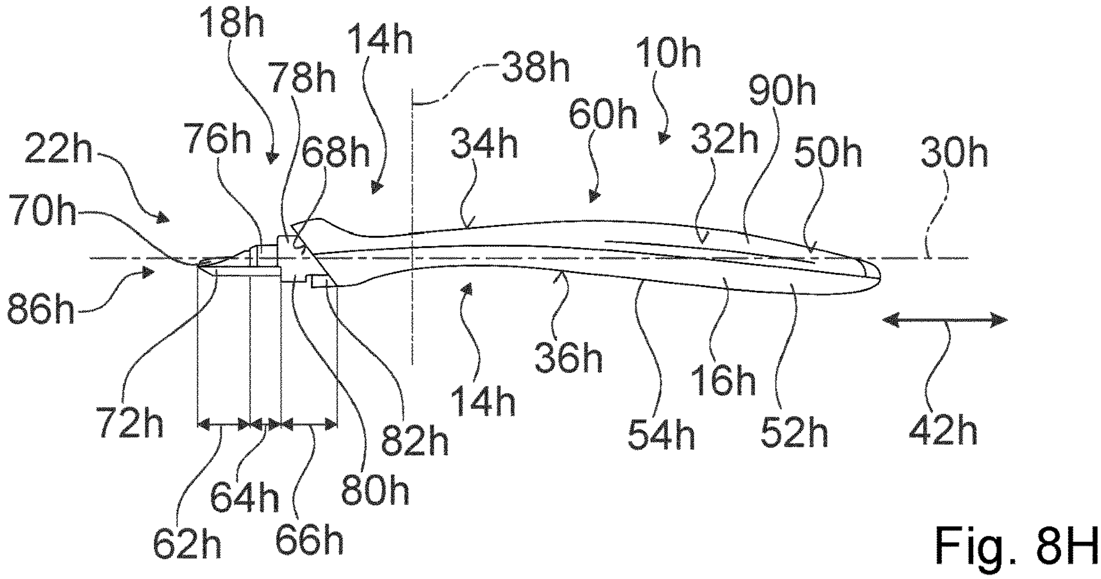
Figure 9A:
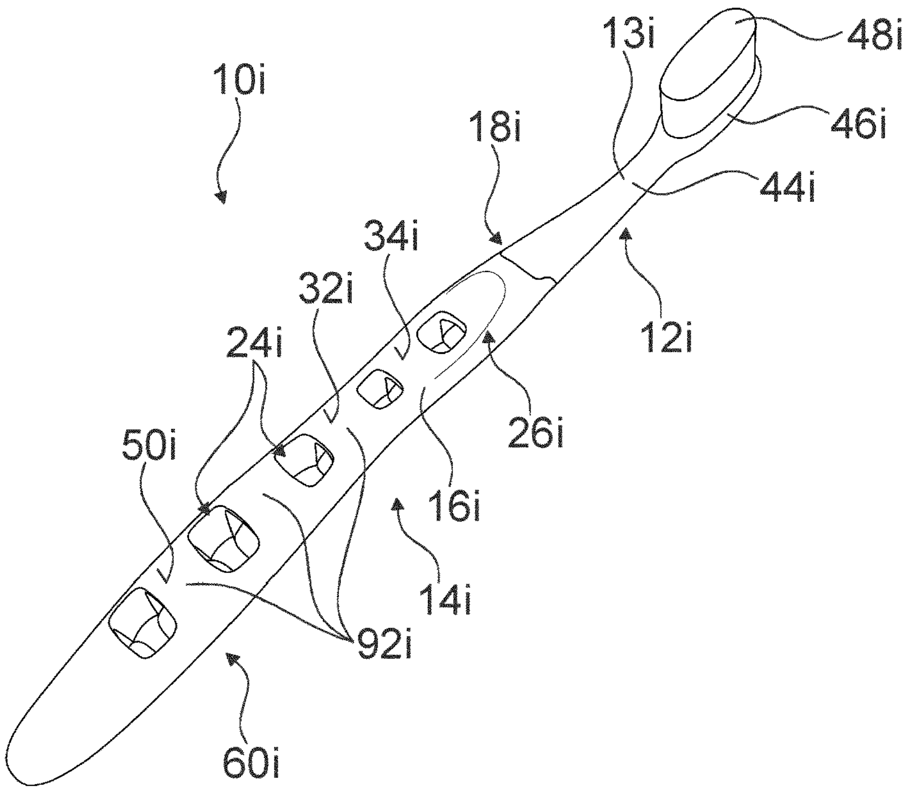
Figure 9B:
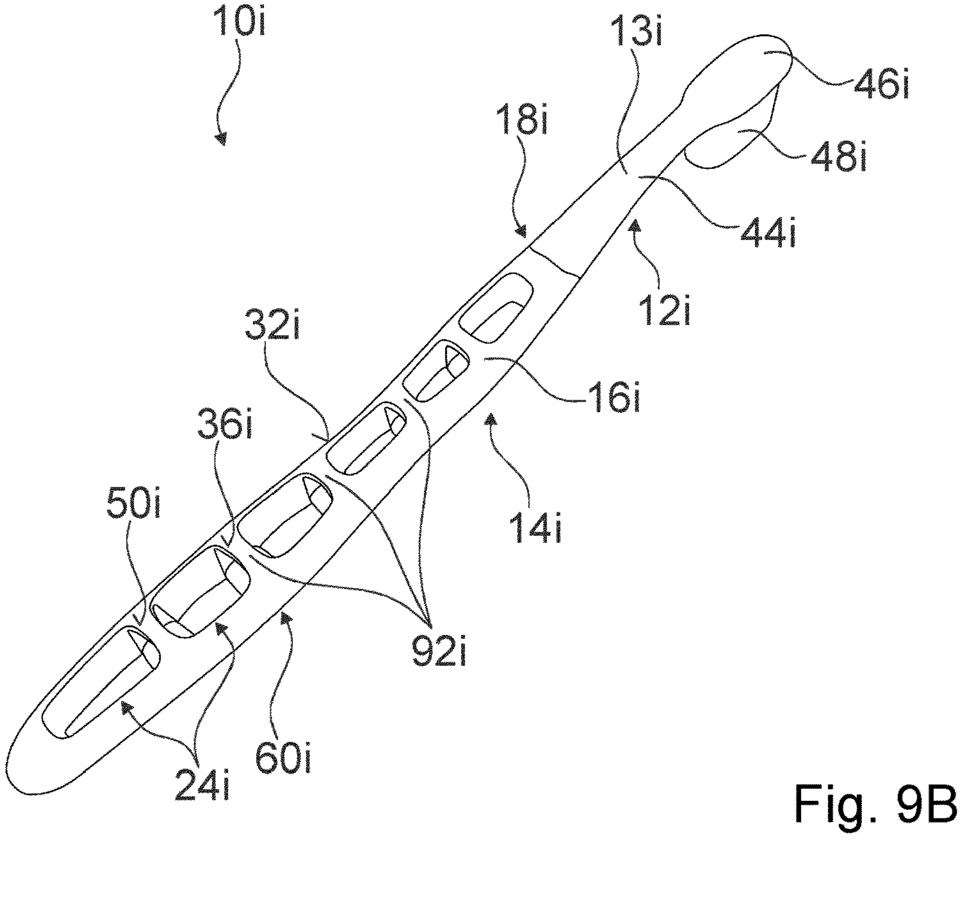
Figure 9C:
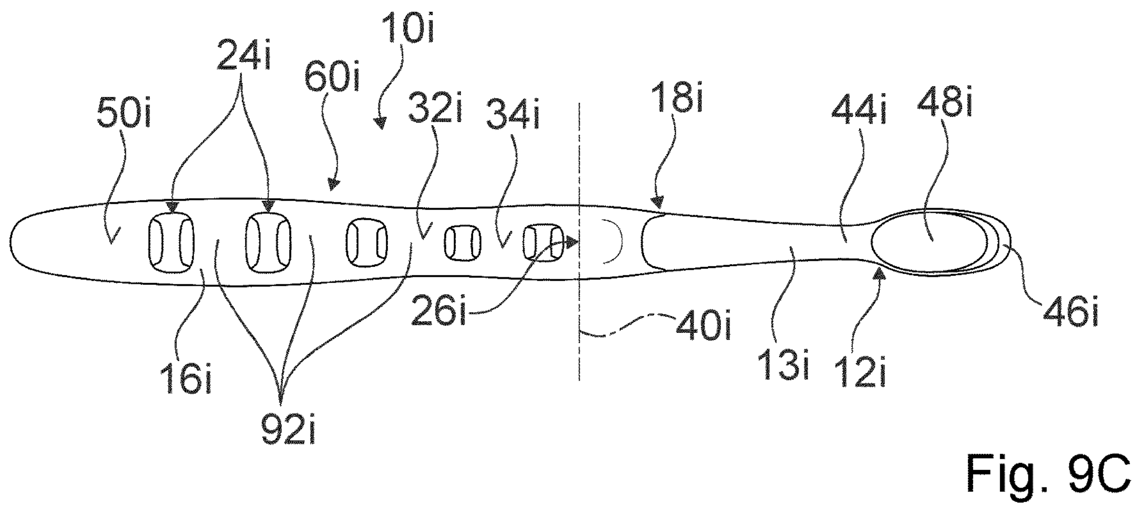
Figure 9D:
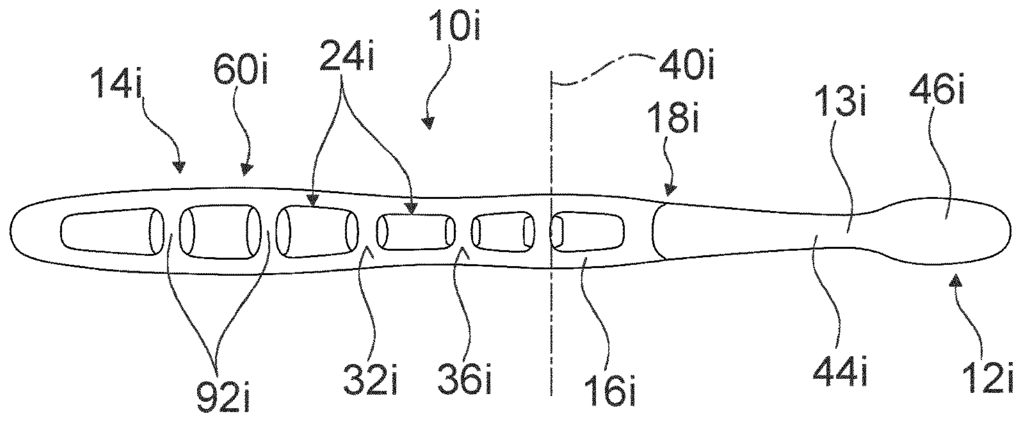
Figure 9E:
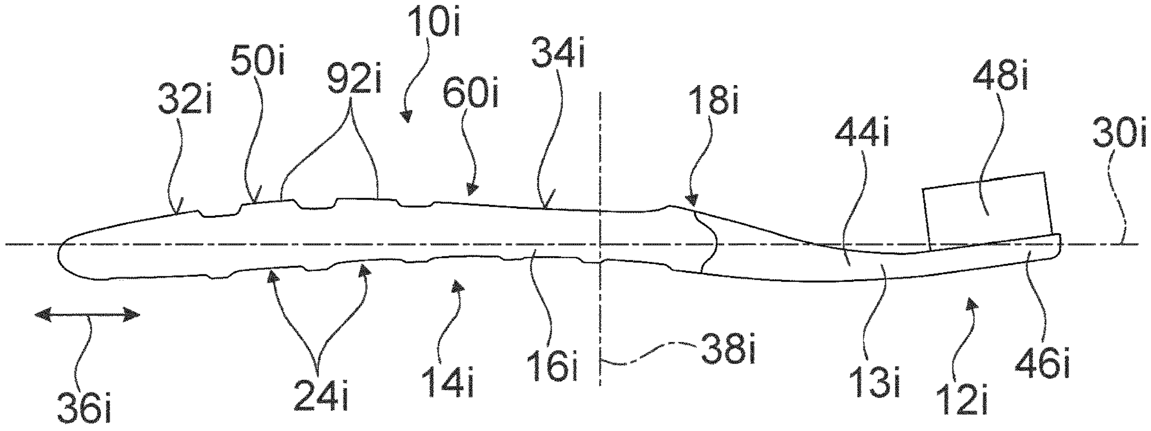
Figure 10A:
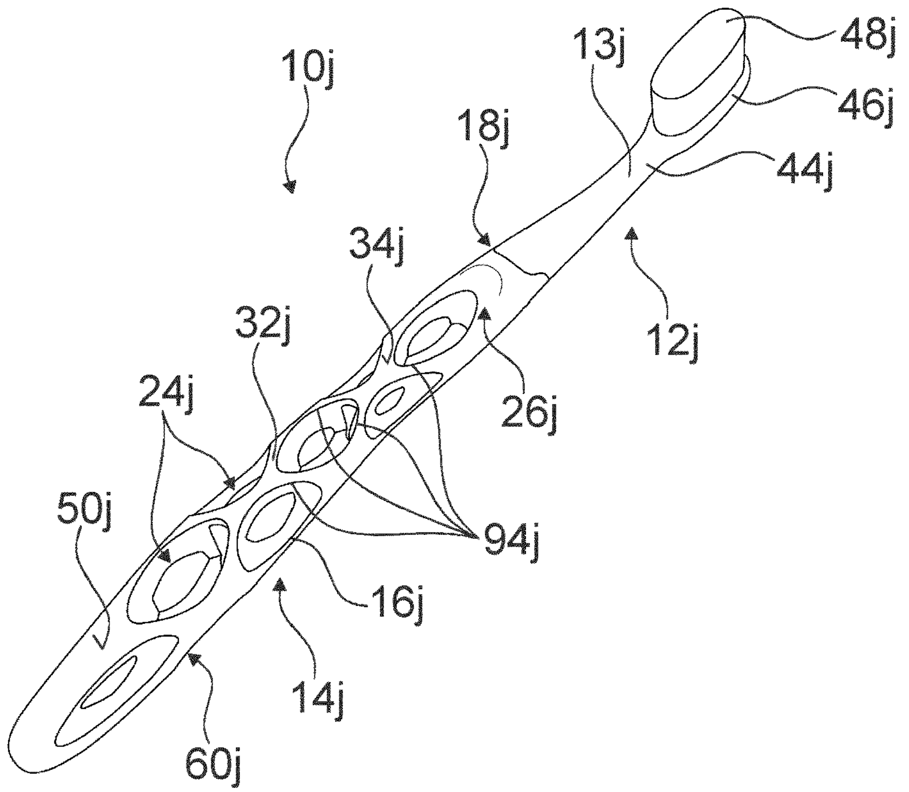
Figure 10B:
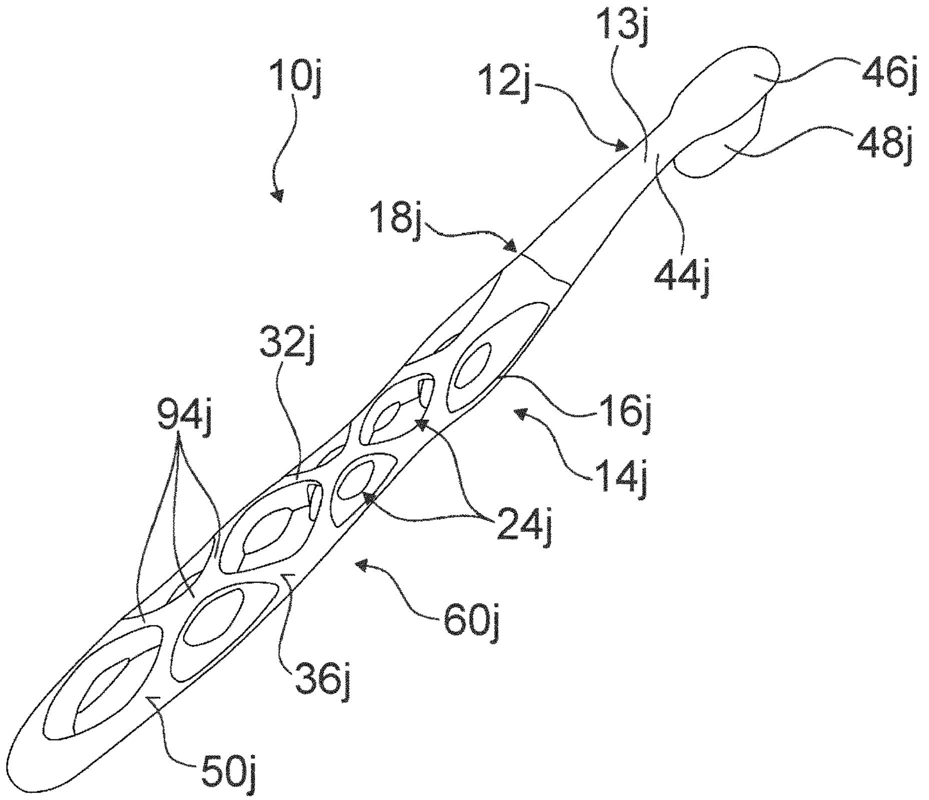
Figure 10C:
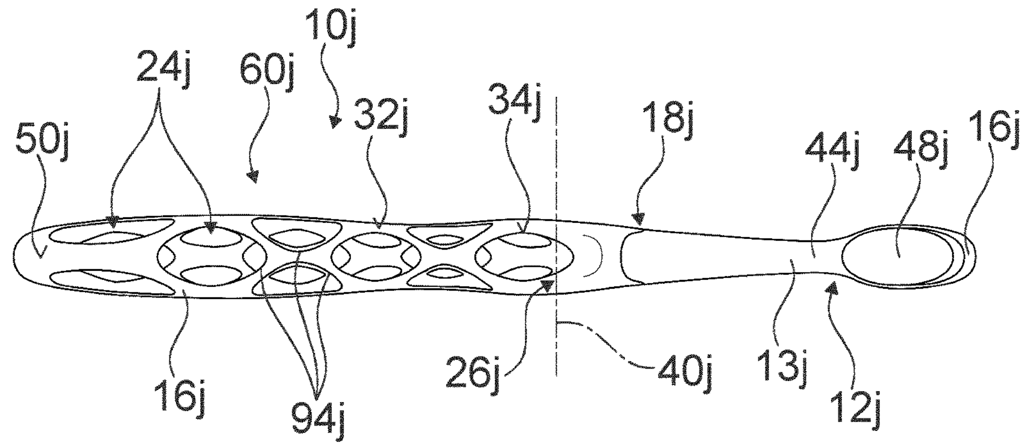
Figure 10D:
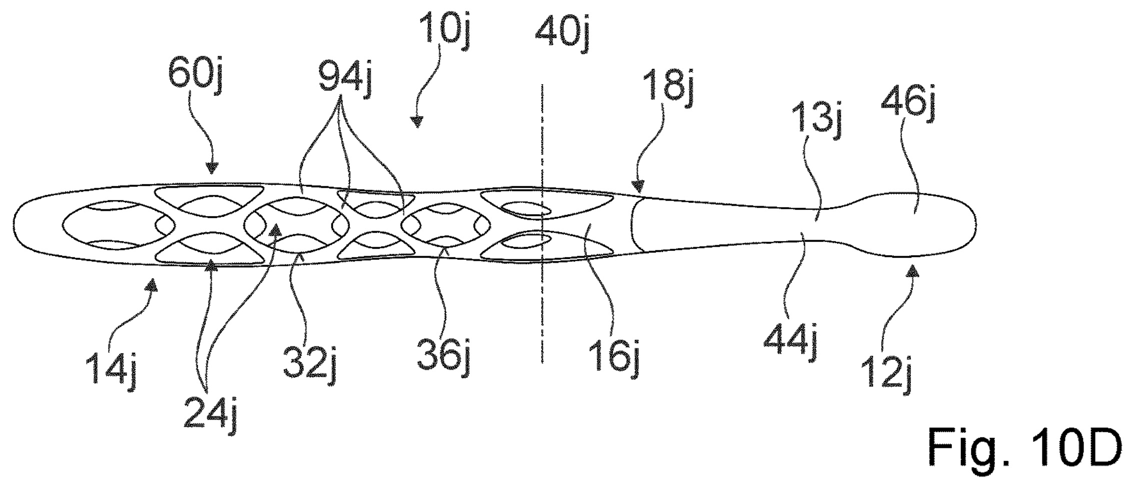
Figure 10E:
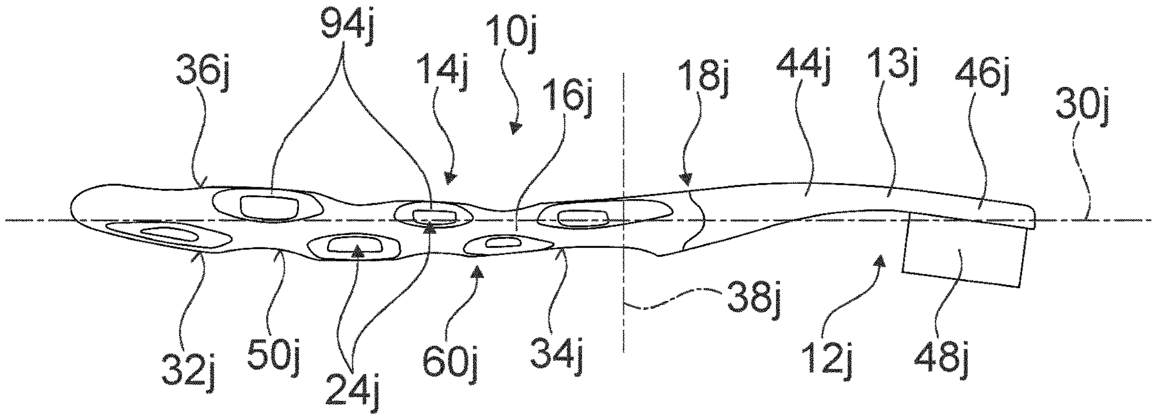
Figure 11A:
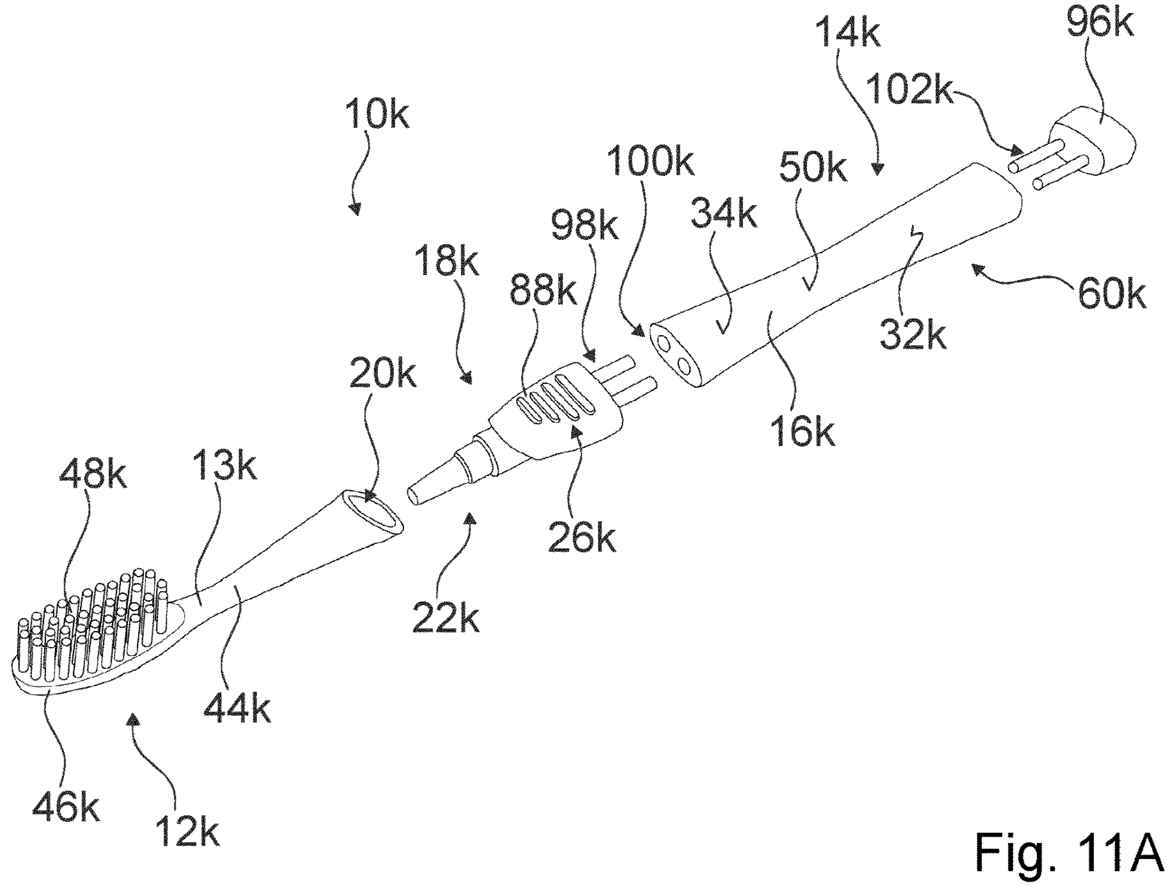
Figure 11B:
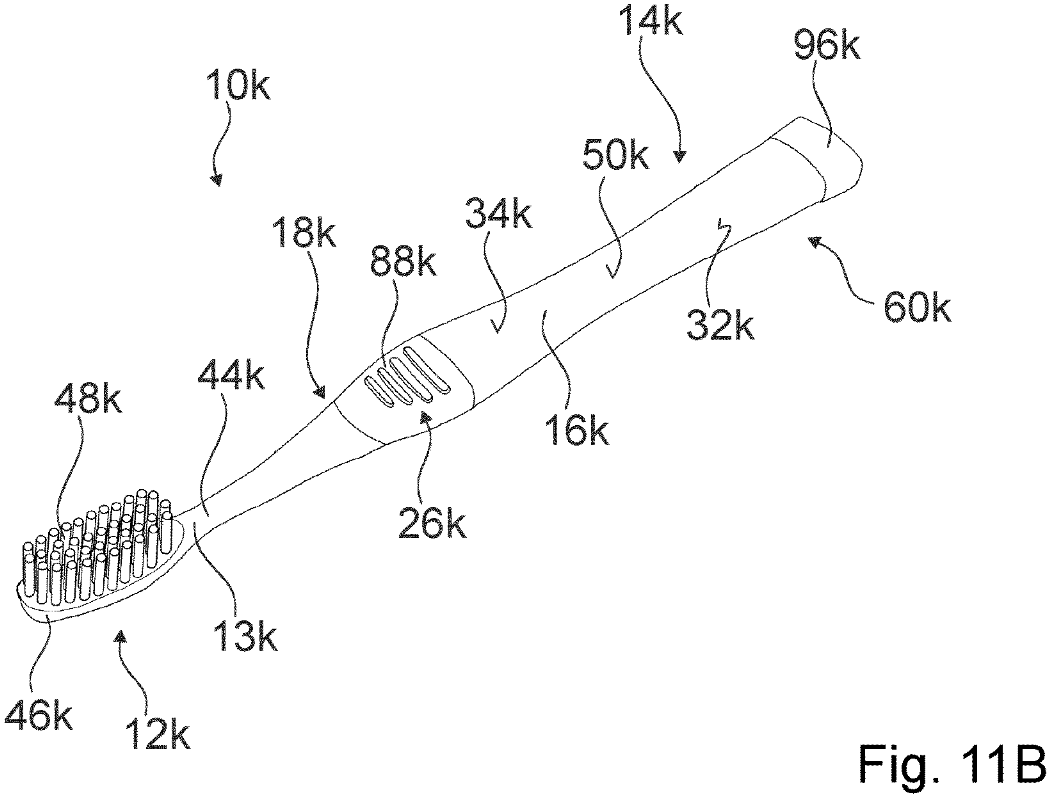

The drawings show:

FIG. 1A a perspective, schematic illustration of an oral hygiene device according to the invention with an application unit, a handle unit, and a coupling unit;

FIG. 1B a perspective, schematic illustration of the handle unit of the oral hygiene device according to the invention;

FIG. 1C a front side of the oral hygiene device according to the invention with the application unit, handle unit and coupling unit, in a schematic illustration;

FIG. 1D a rear side of the oral hygiene device according to the invention with the application unit, handle unit and coupling unit, in a schematic illustration;

FIG. 1E a side of the oral hygiene device according to the invention with the application unit, handle unit and coupling unit, in a schematic illustration;

FIG. 1F a front side of the handle unit of the oral hygiene device according to the invention, in a schematic illustration;

FIG. 1G a rear side of the handle unit of the oral hygiene device according to the invention, in a schematic illustration;

FIG. 1H a side of the handle unit of the oral hygiene device according to the invention, in a schematic illustration;

FIG. 2A a perspective, schematic illustration of an alternative oral hygiene device according to the invention with an application unit, a handle unit, and a coupling unit;

FIG. 2B a perspective, schematic illustration of the handle unit of the alternative oral hygiene device according to the invention;

FIG. 2C a front side of the alternative oral hygiene device according to the invention with the application unit, handle unit and coupling unit, in a schematic illustration;

FIG. 2D a rear side of the alternative oral hygiene device according to the invention with the application unit, handle unit and coupling unit, in a schematic illustration;

FIG. 2E a side of the alternative oral hygiene device according to the invention with the application unit, handle unit and coupling unit, in a schematic illustration;

FIG. 2F a front side of the handle unit of the alternative oral hygiene device according to the invention, in a schematic illustration;

FIG. 2G a rear side of the handle unit of the alternative oral hygiene device according to the invention, in a schematic illustration;

FIG. 2H a side of the handle unit of the alternative oral hygiene device according to the invention, in a schematic illustration;

FIG. 3A a perspective, schematic illustration of a further alternative oral hygiene device according to the invention with an application unit, a handle unit, and a coupling unit;

FIG. 3B a perspective, schematic illustration of the handle unit of the further alternative oral hygiene device according to the invention;

FIG. 3C a front side of the further alternative oral hygiene device according to the invention with the application unit, handle unit and coupling unit, in a schematic illustration;

FIG. 3D a rear side of the further alternative oral hygiene device according to the invention with the application unit, handle unit and coupling unit, in a schematic illustration;

FIG. 3E a side of the further alternative oral hygiene device according to the invention with the application unit, handle unit and coupling unit, in a schematic illustration;

FIG. 3F a front side of the handle unit of the further alternative oral hygiene device according to the invention, in a schematic illustration;

FIG. 3G a rear side of the handle unit of the further alternative oral hygiene device according to the invention, in a schematic illustration;

FIG. 3H a side of the handle unit of the further alternative oral hygiene device according to the invention, in a schematic illustration;

FIG. 4A a perspective, schematic illustration of a further alternative oral hygiene device according to the invention with an application unit, a handle unit, and a coupling unit;

FIG. 4B a perspective, schematic illustration of the handle unit of the further alternative oral hygiene device according to the invention;

FIG. 4C a front side of the further alternative oral hygiene device according to the invention with the application unit, handle unit and coupling unit, in a schematic illustration;

FIG. 4D a rear side of the further alternative oral hygiene device according to the invention with the application unit, handle unit and coupling unit, in a schematic illustration;

FIG. 4E a side of the further alternative oral hygiene device according to the invention with the application unit, handle unit and coupling unit, in a schematic illustration;

FIG. 4F a front side of the handle unit of the further alternative oral hygiene device according to the invention, in a schematic illustration;

FIG. 4G a rear side of the handle unit of the further alternative oral hygiene device according to the invention, in a schematic illustration;

FIG. 4H a side of the handle unit of the further alternative oral hygiene device according to the invention, in a schematic illustration;

FIG. 5A a perspective, schematic illustration of a further alternative oral hygiene device according to the invention with an application unit, a handle unit, and a coupling unit;

FIG. 5B a perspective, schematic illustration of the handle unit of the further alternative oral hygiene device according to the invention;

FIG. 5C a front side of the further alternative oral hygiene device according to the invention with the application unit, handle unit and coupling unit, in a schematic illustration;

FIG. 5D a rear side of the further alternative oral hygiene device according to the invention with the application unit, handle unit and coupling unit, in a schematic illustration;

FIG. 5E a side of the further alternative oral hygiene device according to the invention with the application unit, handle unit and coupling unit, in a schematic illustration;

FIG. 5F a front side of the handle unit of the further alternative oral hygiene device according to the invention, in a schematic illustration;

FIG. 5G a rear side of the handle unit of the further alternative oral hygiene device according to the invention, in a schematic illustration;

FIG. 5H a side of the handle unit of the further alternative oral hygiene device according to the invention, in a schematic illustration;

FIG. 6A a perspective, schematic illustration of a further alternative oral hygiene device according to the invention with an application unit, a handle unit, and a coupling unit;

FIG. 6B a perspective, schematic illustration of the handle unit of the further alternative oral hygiene device according to the invention;

FIG. 6C a front side of the further alternative oral hygiene device according to the invention with the application unit, handle unit and coupling unit, in a schematic illustration;

FIG. 6D a rear side of the further alternative oral hygiene device according to the invention with the application unit, handle unit and coupling unit, in a schematic illustration;

FIG. 6E a side of the further alternative oral hygiene device according to the invention with the application unit, handle unit and coupling unit;

FIG. 6F a front side of the handle unit of the further alternative oral hygiene device according to the invention, in a schematic illustration;

FIG. 6G a rear side of the handle unit of the further alternative oral hygiene device according to the invention, in a schematic illustration;

FIG. 6H a side of the handle unit of the further alternative oral hygiene device according to the invention, in a schematic illustration;

FIG. 7A a perspective, schematic illustration of a further alternative oral hygiene device according to the invention with an application unit, a handle unit, and a coupling unit;

FIG. 7B a perspective, schematic illustration of the handle unit of the further alternative oral hygiene device according to the invention;

FIG. 7C a front side of the further alternative oral hygiene device according to the invention with the application unit, handle unit and coupling unit, in a schematic illustration;

FIG. 7D a rear side of the further alternative oral hygiene device according to the invention with the application unit, handle unit and coupling unit, in a schematic illustration;

FIG. 7E a side of the further alternative oral hygiene device according to the invention with the application unit, handle unit and coupling unit, in a schematic illustration;

FIG. 7F a front side of the handle unit of the further alternative oral hygiene device according to the invention, in a schematic illustration;

FIG. 7G a rear side of the handle unit of the further alternative oral hygiene device according to the invention, in a schematic illustration;

FIG. 7H a side of the handle unit of the further alternative oral hygiene device according to the invention, in a schematic illustration;

FIG. 8A a perspective, schematic illustration of a further alternative oral hygiene device according to the invention with an application unit, a handle unit, and a coupling unit;

FIG. 8B a perspective, schematic illustration of the handle unit of the further alternative oral hygiene device according to the invention;

FIG. 8C a front side of the further alternative oral hygiene device according to the invention with the application unit, handle unit and coupling unit, in a schematic illustration;

FIG. 8D a rear side of the further alternative oral hygiene device according to the invention with the application unit, handle unit and coupling unit, in a schematic illustration;

FIG. 8E a side of the further alternative oral hygiene device according to the invention with the application unit, handle unit and coupling unit, in a schematic illustration;

FIG. 8F a front side of the handle unit of the further alternative oral hygiene device according to the invention, in a schematic illustration;

FIG. 8G a rear side of the handle unit of the further alternative oral hygiene device according to the invention, in a schematic illustration;

FIG. 8H a side of the handle unit of the further alternative oral hygiene device according to the invention, in a schematic illustration;

FIG. 9A a perspective, schematic illustration of a further alternative oral hygiene device according to the invention with an application unit, a handle unit, and a coupling unit;

FIG. 9B a further perspective, schematic illustration of the further alternative oral hygiene device according to the invention with an application unit, a handle unit and a coupling unit;

FIG. 9C a front side of the further alternative oral hygiene device according to the invention with the application unit, handle unit and coupling unit, in a schematic illustration;

FIG. 9D a rear side of the further alternative oral hygiene device according to the invention with the application unit, handle unit and coupling unit, in a schematic illustration;

FIG. 9E a side of the further alternative oral hygiene device according to the invention with the application unit, handle unit and coupling unit, in a schematic illustration;

FIG. 10A a perspective, schematic illustration of a further alternative oral hygiene device according to the invention with an application unit, a handle unit, and a coupling unit;

FIG. 10B a further perspective, schematic illustration of the further alternative oral hygiene device according to the invention with an application unit, a handle unit and a coupling unit;

FIG. 10C a front side of the further alternative oral hygiene device according to the invention with the application unit, handle unit and coupling unit, in a schematic illustration;

FIG. 10D a rear side of the further alternative oral hygiene device according to the invention with the application unit, handle unit and coupling unit, in a schematic illustration;

FIG. 10E a side of the further alternative oral hygiene device according to the invention with the application unit, handle unit and coupling unit, in a schematic illustration;

FIG. 11A an exploded illustration in a 3D view of a further alternative oral hygiene device according to the invention with an application unit, a handle unit, a coupling unit and a terminating element; and FIG. 11B a perspective, schematic illustration of the further alternative oral hygiene device according to the invention with an application unit, a handle unit, a coupling unit and a terminating element.

DESCRIPTION OF EXEMPLARY EMBODIMENTS

FIG. 1A shows a front side 34*a* of an oral hygiene device 10*a* in a schematic, perspective illustration. The oral hygiene device 10*a* in the present case is configured as a toothbrush. The oral hygiene device 10*a* is configured as a manual toothbrush. The oral hygiene device 10*a* is configured as an exchangeable head toothbrush. Also, the oral hygiene device 10*a* could be configured as a flosser, a single-tuft brush, an interdental cleaner, a tongue cleaner or similar. Furthermore, combined oral hygiene devices 10*a* are conceivable which combine at least two different functions, for example a toothbrush with tongue cleaner, a toothbrush with massage elements, or similar.

The oral hygiene device 10*a* has an application unit 12*a*. The oral hygiene device 10*a* also has a handle unit 14*a*. The handle unit 14*a* is formed by a manual handle unit 14*a*. The at least one handle unit 14*a* consists of a single material.

Reference is made below to FIGS. 1A to 1H which show various views of the oral hygiene device 10*a* and the handle unit 14*a*. Because of the different views, some elements are not shown in all figures, and accordingly not marked with reference signs in all figures. In general, the cleaning region 48*a* is shown schematically. FIG. 1B shows the front side 34*a* of the handle unit 14*a* in a perspective, schematic illustration. FIG. 1C shows a front side 34*a* of the oral hygiene device 10*a* in a schematic illustration. FIG. 1D shows a rear side 36*a* of the oral hygiene device 10*a* in a schematic illustration. FIG. 1E shows the side of the oral hygiene device 10*a* in a schematic illustration. FIG. 1F shows the front side 34*a* of the handle unit 14*a* of the oral hygiene device 10*a* in a top view. FIG. 1G shows the rear side 36*a* of the handle unit 14*a* of the oral hygiene device 10*a* in a schematic illustration. FIG. 1H shows a side of the handle unit 14*a* of the oral hygiene device 10*a* in a schematic illustration.

The oral hygiene device 10*a* has a longitudinal axis 30*a*, a vertical axis 38*a*, and a transverse axis 40*a*. The longitudinal axis 30*a* is arranged parallel to a main extension direction 42*a* of the oral hygiene device 10*a*. The longitudinal axis 30*a* furthermore corresponds to a longitudinal axis 30*a* of the handle unit 14*a*. If the oral hygiene device 10*a* is laid with its rear side 36*a* on a flat surface, so that the longitudinal axis 30*a* is arranged parallel to the surface, the vertical axis 38*a* is arranged perpendicularly to the longitudinal axis 30*a* and also perpendicularly to the surface and to the transverse axis 40*a*. The transverse axis 40*a* is perpendicular to the longitudinal axis 30*a* and perpendicular to the vertical axis 38*a*. In the present case, the oral hygiene device 10*a* has a length, in particular parallel to the longitudinal axis 30*a* of the oral hygiene device 10*a*, from 130 mm to 210 mm, and preferably from 180 mm to 200 mm. Furthermore, the oral hygiene device 10*a* has a maximum width, in particular parallel to the transverse axis 40*a* of the oral hygiene device 10*a*, from 10 mm to 25 mm, and preferably from 18 mm to 21 mm. Furthermore, the oral hygiene device 10*a*, in a neck region 44*a* of the application unit 12*a*, has a minimum width from 4 mm to 10 mm, preferably from 5 mm to 7 mm. Moreover, the oral hygiene device 10*a* without bristles has a height, in particular measured parallel to the vertical axis 38*a*, from 10 mm to 22 mm, and preferably from 12 mm to 18 mm. The handle unit 14*a* has a weight from 20 g to 40 g, preferably from 25 g to 35 g. The oral hygiene device 10*a* has a weight from 20 to 45 g, preferably from 28 g to 38 g. Preferably, a ratio of the weight of the handle unit 14*a* to a weight of the oral hygiene device 10*a*, i.e. with the handle unit 14*a* and the application unit 12*a*, is from 0.75 to 0.95, preferably from 0.85 to 0.93.

The application unit 12*a* is formed by a push-on part. The application unit 12*a* can be separated from the handle unit 14*a*, in particular without tools. The application unit 12*a* is formed for example by a push-on brush. In principle, however, other designs of application unit 12*a* which appear suitable to a person skilled in the art are conceivable. The application unit 12*a* has a base body 13*a*. The application unit 12*a* has a head region 46*a*. The head region 46*a* forms a brush head of the oral hygiene device 10*a*. In the present case, the head region 46*a* is configured as a toothbrush head. The head region 46*a* has in particular a base body configured as a bristle carrier.

A base body of the head region 46*a* is made completely from a hard component. It would however also be conceivable for the base body of the head region 46*a* to consist of a hard component and a soft component. The base body of the head region 46*a* forms a bristle carrier. The oral hygiene device 10*a* furthermore comprises a cleaning region 48*a* which is received by the head region 46*a* and which comprises a plurality of bristle bundles. At least one cutout is formed on the front side 34*a* of the head region 46*a*. The at least one cutout is provided to receive a bristle bundle. The head region 46*a* has a plurality of cutouts. The cutouts are formed by bristle holes. The bristles may be any suitable bristles which, as described above, may be punch-fitted, for example in the anchor punching process. In principle, the use of anchor-free processes is also conceivable. In this way, an anchor-free oral hygiene device 10*a* can be provided, and hence an oral hygiene device 10*a* without metal since the anchor wire may be omitted. In the case of certain anchor-free processes, a recess is provided in the head region 46*a* which serves to receive a plate parallel to the handle unit 14*a*. The plate is produced in particular by means of an injection molding process, wherein the bristles are fitted to the plate before fixing. The plate is intended to be anchored in the recess of the head region 46*a*, in particular by means of welding. The bristle bundles may differ with respect to their length, composition, number of bristles, bristle material, color, surface structuring and similar. Also, angles at which the bristles and/or bristle bundles stand relative to one another or to a surface of the base body of the head region 46*a* may vary between bristles and/or between bristle bundles. In the present case, the application unit 12*a* also comprises the at least one neck region 44*a*, which in particular connects the head region 46*a* to the handle unit 14*a*. The neck region 44*a* forms a neck. The base body 13*a* of the application unit 12*a* comprises the head region 46*a* and the neck region 44*a*.

The application unit 12*a* is arranged on the top side of the oral hygiene device 10*a*. The application unit 12*a* forms a topmost point of the oral hygiene device 10*a*. The application unit 12*a* is for example made completely from a hard component. It would however also be conceivable for the application unit 12*a* to consist partially of a soft component and partially of a hard component. With respect to suitable soft and/or hard components, reference is made to the description above. In principle, the application unit 12*a* may comprise at least one tongue cleaner element. The tongue cleaner element may in particular comprise studs and/or ribs. Preferably, the tongue cleaner element is arranged on the rear side of the head region 46*a*, in particular this may be arranged on a ring of the soft component and/or on an island of a hard component.

The neck region 44*a* forms a transition between the application unit 12*a* and the handle unit 14*a*. The neck region 44*a* is made of the hard component. The neck region 44*a* is formed integrally with the head region 46*a*.

The handle unit 14*a* comprises a base body 16*a*. The handle unit 14*a* has at least one gripping face 50*a* which forms a surface 32*a* of the base body 16*a*. The gripping face

50*a* runs on the front side 34*a* from an end of the handle unit 14*a* facing the neck region 44*a* to the lower end of the oral hygiene device 10*a* on the underside. The base body 16*a* of the handle unit 14*a* delimits at least one opening 24*a*. The opening 24*a* extends completely through the base body 16*a* and is surrounded by the base body 16*a* in at least one plane. The opening 24*a* is completely surrounded by the base body 16*a* in a plane parallel to the main extension plane of the handle unit 14*a*. The opening 24*a* is completely surrounded by the base body 16*a* in the main extension plane of the handle unit 14*a*. The base body 16*a* has a first loop 52*a* which extends around the opening 24*a*. The opening 24*a* has a drop-like and/or lenticular cross-sectional form in the main extension plane of the handle unit 14*a*. The opening 24*a* is in particular oriented along the longitudinal axis 30*a* of the handle unit 14*a*. The first loop 52*a* of the base body 16*a* forms two lateral longitudinal webs 54*a*, 54*a*', which are connected at a front end and a rear end of the opening 24*a* along the longitudinal axis 30*a*, and surround the opening 24*a*. The first loop 52*a* is closed. In particular, there are no open ends, such as for example fork-like designs. The first loop 52*a* has for example an at least approximately diamond-shaped cross-section in a plane perpendicular to the longitudinal axis 30*a*. The longitudinal webs 54*a*, 54*a*' of the first loop 52*a* have a diamond-shaped cross-section. The longitudinal webs 54*a*, 54*a*' of the first loop 52*a* are rounded or radiused on the outside, i.e. outside the opening 24*a*. Furthermore, the longitudinal webs 54*a*, 54*a*' of the first loop 52*a* are approximately angular on the inside, i.e. facing the opening 24*a*, in particular they have sharp edges. The cross-sections of the longitudinal webs 54*a*, 54*a*' each have four sides, of which at least one is concavely curved and at least one is convexly curved. Preferably, at least one of the sides of the cross-sections of the longitudinal webs 54*a*, 54*a*' facing the opening 24*a* on the front side 34*a* is concavely curved. Furthermore, preferably the outer sides, i.e. in particular, the sides of the cross-sections of the longitudinal webs 54*a*, 54*a*' facing away from the opening 24*a*, are convexly curved. The cross-sections of the longitudinal webs 54, 54*a*' may change at least partially over a longitudinal course, in particular with respect to a dimensioning of the cross-section. The opening 24*a* has a width from 4 mm to 9 mm, preferably from 5 mm to 7.5 mm. The opening 24*a* has a length from 10 mm to 60 mm, preferably from 25 mm to 50 mm. The opening 24*a* may furthermore perform further functions. For example, it would be conceivable that the oral hygiene device 10*a* could be suspended via the opening 24*a*, for example on a hook.

The base body 16*a* of the handle unit 14*a* furthermore delimits a further opening 28*a* which is arranged behind the opening 24*a* along the longitudinal axis 30*a* of the handle unit 14*a*. The further opening 28*a* is arranged on a side of the opening 24*a* facing away from the application unit 12*a*. The opening 24*a* and the further opening 28*a* have no direct connection. The opening 24*a* and the further opening 28*a* are separated by the base body 16*a* of the handle unit 14*a*. The further opening 28*a* extends completely through the base body 16*a* and is completely surrounded by the base body 16*a* in at least one plane. The further opening 28*a* is completely surrounded by the base body 16*a* in a plane parallel to a main extension plane of the handle unit 14*a*. The further opening 28*a* is completely surrounded by the base body 16*a* in the main extension plane of the handle unit 14*a*. The base body 16*a* has a second loop 56*a* which extends around the further opening 28*a*. The further opening 28*a* has a drop-like and/or lenticular cross-sectional form in the main extension plane of the handle unit 14*a*. The further opening 28*a* is in particular oriented along the longitudinal axis 30*a* of the handle unit 14*a*. The second loop 56*a* of the base body 16*a* forms two lateral longitudinal webs 58*a*, 58*a*' which are connected at a front end and a rear end of the further opening 28*a* along the longitudinal axis 30*a*, and surround the further opening 28*a*. Between the opening 24*a* and the further opening 28*a*, the first loop 52*a* and the second loop 56*a* in particular form a node point at which the loops 52*a*, 56*a* run into one another. At the node point, a left longitudinal web 54*a* of the first loop 52*a* transforms into the right longitudinal web 58*a*' of the second loop 56*a*. Furthermore, at the node point, a right longitudinal web 54*a*' of the first loop 52*a* transforms into the left longitudinal web 58*a* of the second loop 56*a*. The second loop 56*a* is closed. The second loop 56*a* has for example an at least approximately diamond-shaped cross-section in a plane perpendicular to the longitudinal axis 30*a*. The longitudinal webs 58*a*, 58*a*' of the second loop 52*a* have a diamond-like cross-section. The longitudinal webs 58*a*, 58*a*' of the second loop 56*a* are formed rounded or radiused on the outside, i.e. outside the further opening 28*a*. Furthermore, the longitudinal webs 88*a*, 58*a*' of the second loop 56*a* are approximately angular on the inside, i.e. facing the further opening 28*a*, in particular they have a sharp edge. The cross-sections of the longitudinal webs 58*a*, 58*a*' each have four sides, of which at least one is concavely curved and at least one is convexly curved. Preferably, at least one of the sides of the cross-sections of the longitudinal webs 58*a*, 58*a*' facing the further opening 28*a* on the front side 34*a* is concavely curved. Furthermore, preferably the outer sides, i.e. in particular the sides of the cross-sections of the longitudinal webs 58*a*, 58*a*' facing away from the further opening 28*a*, are convexly curved. The cross-sections of the longitudinal webs 58*a*, 58*a*' may change at least partially over a longitudinal course, in particular with respect to a dimensioning of the cross-section. The further opening 28*a* has a width from 4 mm to 9 mm, preferably from 5 mm to 7.5 mm. The further opening 28*a* has a length from 10 mm to 60 mm, preferably from 25 mm to 50 mm. The further opening 28*a* may furthermore perform further functions. For example, it would be conceivable that the oral hygiene device 10*a* could be suspended via the further opening 28*a*, for example on a hook.

Viewed in a plane parallel to a main extension plane of the handle unit 14*a*, the handle unit 14*a* has an at least approximately figure-of-eight shaped base form. Viewed in a plane parallel to a main extension plane of the handle unit 14*a*, the handle unit 14*a* has at least approximately the form of an infinity symbol. The base body 16*a* of the handle unit 14*a*, together with the loops 52*a*, 56*a*, forms a figure-of-eight. The first loop 52 is smaller, in particular narrower and shorter, than the second loop 56*a*. Furthermore, the opening 24*a* is smaller than the further opening 28*a*. The position of the node point relative to the total length of the handle unit 14*a* lies between 60 mm and 80 mm, preferably between 65 mm and 75 mm, measured from the free end, along the longitudinal axis 30*a* of the handle unit 14*a*. The position of the node point relative to the total length of the handle unit 14*a*, as a percentage of the total length of the handle unit 14*a*, lies between 35% and 55%, preferably between 40% and 50%, measured from the free end. Preferably, the cross-sections of the loops 52*a*, 56*a* of the base body 16*a* of the handle unit 14*a* are at least similar, wherein the loops 52*a*, 56*a*, may for example transform into a further shape at their ends or at the node point.

The handle unit 14*a* has a thumb grip region 26*a*. The handle unit 14*a* furthermore has a palm grip region 60*a*. The opening 24*a* is at least partially arranged in the thumb grip region 26a. The further opening 28a is at least partially arranged in the palm grip region 60a. The base body 16a of the handle unit 14a forms a depression in the thumb grip region 26a towards the opening 24a. The depression is arranged at least on a front side 34a of the base body 16a of the handle unit 14a. The depression is formed concave. The depression is formed by the first loop 52a.

The loops 52a, 56a of the handle unit 14a furthermore have a width from 4 mm to 8 mm, preferably from 5 mm to 7 mm. Furthermore, the loops 52a, 56a of the handle unit 14a have a height from 4 mm to 20 mm, preferably from 6 mm to 15 mm. The base body 16a or the loops 52a, 56a of the handle unit 14a form a course in the longitudinal direction. The base body 16a or the loops 52a, 56a have a minimum height of 7.6 mm and a maximum height of 12.9 mm along the course. In a side view, the handle unit 14a has a bent, in particular curved longitudinal form. On the rear side 36a, the handle unit 14a has in particular support points at the free end and at an end facing the application unit 12a, for laying down on a surface. The handle unit 14a has a weight from 20 g to 40 g, preferably from 25 g to 35 g. Furthermore, the handle unit 14a forms a thickening at an end facing the application unit 12a, so as to give an optimum transition from the slender design of the handle unit 14a to the application unit 12a.

The base body 16a of the handle unit 14a has a hardness and density which are greater than a hardness and density of the base body 13a of the application unit 12a. The base body 13a of the application unit 12a consists of plastic and has a density from 800 kg/$m^3$ to 1600 kg/$m^3$. A ratio to the density of the handle unit 16a amounts to between 0.2 and 0.75, preferably between 0.35 and 0.6. The base body 16a of the handle unit 14a has a density from 2000 kg/$m^3$ to 3500 kg/$m^3$, preferably from 2400 kg/$m^3$ to 3000 kg/$m^3$.

The base body 16a of the handle unit 14a consists largely of a metallic material. The base body 16a of the handle unit 14a consists completely of a metallic material. The handle unit 14a consists completely of a metallic material. The metallic material is formed by an aluminum alloy. The metallic material comprises between 1% and 13% silicon, between 0.5% and 2% iron, and maximum 5% copper. The metallic material comprises maximum 13% magnesium. The metallic material comprises maximum 1% nickel. The metallic material comprises maximum 5% zinc. The aluminum alloy may for example be of a first type comprising in particular 5% to 10% silicon, less than 2% iron, 2% to 5% copper, less than 1% magnesium, less than 1% nickel, less than 5% zinc and/or less than 1% tin. The aluminum alloy of the first type in particular has a density from 2000 kg/$m^3$ to 3500 kg/$m^3$, preferably from 2400 kg/$m^3$ to 3000 kg/$m^3$. Alternatively, the aluminum alloy may for example be of a second type, in particular comprising 8% to 13% silicon, less than 1.5% iron, 1% to 4% copper, less than 1% magnesium, less than 1% nickel, less than 2% zinc, less than 1% tin, less than 0.5% lead and/or less than 0.2% titanium. The aluminum alloy of the second type in particular has a density from 2000 kg/$m^3$ to 3500 kg/$m^3$, preferably from 2400 kg/$m^3$ to 3000 kg/$m^3$. Alternatively, the aluminum alloy may for example be of a third type, in particular comprising less than 1.5% silicon, less than 1.5% iron, less than 1% copper, less than 1% magnesium, less than 1% zinc and/or less than 1% titanium. The aluminum alloy of the third type has in particular a density from 2000 kg/$m^3$ to 3500 kg/$m^3$, preferably from 2400 kg/$m^3$ to 3000 kg/$m^3$. Alternatively, the aluminum alloy may for example be of a fourth type, in particular comprising 1.5% to 3.5% silicon, less than 1.5% iron, less than 1% copper, less than 1% manganese, between 6% and 13% magnesium, less than 1% nickel, less than 1% zinc, less than 1% tin, less than 0.5% lead and/or less than 0.5% titanium. The aluminum alloy of the fourth type has in particular a density from 2000 kg/$m^3$ to 3500 kg/$m^3$, preferably from 2400 kg/$m^3$ to 3000 kg/$m^3$. Alternatively, the aluminum alloy may for example be of a fifth type, comprising in particular 1% to 3% silicon, less than 1% iron, less than 1% copper, less than 1% manganese, between 3% and 8% magnesium, less than 1% zinc and/or less than 0.5% titanium. The aluminum alloy of the fifth type has in particular a density from 2000 kg/$m^3$ to 3500 kg/$m^3$, preferably from 2400 kg/$m^3$ to 3000 kg/$m^3$. Alternatively, the aluminum alloy may for example be of a sixth type. The aluminum alloy of the sixth type has in particular a density from 2000 kg/$m^3$ to 3500 kg/$m^3$, preferably from 2400 kg/$m^3$ to 3000 kg/$m^3$.

At least the base body 16a of the handle unit 14a is produced in a diecasting process. The handle unit 14a is produced in a diecasting process. The handle unit 14a is produced in an aluminum diecasting process. In principle however, other production methods which appear suitable to a person skilled in the art are conceivable, as has already been explained above.

Furthermore, the oral hygiene device 10a has a coupling unit 18a for releasable coupling of the application unit 12a to the handle unit 14a. The coupling unit 18a serves for exchange of the application unit 12a on the handle unit 14a. The coupling unit 18a has a first coupling element 20a. Furthermore, the coupling unit 18a has a second coupling element 22a corresponding to the first coupling element 20a. The first coupling element 20a forms an interface receiver, while the second coupling element 22a forms an interface protrusion. The first coupling element 20a delimits an interface receiver. The first coupling element 20a is formed integrally with the application unit 12a. The first coupling element 20a is formed integrally with the base body 13a of the application unit 12a. The first coupling element 20a is arranged on a side of the application unit 12a facing away from the head region 46a. The first coupling element 20a is arranged at an end of the neck region 44a facing away from the head region 46a. The first coupling element 20a is arranged in the neck region 44a of the application unit 12a. The coupling unit 18a is provided for a rotationally fixed coupling of the first coupling element 20a to the second coupling element 22a. The second coupling element 22a is firmly connected to the handle unit 14a. The second coupling element 22a of the coupling unit 18a is formed integrally with the handle unit 14a. The second coupling element 22a is formed by an interface protrusion which protrudes at least partially out of the base body 16a of the handle unit 14a. The second coupling element 22a is arranged on a side of the handle unit 14a facing the application unit 12a. The second coupling element 22a is arranged at an end of the handle unit 14a facing away from the lower end of the handle unit 14a. The second coupling element 22a forms a part of the handle unit 14a. The second coupling element 22a consists of a metallic material.

The second coupling element 22a forms a plug-like coupling structure 86a. The second coupling element 22a is divided into three stages 62a, 64a, 66a; namely a first stage 62a at a free end, an adjacent second stage 64a, and a terminating third stage 66a which transforms into an oblique stop face 68a of the handle unit 14a. The first stage 62a is divided into an upper part element 70a and a lower part element 72a. The upper part element 70a of the first stage 62a is at least partially cylindrical or approximately cylindrical, and rises as a ramp in the direction of the second stage

64*a*. The upper part element 70*a* is wedge-shaped. Around half-way along the first stage 62*a*, an at least approximately rectangular groove 74*a* begins, which also continues over the entire second stage 64*a* up to the stop at the third stage 66*a*. The lower part element 72*a* of the first stage 62*a* is formed by a wall-like web, which continues from the first stage 62*a* over the entire second stage 64*a* up to a stop on the third stage 66*a*. The lower part element 72*a* is formed chamfered at its free end, or the wall-like web is chamfered. The rectangular groove 74*a* on the top side of the upper part element 76*a* of the second stage 64*a*, and the web of the lower part element 72*a* of the first stage 62*a*, serve in particular for a secure and twist-free insertion into the corresponding socket-like first coupling element 20*a* of the coupling unit 18*a*. The second stage 64*a* has an upper part element 76*a*. The upper part element 76*a* has a semicylindrical form with a center axis which is parallel, in particular coaxial, to the longitudinal axis 30*a* of the handle unit 14*a*. A diameter of the upper part element 76*a* of the second stage 64*a* is greater than a diameter of the upper part element 70*a* of the first stage 62*a*. The third stage 66*a* is divided into an upper part element 78*a* and a lower part element 80*a*. The upper part element 78*a* of the third stage 66*a* has a semi-cylindrical form with a center axis which is parallel, in particular coaxial, to the longitudinal axis 30*a* of the handle unit 14*a*. The lower part element 80*a* of the third stage 66*a* has a semicylindrical form with a center axis which is parallel, in particular coaxial, to the longitudinal axis 30*a* of the handle unit 14*a*. A diameter of the upper part element 78*a* of the third stage 66*a* is smaller than a diameter of the lower part element 80*a* of the third stage 66*a*. Furthermore, the third stage 66*a* has a cam 82*a* at the lower part element 80*a*. The cam 82*a* is formed by a latching cam which is provided to latch into a corresponding latching recess 84*a* of the first coupling element 20*a*. The cam 82*a* has an at least approximately keyhole-shaped contour. The cam 82*a* has a rectangular stem and a round crown. This design ensures a particularly good latching with a contra-designed latching recess 84*a* of the first coupling element 20*a*. The cam 82*a* protrudes out of the lower part element 80*a*. The cam 82*a* is furthermore exposed. Exposure is in particular created during production. For exposure, a rectangular depression is made in the lower part element 80*a* around the cam 82*a*. The first stage 62*a* is longer than the second stage 64*a* and approximately the same length as the third stage 66*a* on its underside. The third stage 66*a* on its underside is correspondingly longer than the second stage 64*a*, but on its top side is slightly shorter than the second stage 64*a*.

The first coupling element 20*a* of the coupling unit 18*a* is at least approximately designed as a counterpart to the second coupling element 22*a*. The first coupling element 20*a* is divided into three stages, namely a first stage on the inside, a second stage, and a third stage at the free end. The first stage has an upper partial recess and a lower partial recess, wherein the partial recesses are each formed cylindrical and transform into one another. The second stage has a cylindrical recess. Furthermore, the first coupling element 20*a* has two webs which extend over the first and second stages respectively and protrude into the recesses of the first and second stages. The webs extend on opposite sides along a longitudinal axis 30*a* of the oral hygiene device 10*a*. A diameter of the upper and lower partial recesses of the first stage is in each case smaller than a diameter of the recess of the second stage. The third stage has a cylindrical recess. The diameter of the cylindrical recess of the third stage is greater than a diameter of the cylindrical recess of the second stage.

In a method for production of the handle unit 14*a*, at least the base body 16*a* of the handle unit 14*a* is made at least largely from a metallic material. The entire handle unit 14*a* is made from a metallic material. The handle unit 14*a* is made from an aluminum alloy. Furthermore, the at least one base body 16*a* of the handle unit 14*a* is produced in a diecasting process. The entire handle unit 14*a* is produced in a diecasting process. The handle unit 14*a* is produced in an aluminum diecasting process. In the diecasting process, the metallic material is pressed into a diecasting mold for the handle unit 14*a* under high pressure and with a high mold filling speed. The second coupling element 22*a* is produced with the handle unit 14*a*. The second coupling element 22*a* is produced with the handle unit 14*a* in the diecasting process. After production of the handle unit 14*a*, a further treatment step occurs. In the further treatment step, a surface 32*a* of at least the base body 16*a* of the handle unit 14*a* is anodized. A complete surface 32*a* of the handle unit 14*a* and at least part of the second coupling element 22*a* are anodized in the later treatment step. During anodizing, an oxidic protective layer is created on the alloy. In particular, an anodic oxidation takes place. In particular, the protective layer is formed by conversion of the top metal layer into an oxide and/or hydroxide. In particular, an oxide layer is created with a layer thickness from 5 μm to 30 μm, preferably from 15 μm to 25 μm. The base body 16*a* of the handle unit 14*a* may be colored in particular during or after anodizing in the later treatment step. In principle, however, as already stated above, other later treatment steps are conceivable which appear suitable to the person skilled in the art.

FIGS. 2A to 8H show five further exemplary embodiments of the invention. The descriptions below are substantially restricted to the differences between the exemplary embodiments, wherein with respect to the same components, features and functions, reference may be made to the description of the other exemplary embodiments, in particular of FIGS. 1A to 1H. To distinguish the exemplary embodiments, the suffix letter a in the reference signs of the exemplary embodiment of FIGS. 1A to 1H has been replaced by the suffix letters b to h in the reference signs of the exemplary embodiments of FIGS. 2A to 7H. With respect to components with the same designation, in particular with respect to components with the same reference signs, in principle reference may be made to the drawings and/or the description of the other exemplary embodiments, in particular of FIGS. 1A to 1H.

FIGS. 2A to 2H show an oral hygiene device 10*b* in various illustrations. The oral hygiene device 10*b* is configured as an exchangeable head toothbrush. The oral hygiene device 10*b* has an application unit 12*b*. The oral hygiene device 10*b* furthermore has a handle unit 14*b*. The application unit 12*b* is formed by a push-on part. The application unit 12*b* has a base body 13*b*. The application unit 12*b* can be detached from the handle unit 14*b*, in particular without tools. Furthermore, the oral hygiene device 10*b* comprises a coupling unit 18*b* for releasable coupling of the application unit 12*b* to the handle unit 14*b*. In general, the cleaning region 48*b* of the application unit 12*b* is illustrated schematically.

The handle unit 14*b* has a base body 16*b*. The base body 16*b* of the handle unit 14*b* delimits at least one opening 24*b*. The opening 24*b* extends completely through the base body 16*b* and is surrounded by the base body 16*b* in at least one plane. The opening 24*b* is completely surrounded by the base body 16*b* in a plane parallel to the main extension plane of the handle unit 14*b*. The opening 24*b* is completely surrounded by the base body 16*b* in the main extension plane of the handle unit 14*b*. The base body 16*b* has a loop 52*b* which extends around the opening 24*b*. The opening 24*b* has a figure-of-eight shaped cross-sectional form in the main extension plane of the handle unit 14*b*. The opening 24*b* is in particular oriented along the longitudinal axis 30*b* of the handle unit 14*b*. The loop 52*b* of the base body 16*b* forms two lateral longitudinal webs 54*b*, 54*b*', which are connected at a front end and a rear end of the opening 24*b* along the longitudinal axis 30*b*, and surround the opening 24*b*. The loop 52*b* is closed. In particular, there are no open ends, such as for example fork-like designs. The loop 52*b* has for example an at least approximately diamond-shaped cross-section in a plane perpendicular to the longitudinal axis 30*b*. The longitudinal webs 54*b*, 54*b*' of the loop 52*b* have a diamond-shaped cross-section. The longitudinal webs 54*b*, 54*b*' of the loop 52*b* are rounded or radiused on the outside, i.e. outside the opening 24*b*. Furthermore, the longitudinal webs 54*b*, 54*b*' of the loop 52*b* are approximately angular on the inside, i.e. facing the opening 24*b*, in particular they have sharp edges. The cross-sections of the longitudinal webs 54*b*, 54*b*' each have four sides, of which at least one is concavely curved and at least one is convexly curved. Preferably, at least one of the sides of the cross-sections of the longitudinal webs 54*b*, 54*b*' facing the opening 24*b* on the front side 34*b* is concavely curved. Furthermore, preferably the outer sides, i.e. in particular the sides of the cross-sections of the longitudinal webs 54*b*, 54*b*' facing away from the opening 24*b*, are convexly curved. The cross-sections of the longitudinal webs 54*b*, 54*b*' may change at least partially over a longitudinal course, in particular with respect to the dimensioning of the cross-section.

The handle unit 14*b* has a thumb grip region 26*b*. The handle unit 14*b* furthermore has a palm grip region 60*b*. The opening 24*b* is arranged at least partially in the thumb grip region 26*b* and in the palm grip region 60*b*. The base body 16*b* and the opening 24*b* form a constriction between the thumb grip region 26*b* and the palm grip region 60*b*. The constriction is used, inter alia, to set back the thumb grip region 26*b*. The thumb grip region 26*b* does not however take up the complete part of the opening 24*b* in front of the constriction, but substantially only the foremost part of the opening 24*b*.

FIGS. 3A to 3H show an oral hygiene device 10*c* in various illustrations. The oral hygiene device 10*c* is configured as an exchangeable head toothbrush. The oral hygiene device 10*c* has an application unit 12*c*. The oral hygiene device 10*c* furthermore has a handle unit 14*c*. The application unit 12*c* is formed by a push-on part. The application unit 12*c* has a base body 13*c*. The application unit 12*c* can be detached from the handle unit 14*c*, in particular without tools. Furthermore, the oral hygiene device 10*c* comprises a coupling unit 18*c* for releasable coupling of the application unit 12*c* to the handle unit 14*c*. In general, the cleaning region 48*c* of the application unit 12*c* is illustrated schematically.

The handle unit 14*c* has as an outer form of an at least approximate figure-of-eight shape when viewed in a plane parallel to the main extension plane of the handle unit 14*c*. The handle unit 14*c* has a base body 16*c*. The base body 16*c* is formed at least substantially flat on a front side 34*c*. On a rear side 36*c*, the base body 16*c* has a recess 24*c*. The recess 24*c* is formed by a depression. The recess 24*c* is at least partially surrounded by the base body 16*c* in a plane parallel to the main extension plane of the handle unit 14*c*. The recess 24*c* has a figure-of-eight shaped cross-section in the main extension plane of the handle unit 14*c*. The handle unit 14*c* has a thumb grip region 26*c*. The handle unit 14*c* furthermore has a palm grip region 60*c*. The recess 24*c* is arranged at least partially on the back of the thumb grip region 26*c* and the palm grip region 60*c*. The base body 16*c* and the recess 24*c* form a constriction between the thumb grip region 26*c* and the palm grip region 60*c*. The constriction is used, inter alia, to set back the thumb grip region 26*c*.

FIGS. 4A to 4H show an oral hygiene device 10*d* in various illustrations. The oral hygiene device 10*d* is configured as an exchangeable head toothbrush. The oral hygiene device 10*d* has an application unit 12*d*. The oral hygiene device 10*d* furthermore has a handle unit 14*d*. The application unit 12*d* is formed by a push-on part. The application unit 12*d* has a base body 13*d*. The application unit 12*d* can be detached from the handle unit 14*d*, in particular without tools. Furthermore, the oral hygiene device 10*d* comprises a coupling unit 18*d* for releasable coupling of the application unit 12*d* to the handle unit 14*d*. In general, the cleaning region 48*d* of the application unit 12*d* is illustrated schematically.

The coupling unit 18*d* has a first coupling element 20*d*. Furthermore, the coupling unit 18*d* has a second coupling element 22*d* corresponding to the first coupling element 20*d*. The first coupling element 20*d* forms an interface receiver, while the second coupling element 22*d* forms an interface protrusion. The first coupling element 20*d* delimits an interface receiver. The first coupling element 20*d* is formed integrally with the application unit 12*d*. The first coupling element 20*d* is arranged on a side of the application unit 12*d* facing away from the head region 46*d*.

The second coupling element 22*d* is formed by a separate component. The second coupling element 22*d* of the coupling unit 18*d* consists at least largely of a plastic. The second coupling element 22*d* is in particular produced in an injection molding process. The second coupling element 22*d* consists completely of a plastic. In principle however, it would also be conceivable for the second coupling element 22*d* to consist of another material which appears suitable to a person skilled in the art. The second coupling element 22*d* has a plug-like coupling structure 86*d*. The second coupling element 22*d* also has a base body 88*d* on which the plug-like coupling structure 86*d* is arranged. The second coupling element 22*d* is formed of one piece. Furthermore, the second coupling element 22*d* has an interface (not visible further) for coupling to the handle unit 14*d*. This interface is arranged on a side of the base body 88*d* facing the plug-like coupling structure 86*d*. The second coupling element 22*d* is connected to the handle unit 14*d* at least by form fit and/or substance bonding. The second coupling element 22*d* is connected to the handle unit 14*d* for example by means of a push fit and/or adhesive connection. The second coupling element 22*d* is in particular formed so as to be detachable from the handle unit 14*d* for disposal. The handle unit 14*d* has an interface for fixed connection to the second coupling element 22*d*. The interface is preferably configured as a blind hole. The handle unit 14*d*, at an end facing the application unit 12*d*, has a recess (not visible further) in which the second coupling element 22*d* is secured. On production of the oral hygiene device 10*d*, the handle unit 14*d* and the second coupling element 22*d* are produced separately and assembled afterwards. Assembly takes place for example by means of a catch connection. However, as already stated above, other assembly means are conceivable which appear suitable to a person skilled in the art. The connection between the second coupling element 22*d* and the handle unit 14*d* may in particular be configured so as to be fixed and inseparable, or exchangeable. Differently colored second coupling elements 22*d* may bring the necessary distinction, in particular with a uniform handle color.

FIGS. 5A to 5H show an oral hygiene device 10*e* in various illustrations. The oral hygiene device 10*e* is configured as an exchangeable head toothbrush. The oral hygiene device 10*e* has an application unit 12*e*. The oral hygiene device 10*e* furthermore has a handle unit 14*e*. The application unit 12*e* is formed by a push-on part. The application unit 12*e* has a base body 13*e*. The application unit 12*e* can be detached from the handle unit 14*d*, in particular without tools. Furthermore, the oral hygiene device 10*e* comprises a coupling unit 18*e* for releasable coupling of the application unit 12*e* to the handle unit 14*e*. In general, the cleaning region 48*e* of the application unit 12*e* is illustrated schematically.

The handle unit 14*e* has a base body 16*e*. The base body 16*e* of the handle unit 14*e* is formed at least substantially rotationally symmetrical with respect to a longitudinal axis 30*e* of the handle unit 14*e*. The base body 16*e* of the handle unit 14*e* is formed rotationally symmetrical with respect to the longitudinal axis 30*e* of the handle unit 14*e*. The base body 16*e* of the handle unit 14*e* is formed at least substantially frustoconical. On a side facing the coupling unit 18*e*, the base body 16*e* has a greater diameter than on a side facing away from the coupling unit 18*e*. A free end of the base body 16*e* of the handle unit 14*e* facing away from the coupling unit 18*e* is rounded. An end of the base body 16*e* of the handle unit 14*e* facing the coupling unit 18*e* is furthermore chamfered. An end face of the base body 16*e* of the handle unit 14*e* facing the coupling unit 18*e* has an angle of at least approximately 45° to the longitudinal axis 30*e* of the handle unit 14*e*. The chamfer of the base body 16*e* of the handle unit 14*e* runs opposite to a chamfer of the application unit 12*e*. A maximum diameter of the handle unit 14*e* is between 10 mm and 20 mm, preferably between 12 mm and 16 mm.

The coupling unit 18*e* has a first coupling element 20*e*. Furthermore, the coupling unit 18*e* has a second coupling element 22*e* corresponding to the first coupling element 20*e*. The first coupling element 20*e* forms an interface receiver, while the second coupling element 22*e* forms an interface protrusion. The first coupling element 20*e* delimits an interface receiver. The first coupling element 20*e* is formed integrally with the application unit 12*e*. The first coupling element 20*e* is arranged on a side of the application unit 12*e* facing away from the head region 46*e*.

The second coupling element 22*e* is formed by a separate component. The second coupling element 22*e* of the coupling unit 18*e* consists at least largely of a plastic. In principle however, it would also be conceivable for the second coupling element 22*e* to consist of another material which appears suitable to a person skilled in the art. The second coupling element 22*e* has a plug-like coupling structure 86*e*. The second coupling element 22*e* also has a base body 88*e* on which the plug-like coupling structure 86*e* is arranged. The base body 88*e* is arranged at least partially in the thumb grip region 26*e*. The base body 88*e* of the second coupling element 22*e* forms a depression in the thumb grip region 26*e*. The depression is arranged at least on a front side 34*e* of the base body 88*e*. The depression is formed concave. The base body 88*e* may also have protrusions to improve grip in the thumb grip region 26*e*. The base body 88*e* has for example three linear protrusions. The second coupling element 22*e* is formed as one piece. Furthermore, the second coupling element 22*e* has an interface (not visible further) for coupling with the handle unit 14*e*. This interface is arranged on a side of the base body 88*e* facing away from the plug-like coupling structure 86*e*. The second coupling element 22*e* is connected to the handle unit 14*e* at least by form fit and/or substance bonding. The second coupling element 22*e* is connected to the handle unit 14*e* for example by means of a push fit and/or adhesive connection. The second coupling element 22*e* is formed so as to be detachable from the handle unit 14*e* for disposal. The handle unit 14*e* has an interface for firm connection to the second coupling element 22*e*. The interface is preferably configured as a blind hole. The handle unit 14*e*, at an end facing the application unit 12*e*, has a recess (not visible further) in which the second coupling element 22*e* is secured. The recess may for example be made in the form of a blind hole in the longitudinal direction by turning and/or drilling. On production of the oral hygiene device 10*e*, the handle unit 14*e* and the second coupling element 22*e* are produced separately and assembled afterwards. Assembly takes place for example by means of a catch connection. However, as already stated above, other assembly means are conceivable which appear suitable to a person skilled in the art. The connection between the second coupling element 22*e* and the handle unit 14*e* may in particular be configured so as to be fixed and inseparable, or exchangeable. Differently colored second coupling elements 22*e* may bring the necessary distinction, in particular with a uniform handle color. By chamfering the base body 16*e* of the handle unit 14*e*, and chamfering the coupling unit 18*e*, assembly of the base body 88*e* to the handle unit 14*e* is clearly defined because of the orientation.

FIGS. 6A to 6H show an oral hygiene device 10*f* in various illustrations. The oral hygiene device 10*f* is configured as an exchangeable head toothbrush. The oral hygiene device 10*f* has an application unit 12*f*. The oral hygiene device 10*f* furthermore has a handle unit 14*f*. The application unit 12*f* is formed by a push-on part. The application unit 12*f* has a base body 13*f*. The application unit 12*f* can be detached from the handle unit 14*f*, in particular without tools. Furthermore, the oral hygiene device 10*f* comprises a coupling unit 18*f* for releasable coupling of the application unit 12*f* to the handle unit 14*f*. In general, the cleaning region 48*f* of the application unit 12*f* is illustrated schematically.

The handle unit 14*f* has a base body 16*f*. The base body 16*f* of the handle unit 14*f* is formed at least substantially rotationally symmetrical with respect to a longitudinal axis 30*f* of the handle unit 14*f*. The base body 16*f* of the handle unit 14*f* is formed rotationally symmetrical with respect to the longitudinal axis 30*f* of the handle unit 14*f*. The base body 16*f* of the handle unit 14*f* is formed with a convex bulge in the palm grip region 60*f*. Furthermore, the base body 16*f* of the handle unit 14*f* is formed waisted between the thumb grip region 26*f* and the palm grip region 60*f*. The base body 16*f* has a greatest diameter in the palm grip region 60*f*. A free end of the base body 16*f* of the handle unit 14*f* facing away from the coupling unit 18*f* is formed rounded. A minimum diameter of the handle unit 14*f* in the waisting is from 7 mm to 15 mm, preferably from 9 mm to 12 mm. A maximum diameter of the handle unit 14*f* is between 10 mm and 20 mm, preferably from 12 mm to 16 mm. An end of the base body 16*f* of the handle unit 14*f* facing the coupling unit 18*f* is formed straight.

The coupling unit 18*f* has a first coupling element 20*f*. Furthermore, the coupling unit 18*f* has a second coupling element 22*f* corresponding to the first coupling element 20*f*. The first coupling element 20*f* forms an interface receiver, while the second coupling element 22*f* forms an interface protrusion. The first coupling element 20*f* delimits an interface receiver. The first coupling element 20*f* is configured integrally with the application unit 12*f*. The first coupling element 20*f* is arranged on a side of the application unit 12*f* facing away from the head region 46*f*.

The second coupling element 22*f* is formed by a separate component. The second coupling element 22*f* of the coupling unit 18*f* consists at least largely of a plastic. In principle however, it would also be conceivable for the second coupling element 22*f* to consist of another material which appears suitable to a person skilled in the art. The second coupling element 22*f* has a plug-like coupling structure 86*e*. The second coupling element 22*f* also has a base body 88*f* on which the plug-like coupling structure 86*e* is arranged. The base body 88*f* is designed straight towards the handle unit 14*f* and chamfered towards the application unit 12*f*. The base body 88*f* in particular has a chamfer towards the application unit 12*f* of at least approximately 45° relative to the longitudinal axis 30*f*. The second coupling element 22*f* is formed as one piece. Furthermore, the second coupling element 22*f* has an interface (not visible further) for coupling with the handle unit 14*f*. The interface is arranged on a side of the base body 88*f* facing the plug-like coupling structure 86*f*. The second coupling element 22*f* is connected to the handle unit 14*f* at least by form fit and/or substance bonding. The second coupling element 22*f* is connected to the handle unit 14*f* for example by means of a push fit and/or adhesive connection. The second coupling element 22*f* is formed so as to be detachable from the handle unit 14*f* for disposal. The handle unit 14*f* has an interface for a firm connection with the second coupling element 22*f*. The interface is preferably configured as a blind hole. The handle unit 14*f*, at an end facing the application unit 12*f*, has a recess (not visible further) in which the second coupling element 22*f* is secured. The recess may for example be made in the form of a blind hole in the longitudinal direction by turning and/or drilling. On production of the oral hygiene device 10*f*, the handle unit 14*f* and the second coupling element 22*f* are produced separately and assembled afterwards. Assembly takes place for example by means of a catch connection. However, as already stated above, other assembly means are conceivable which appear suitable to a person skilled in the art. The connection between the second coupling element 22*f* and the handle unit 14*f* may in particular be configured so as to be fixed and inseparable, or exchangeable. Differently colored second coupling elements 22*f* may bring the necessary distinction, in particular with a uniform handle color.

FIGS. 7A to 7H show an oral hygiene device 10*g* in various illustrations. The oral hygiene device 10*g* is configured as an exchangeable head toothbrush. The oral hygiene device 10*g* has an application unit 12*g*. The oral hygiene device 10*g* furthermore has a handle unit 14*g*. The application unit 12*g* is formed by a push-on part. The application unit 12*g* has a base body 13*g*. The application unit 12*g* can be detached from the handle unit 14*c*, in particular without tools. Furthermore, the oral hygiene device 10*g* comprises a coupling unit 18*g* for releasable coupling of the application unit 12*g* to the handle unit 14*g*. In general, the cleaning region 48*g* of the application unit 12*g* is illustrated schematically.

The handle unit 14*g* has as an outer form an at least approximate figure-of-eight shape when viewed in a plane parallel to the main extension plane of the handle unit 14*g*. The handle unit 14*g* has a base body 16*g*. The base body 16*g* of the handle unit 14*g* delimits at least one opening 24*g*. The opening 24*g* extends completely through the base body 16*g* and is surrounded by the base body 16*g* in at least one plane. The opening 24*g* is completely surrounded by the base body 16*g* in a plane parallel to the main extension plane of the handle unit 14*g*. The opening 24*g* is completely surrounded by the base body 16*g* in the main extension plane of the handle unit 14*g*. The base body 16*g* has a loop 52*g* which extends around the opening 24*g*. The opening 24*g* has a lenticular cross-sectional form in the main extension plane of the handle unit 14*g*. The opening 24*g* is in particular oriented along the longitudinal axis 30*g* of the handle unit 14*g*. The loop 52*g* of the base body 16*g* forms two lateral longitudinal webs 54*g*, 54*g*', which are connected at a front end and a rear end of the opening 24*g* along a longitudinal axis 30*g*, and surround the opening 24*g*. The loop 52*g* is closed. In particular there are no open ends, such as for example fork-like designs. The loop 52*g* has for example an at least approximately diamond-shaped cross-section in a plane perpendicular to the longitudinal axis 30*g*. The longitudinal webs 54*g*, 54*g*' of the loop 52*g* have a diamond-shaped cross-section. The longitudinal webs 54*g*, 54*g*' of the loop 52*g* are rounded or radiused on the outside, i.e. outside the opening 24*g*. Furthermore, the longitudinal webs 54*g*, 54*g*' of the loop 52*g* are approximately angular on the inside, i.e. facing the opening 24*g*, in particular they have sharp edges. The cross-sections of the longitudinal webs 54*g*, 54*g*' each have four sides, of which at least one is concavely curved and at least one is convexly curved. Preferably, at least one of the sides of the cross-sections of the longitudinal webs 54*g*, 54*g*' facing the opening 24*g* on the front side 34*g* is concavely curved. Furthermore, preferably the outer sides, i.e. in particular the sides of the cross-sections of the longitudinal webs 54*g*, 54*g*' facing away from the opening 24*g*, are convexly curved. The cross-sections of the longitudinal webs 54*g*, 54*g*' may change at least partially over a longitudinal course, in particular with respect to the dimensioning of the cross-section.

The handle unit 14*g* has a thumb grip region 26*g*. The handle unit 14*g* furthermore has a palm grip region 60*g*. The opening 24*g* is arranged at least partially in the palm grip region 60*g*. The base body 16*g* and the opening 24*g* form a constriction between the thumb grip region 26*g* and the palm grip region 60*g*. The constriction is used, inter alia, to set back the thumb grip region 26*g*. The thumb grip region 26*g* does not however take up the complete part of the handle unit 14*g* in front of the constriction, but substantially only the foremost part.

FIGS. 8A to 8H show an oral hygiene device 10*h* in various illustrations. The oral hygiene device 10*h* is configured as an exchangeable head toothbrush. The oral hygiene device 10*h* has an application unit 12*h*. The oral hygiene device 10*h* furthermore has a handle unit 14*h*. The application unit 12*h* is formed by a push-on part. The application unit 12*h* has a base body 13*h*. The application unit 12*h* can be detached from the handle unit 14*h*, in particular without tools. Furthermore, the oral hygiene device 10*h* comprises a coupling unit 18*h* for releasable coupling of the application unit 12*h* to the handle unit 14*h*. In general, the cleaning region 48*h* of the application unit 12*h* is illustrated schematically.

The handle unit 14*h* has as an outer form an at least approximately drop-like shape viewed in a plane parallel to the main extension plane of the handle unit 14*h*. The handle unit 14*h* has a base body 16*h*. The base body 16*h* of the handle unit 14*h* delimits at least two openings 24*h*, 24*h*' which are arranged substantially parallel to the main extension direction. The openings 24*h*, 24*h*' extend completely through the base body 16*h* and are each surrounded by the base body 16*h* in at least one plane. The openings 24*h*, 24*h*' are completely surrounded by the base body 16*h* in a plane parallel to the main extension plane of the handle unit 14*h*. The openings 24*h*, 24*h*' are completely surrounded by the base body 16*h* in the main extension plane of the handle unit 14*h*. The base body 16*h* has a loop 52*h* which extends around the openings 24*h*, 24*h*', wherein a rib 90*h* is formed in the loop 52*h* along the longitudinal axis and divides the opening in the loop 52*h* into two openings 24*h*, 24*h*'. The openings 24*h*, 24*h*' have a banana-like cross-sectional form in the main extension plane of the handle unit 14*h*. The openings 24*h*, 24*h*' are in particular oriented along the longitudinal axis 30*h* of the handle unit 14*h*. The loop 52*h* of the base body 16*h* forms two lateral longitudinal webs 54*h*, 54*h*' which are connected at a front end and a rear end of the openings 24*h*, 24*h*' along the longitudinal axis 30*b*, and surround the opening 24*h*, and also the rib 90*h* which divides the opening of the loop into two openings 24*h*, 24*h*'. The loop 52*h* is closed. In particular there are no open ends, such as for example fork-like designs. The loop 2*h* has for example an at least approximately diamond-shaped cross-section in a plane perpendicular to the longitudinal axis 30*h*. The longitudinal webs 54*h*, 54*h*' of the loop 52*h* have a diamond-shaped cross-section. The longitudinal webs 54*h*, 54*h*' of the loop 52*h* are rounded or radiused on the outside, i.e. outside the openings 24*h*, 24*h*'. Furthermore, the longitudinal webs 54*h*, 54*h*' of the loop 52*h* are approximately angular on the inside, i.e. facing the openings 24*h*, 24*h*', in particular they have sharp edges. The cross-sections of longitudinal webs 54*h*, 54*h*' each have four sides, of which at least one is concavely curved and at least one is convexly curved. Preferably, at least one of the sides of the cross-sections of the longitudinal webs 54*h*, 54*h*' facing the openings 24*h*, 24*h*' on the front side 34*h* is concavely curved. Furthermore, preferably the outer sides, i.e. in particular the sides of the cross-sections of the longitudinal webs 54*h*, 54*h*' facing away from the openings 24*h*, 24*h*', are convexly curved. The cross-sections of the longitudinal webs 54*h*, 54*h*' may change at least partially over a longitudinal course, in particular with respect to the dimensioning of the cross-section.

The handle unit 14*h* has a thumb grip region 26*h*. The handle unit 14*h* furthermore has a palm grip region 60*h*. The openings 24*h*, 24*h*' are arranged at least partially in the palm grip region 60*h*. The base body 16*h* and the openings 24*h*, 24*h*' form a constriction between the thumb grip region 26*h* and the palm grip region 60*h*. The constriction is used, inter alia, to set back the thumb grip region 26*h*. The thumb grip region 26*h* does not however take up the complete part of the handle unit 14*h* in front of the constriction, but substantially only the foremost part.

FIGS. 9A to 9E show an oral hygiene device 10*i* in various illustrations. The oral hygiene device 10*i* is configured as an exchangeable head toothbrush. The oral hygiene device 10*i* has an application unit 12*i*. The oral hygiene device 10*i* furthermore has a handle unit 14*i*. The application unit 12*i* is formed by a push-on part. The application unit 12*i* has a base body 13*i*. The application unit 12*i* can be detached from the handle unit 14*c*, in particular without tools. Furthermore, the oral hygiene device 10*i* comprises a coupling unit 18*i* for releasable coupling of the application unit 12*i* to the handle unit 14*i*. In general, the cleaning region 48*i* of the application unit 12*i* is illustrated schematically.

The handle unit 14*i* has as an outer form a slightly waisted base form when viewed in a plane parallel to the main extension plane of the handle unit 14*i*. The handle unit 14*i* has a base body 16*i*. The base body 16*i* of the handle unit 14*i* delimits various recesses 24*i* which are created from a front side 34*i* and from a rear side 36*i*'. The recesses 24*i* extend into the base body 16*i* and in each case meet further recesses 24*i* which are cut out from the other side. The recesses 24*i* are completely surrounded by the base body 16*i* in at least one plane. The recesses 24*i* are completely surrounded by the base body 16*i* in a plane parallel to a main extension plane of the handle unit 14*i*. The recesses 24*i* are completely surrounded by the base body 16*i* in the main extension plane of the handle unit 14*i*.

The recesses 24*i* are formed offset, i.e. the recesses 24*i* on the front side 34*i*, in their form, do not extend completely 1:1 to the rear side 36*i*. In this way, webs 92*i* are formed between the recesses 24*i* and delimit the form. The webs 92*i* form the surface in the handle unit 14*i* or in the base body 16*i*. The webs 92*i* are oriented perpendicularly to the main extension direction and frame the recesses 24*i*. The recesses 24*i* are arranged linearly along the main extension direction 42*i*. The recesses 24*i* are arranged offset on the front side 34*i* and on the rear side 36*i*.

The handle unit 14*i* has a thumb grip region 26*i*. The handle unit 14*i* furthermore has a palm grip region 60*i*. The recesses 24*i* are arranged at least partially in the palm grip region 60*i*. The base body 16*i* and the recesses 24*i* form a constriction between the thumb grip region 26*i* and the palm grip region 60*i*. The constriction is used, inter alia, to set back the thumb grip region 26*h*. The thumb grip region 26*i* does not however take up the complete part of the handle unit 14*i* in front of the constriction, but substantially only the foremost part. The thumb grip region 26*i* is preferably at least partially formed by a recess 24*i*.

FIGS. 10A to 10E show an oral hygiene device 10*j* in various illustrations. The oral hygiene device 10*j* is configured as an exchangeable head toothbrush. The oral hygiene device 10*j* has an application unit 12*j*. The oral hygiene device 10*j* furthermore has a handle unit 14*j*. The application unit 12*j* is formed by a push-on part. The application unit 12*j* has a base body 13*j*. The application unit 12*j* can be detached from the handle unit 14*j*, in particular without tools. Furthermore, the oral hygiene device 10*j* comprises a coupling unit 18*j* for releasable coupling of the application unit 12*j* to the handle unit 14*j*. In general, the cleaning region 48*j* of the application unit 12*j* is illustrated schematically.

The handle unit 14*j* has as an outer form a slightly waisted base form when viewed in a plane parallel to the main extension plane of the handle unit 14*j*. The handle unit 14*j* has a base body 16*j*. The base body 16*j* of the handle unit 14*j* delimits various recesses 24*j* which are created from a front side 34*j*, a rear side 36*j*, from the left and right sides. The recesses 24*j* extend into the base body 16*j* and in each case meet further recesses 24*j* which are cut out from the other sides. The recesses 24*j* are completely surrounded by the base body 16*j* in at least one plane. The recesses 24*j* are completely surrounded by the base body 16*j* in a plane parallel to a main extension plane of the handle unit 14*j*. The recesses 24*j* are completely surrounded by the base body 16*j* in the main extension plane of the handle unit 14*j*.

The recesses 24*j* are formed offset, i.e. the recesses 24*j* on the front side 34*j*, in their form, do not extend completely 1:1 to the rear side 36*j*. In this way, webs 94*j* are formed between the recesses 24*j* and delimit the form. The webs 94*j* form the surface in the handle unit 14*j* or in the base body 16*j*. The webs 94*j* are not specifically oriented and frame the recesses 24*j*. The recesses 24*j* are arranged alternately along a main extension direction 42*j*, such that one recess 24*j* and then two recesses 24*j* are arranged alternately on a side. The recesses 24*j* are arranged offset on the front side 34*j* and on the rear side 36*j*, so that a recess 24*j* on the one side meets two recesses 24*j* on the other side.

The handle unit 14*j* has a thumb grip region 26*j*. The handle unit 14*j* furthermore has a palm grip region 60*j*. The recesses 24*j* are arranged at least partially in the palm grip region 60*j*. The base body 16*j* and the recesses 24*j* form a constriction between the thumb grip region 26*j* and the palm grip region 60*j*. The constriction is used, inter alia, to set back the thumb grip region 26*j*. The thumb grip region 26*j* does not however take up the complete part of the handle unit 14*j* in front of the constriction, but substantially only the foremost part. The thumb grip region 26*j* is preferably at least partially formed by a recess 24*j*.

FIGS. 11A and 11B show an oral hygiene device 10*k* in different illustrations. The oral hygiene device 10*k* is configured as an exchangeable head toothbrush. The oral hygiene device 10*k* has an application unit 12*k*. The oral hygiene device 10*k* furthermore has a handle unit 14*k*. The application unit 12*k* is formed by a push-on part. The application unit 12*k* has a base body 13*k*. The application unit 12*k* can be detached from the handle unit 14*k*, in particular without tools. Furthermore, the oral hygiene device 10*k* comprises a coupling unit 18*k* for releasable coupling of the application unit 12*k* to the handle unit 14*k*. In general, the cleaning region 48*k* of the application unit 12*k* is illustrated schematically.

The handle unit 14*k* has a base body 16*k*. The base body 16*k* of the handle unit 14*k* is at least substantially symmetrical relative to a longitudinal axis 30*k* of the handle unit 14*k*. The base body 16*k* of the handle unit 14*k* is formed waisted in a palm grip region 60*k*. Furthermore, the base body 16*k* of the handle unit 14*k* is formed waisted between the thumb grip region 26*k* and the palm grip region 60*k*. The handle unit 14*k* is formed in several pieces. The handle unit 14*k* is formed for example in two pieces. The handle unit 14*k* comprises the base body 16*k*. Furthermore, on a side of the base body 16*k* facing away from the application unit 12*k*, the handle unit 14*k* has a terminating element 96*k*. A free end of the handle unit 14*k* facing away from the coupling unit 18*k* is configured in the form of a terminating unit 96*k*.

Furthermore, the oral hygiene device 10*k* comprises the coupling unit 18*k* for releasable coupling of the application unit 12*k* to the handle unit 14*k*.

The coupling unit 18*k* comprises a first coupling element 20*k*. The coupling unit 18*k* furthermore comprises a second coupling element 22*k* corresponding to the first coupling element 20*k*. The first coupling element 20*k* forms an interface receiver, while the second coupling element 22*k* forms an interface protrusion. The first coupling element 20*k* delimits an interface receiver. The first coupling element 20*k* is configured integrally with the application unit 12*k*. The first coupling element 20*k* is arranged on a side of the application unit 12*k* facing away from the head region 46*a*.

The second coupling element 22*k* is formed from a separate component. The second coupling element 22*k* of the coupling unit 18*k* consists at least largely of a plastic. In principle however, it would also be conceivable for the second coupling element 22*k* to consist of another material which appears suitable to a person skilled in the art (as listed above). The second coupling element 22*k* has a plug-like coupling structure 86*k*. The second coupling element 22*k* also has a base body 88*k* on which the plug-like coupling structure 86*k* is arranged. The base body 88*k* is designed widening towards the handle unit 14*k* and chamfered towards the application unit 12*k*. The base body 88*k* in particular has a chamfer, towards the application unit 12*k*, of at least approximately 45° relative to the longitudinal axis 30*k*. The second coupling element 22*k* is formed as one piece. Furthermore, the second coupling element 22*k* has an interface 98*k* for coupling with the handle unit 14*k*. This interface 98*k* is arranged on a side of the base body 88*k* facing the plug-like coupling structure 86*k*. The second coupling element 22*k* is connected to the handle unit 14*k* at least by form fit and/or substance bonding. The second coupling element 22*k* is connected for example to the handle unit 14*k* by means of a push fit and/or adhesive connection. The second coupling element 22*k* is formed so as to be detachable from the handle unit 14*k* for disposal. The interface 98*k* has two connecting pins for connection to the handle unit 14*k*. The handle unit 14*k* has an interface 100*k* for a firm connection to the second coupling element 22*k*. The interface 100*k* is preferably configured as a blind hole. The interface 100*k* of the handle unit 14*k*, at an end facing the application unit 12*k*, has several, in particular two openings in which the interface 98*k* of the second coupling element 22*k* is secured. The connecting pins of the interface 98*k* of the second coupling element 22*k* are provided to engage in the corresponding opening of the interface 100*k* in the base body 16*k* of the handle unit 14*k*. The openings may be made for example in the form of blind holes in the longitudinal direction by turning and/or drilling. On production of the oral hygiene device 10*k*, the handle unit 14*k* and the second coupling element 22*k* are produced separately and assembled afterwards. Assembly takes place for example by means of a catch connection. However, as already stated above, other assembly means are conceivable which appear suitable to a person skilled in the art. The connection between the second coupling element 22*k* and the handle unit 14*k* may in particular be configured so as to be fixed and inseparable, or exchangeable. Differently colored second coupling elements 22*k* may bring the necessary distinction, in particular with a uniform handle color.

The second coupling element 22*k* may, in addition to the functions already described, also contain the thumb grip region 26*k*. Accordingly, the second coupling element 22*k* may have structures for forming the thumb grip region 26*k*. As shown as an example, these may be raised ribs which prevent the thumb from slipping.

Furthermore, the handle unit 14*k* comprises the terminating element 96*k*. The terminating element 96*k* is formed from a separate component. The terminating element 96*k* consists at least largely of a plastic. In principle however, it is also conceivable that the terminating element 96*k* consists of other materials which appear suitable to a person skilled in the art (as listed above). Furthermore, the terminating element 96*k* has an interface 102*k* for coupling to the handle unit 14*k*. The interface 102*k* is arranged on a side of the base body 88*k* facing the end. The terminating element 96*k* is connected to the handle unit 14*k* at least by form fit and/or substance bonding. The terminating element 96*k* is connected to the handle unit 14*k* for example by means of a push fit and/or adhesive connection. The terminating element 96*k* is in particular configured so as to be detachable from the handle unit 14*k* for disposal. The interface 102*k* has two connecting pins for connection to the handle unit 14*k*. The handle unit 14*k* has an interface (not visible further) for a firm connection to the terminating element 96*k*. The interface is preferably formed as a blind hole. At an end facing the terminating element 96*k*, the handle unit 14*k* has several, in particular two openings (not visible further) in which the terminating element is secured. The connecting pins of the interface 102*k* of the terminating element 96*k* are provided to engage in the corresponding opening of the interface in the base body 16*k* of the handle unit 14*k*. The openings may be made for example in the form of blind holes in the longitudinal direction by turning and/or drilling. On production of the oral hygiene device 10*k*, the handle unit 14*k* and the terminating element 96*k* are produced separately and assembled afterwards. Assembly takes place for example by means of a catch connection. However, as already stated above, other assembly means are conceivable which appear suitable to a person skilled in the art. The connection between the terminating element 96*k* and the handle unit 14*k* may in particular be configured so as to be fixed and inseparable, or exchangeable. Differently colored terminating elements 96*k* may bring the necessary distinction, in particular with a uniform handle color.

The descriptions given for specific figures may evidently also be transferred to other figures which show the same or similar features, and in which the features are not described in the same detail.

LIST OF REFERENCE SIGNS

10 Oral hygiene device
12 Application unit
13 Base body
14 Handle unit
16 Base body
18 Coupling unit
20 Coupling element
24 Opening, recess
26 Thumb grip region
28 Opening
30 Longitudinal axis
32 Surface
34 Front side
36 Rear side
38 Vertical axis
40 Transverse axis
42 Main extension direction
44 Neck region
46 Head region
48 Cleaning region
50 Gripping face
52 Loop
54 Longitudinal web
56 Loop
58 Longitudinal web
60 Palm grip region
62 Stage
64 Stage
66 Stage
68 Stop face
70 Part element
72 Part element
74 Groove
76 Part element
78 Part element
80 Part element
82 Cam
84 Latching recess
86 Coupling structure
88 Base body
90 Rib
92 Web
94 Web
96 Terminating element
98 Interface
100 Interface
102 Interface

The invention claimed is:

1. An oral hygiene device, comprising:
at least one application unit having a first base body;
at least one handle unit having a second base body; and
at least one coupling unit separating the application unit and the handle unit from each other and for releasably coupling the application unit to the handle unit,
wherein the at least one coupling unit has a first coupling element and a second coupling element,
wherein the second base body has a hardness and/or a density that is greater than a hardness and/or density of the first base body,
wherein at least the second base body has at least 90% by volume of a metallic material,
wherein the first coupling element is formed integrally with the application unit,
wherein the second coupling element corresponds to the first coupling element and is fixedly connected to the handle unit, and
wherein the second coupling element of the coupling unit is made at least largely of plastic and is connected to the handle unit at least by form fit and/or substance bonding.

2. The oral hygiene device as claimed in claim 1,
wherein the second coupling element of the coupling unit is formed integrally with the handle unit.

3. The oral hygiene device as claimed in claim 1,
wherein the at least one coupling unit comprises at least one second coupling element which consists of a metallic material.

4. The oral hygiene device as claimed in claim 1,
wherein at least the second base body is produced in a diecasting process.

5. The oral hygiene device as claimed in claim 1,
wherein the metallic material comprises between 1% and 13% silicon, between 0.5% and 2% iron, and maximum 5% copper.

6. The oral hygiene device as claimed in claim 1,
wherein the second base body delimits at least one recess which extends completely through the second base body and which is completely surrounded by the second base body in at least one plane.

7. The oral hygiene device as claimed in claim 6,
wherein the handle unit has at least one thumb grip region wherein the recess is arranged at least partially in the thumb grip region.

8. The oral hygiene device as claimed in claim 6,
wherein the second base body delimits at least one further recess which is arranged behind the recess along a longitudinal axis of the handle unit, which extends completely through the second base body and which is completely surrounded by the second base body in the at least one plane.

9. The oral hygiene device as claimed in claim 6,
wherein the handle unit has a base form of at least approximate figure-of-eight shape, viewed at least in a further plane parallel to a main extension plane of the handle unit.

10. The oral hygiene device as claimed in claim 1,
wherein the second base body is formed at least substantially rotationally symmetrical with respect to a longitudinal axis of the handle unit.

11. The oral hygiene device as claimed in claim 10,
wherein the second base body is formed at least substantially frustoconical.

12. The oral hygiene device as claimed in claim 1, wherein the metallic material is formed from an aluminum alloy.

* * * * *